(12) United States Patent
Park et al.

(10) Patent No.: US 11,147,017 B2
(45) Date of Patent: Oct. 12, 2021

(54) METHOD AND DEVICE FOR TRANSMITTING WAKE-UP PACKET IN WIRELESS LAN SYSTEM

(71) Applicant: LG ELECTRONICS INC., Seoul (KR)

(72) Inventors: Eunsung Park, Seoul (KR); Jinsoo Choi, Seoul (KR); Dongguk Lim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 154 days.

(21) Appl. No.: 16/497,783

(22) PCT Filed: Mar. 23, 2018

(86) PCT No.: PCT/KR2018/003460
§ 371 (c)(1),
(2) Date: Sep. 25, 2019

(87) PCT Pub. No.: WO2018/182243
PCT Pub. Date: Oct. 4, 2018

(65) Prior Publication Data
US 2021/0127333 A1    Apr. 29, 2021

Related U.S. Application Data

(60) Provisional application No. 62/481,135, filed on Apr. 4, 2017, provisional application No. 62/476,878, filed on Mar. 27, 2017.

(51) Int. Cl.
*H04W 52/02* (2009.01)
*H04L 27/02* (2006.01)
(Continued)

(52) U.S. Cl.
CPC ......... *H04W 52/0229* (2013.01); *H04L 27/02* (2013.01); *H04L 27/2607* (2013.01); *H04L 27/2634* (2013.01); *H04W 84/12* (2013.01)

(58) Field of Classification Search
CPC .............. H04W 52/0229; H04W 84/12; H04L 27/2634; H04L 27/02; H04L 27/2607
(Continued)

(56) References Cited

U.S. PATENT DOCUMENTS

2014/0050133 A1    2/2014   Jafarian et al.
2016/0337973 A1   11/2016   Park et al.
2018/0183905 A1*   6/2018   Azizi ................. H04L 27/2613

FOREIGN PATENT DOCUMENTS

KR    1020090114893    11/2009
KR    1020120082343     7/2012

OTHER PUBLICATIONS

PCT International Application No. PCT/KR2018/003460, International Search Report dated Jun. 28, 2018, 4 pages.
(Continued)

*Primary Examiner* — Kwang B Yao
*Assistant Examiner* — Syed M Bokhari
(74) *Attorney, Agent, or Firm* — Lee, Hong, Degerman, Kang & Waimey

(57) ABSTRACT

A method and a device for transmitting a wake-up frame in a wireless LAN system are proposed. In particular, the transmission device configures a PPDU to which a first wireless LAN system is applied. The transmission device transmits, via the PPDU, a wake-up frame to which a second wireless LAN system is applied. The PPDU is transmitted via a first frequency band. The PPDU comprises a signal field and a data field. The signal field indicates that a data frame is transmitted in at least one RU excluding three 26-RUs located at the center of a second frequency band
(Continued)

included in the first frequency band. The wake-up frame is transmitted via a 4 MHz band located at the center of the three 26-RUs. A coefficient is inserted in a first subcarrier constituting the 4 MHz band. The wake-up frame has an OOK scheme applied thereto and thus comprises an on signal and an off signal.

14 Claims, 32 Drawing Sheets

(51) Int. Cl.
*H04L 27/26* (2006.01)
*H04W 84/12* (2009.01)

(58) Field of Classification Search
USPC .......................................................... 370/318
See application file for complete search history.

(56) References Cited

OTHER PUBLICATIONS

Seok, Y., "Coexistence Mechanism for Wakeup Radio Signal (follow-up)", doc.: IEEE 802.11-16/1506r1, Nov. 2016, 12 pages.

* cited by examiner

FIG. 1
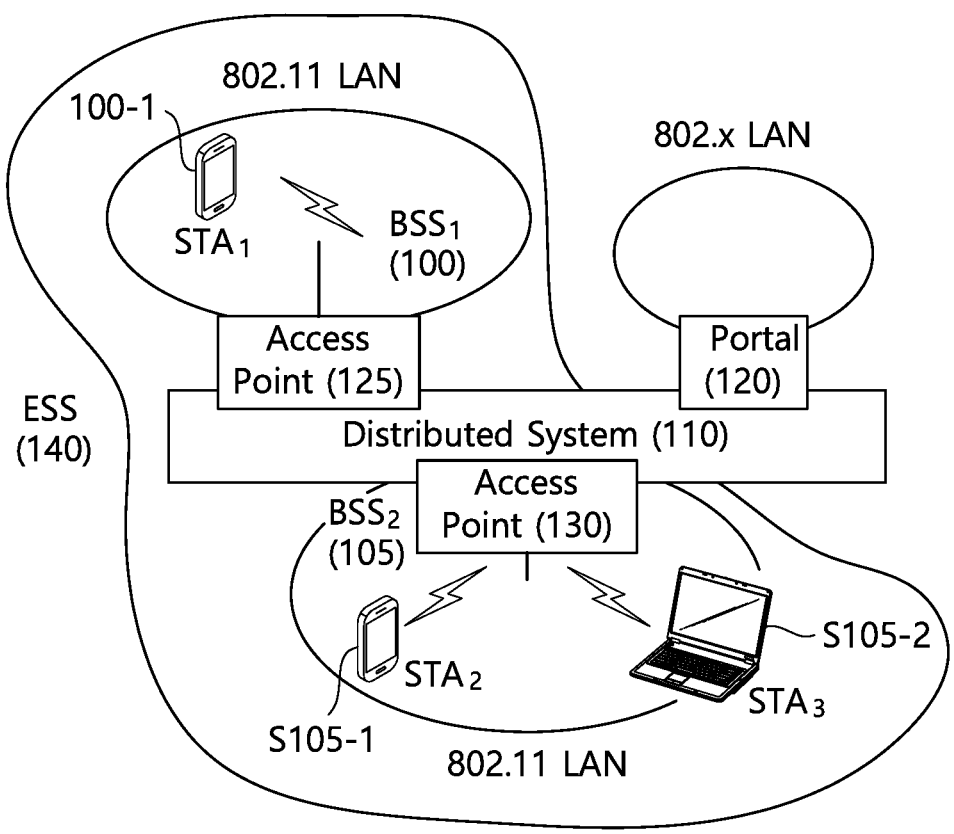
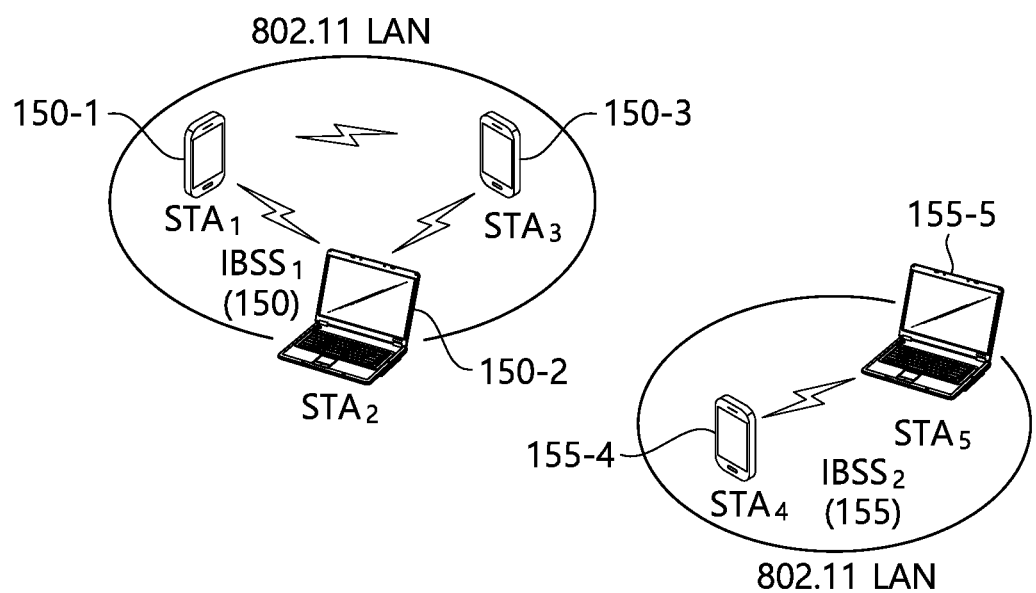

FIG. 28

□ 4us (CP+3.2us) or 3.2us-length symbol

<Option 1>

Information 0 | 0 0 | ... | 0 |
Information 1 | 1 1 | ... | 1 |
            {  n number  } or

<Option 2>

Information 0 | 0 1 | ... | 0 1 |
Information 1 | 1 0 | ... | 1 0 |
            {  n number  } or

<Option 3>

Information 0 | 0 0 | ... | 1 1 |
Information 1 | 1 1 | ... | 0 0 |
            {  n number  } or

<Option 4>

Information 0 | 1 1 | ... | 0 | ... | 1 | Case where number of Symbol 1 is odd number and number of Symbol 0 is even number (or vice versa)
Information 1 | 0 0 | ... | 1 | ... | 0 | Case where number of Symbol 0 is odd number and number of Symbol 1 is even number (or vice versa)
            {  n number  }

METHOD AND DEVICE FOR TRANSMITTING WAKE-UP PACKET IN WIRELESS LAN SYSTEM

CROSS-REFERENCE TO RELATED APPLICATIONS

This application is the National Stage filing under 35 U.S.C. 371 of International Application No. PCT/KR2018/003460, filed on Mar. 23, 2018, which claims the benefit of U.S. Provisional Application No. 62/476,878, filed on Mar. 27, 2017, and 62/481,135, filed on Apr. 4, 2017, the contents of which are all hereby incorporated by reference herein in their entirety.

BACKGROUND OF THE INVENTION

Field of the Invention

This specification relates to a scheme for performing low-power communication in a wireless LAN system and, more particularly, to a method and apparatus for transmitting a wake-up packet using an HE PPDU in a wireless LAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). The directionality of such a next-generation WLAN means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

This specification proposes a method and apparatus for transmitting a wake-up packet using an HE PPDU in a wireless LAN system.

An example of this specification proposes a method and apparatus for transmitting a wake-up frame using an HE-PPDU in a wireless LAN system.

The present embodiment may be performed in a network environment in which both a first wireless LAN system and a second wireless LAN system are supported. In this case, the first wireless LAN system may correspond to an 802.11ax system, and the second wireless LAN system may correspond to an 802.11ba system.

The present embodiment is performed in a transmitting device. A receiving device supporting the first wireless LAN system may correspond to an ax STA. A receiving device supporting the second wireless LAN system may correspond to a low-power wake-up receiver or WUR STA. The transmitting device may correspond to an AP.

Terms are first arranged. An on signal may correspond to a signal having an actual power value. An off signal may correspond to a signal not having an actual power value. Furthermore, a subcarrier described in the present embodiment may be interchangeably used with the same concept as a tone.

A physical layer protocol data unit (PPDU) to which the first wireless LAN system is applied is configured.

A transmitting device transmits a wake-up frame to which the second wireless LAN system is applied through the PPDU.

How the wake-up frame is configured is described below.

An on-off keying (OOK) method is applied the wake-up frame, which is configured with an on signal and an off signal.

The PPDU is transmitted through a first frequency band. The PPDU includes a signal field and a data field. The signal field is the control information field of the PPDU, and may correspond to an HE-SIG-B field. The HE-SIG-B field may be included only in the case of a PPDU for multiple users (MU). Basically, the HE-SIG-B may include resource assignment information for at least one receiving device. However, In this case, the signal field may use the reserved field of the HE-SIG-B.

Accordingly, the signal field includes information on that the data frame is transmitted in at least one RU except three 26-radio units (RU) positioned at the center of the second frequency band including the first frequency band. That is, the transmitting device may signal that the three 26-RUs need to be empted through the signal field with respect to a receiving device supporting a first wireless LAN system. The reason for this is that the three 26-RUs need to be used to transmit the wake-up frame.

Specifically, the wake-up frame is transmitted through a 4 MHz band positioned at the center of the three 26-RUs. A coefficient is inserted into a first subcarrier configuring the 4 MHz band.

The first frequency band and the second frequency band may be 20 MHz. The first subcarriers may be disposed at subcarriers whose subcarrier indices within the three 26-RUs are from −26 to 25. In the first subcarrier, DC may be positioned at second subcarriers whose subcarrier indices within the three 26-RUs are −3 to 3. 0 may be inserted into the second subcarrier.

The three 26-RUs may be disposed in third subcarriers having subcarrier indices of −42 to 42. In the third subcarrier, 0 may be inserted into a fourth subcarrier except subcarriers having subcarrier indices of −26 to 25. The fourth subcarrier may be a guard subcarrier. The guard subcarrier may perform the role of reducing interference from a surrounding RU.

For another example, the first frequency band is 40 MHz, and the second frequency band may be a first 20 MHz partial band and second 20 MHz partial band included in the 40 MHz. The first subcarriers may be disposed at subcarriers whose subcarrier indices within the three 26-RUs are from −149 to 98 in the first 20 MHz partial band. The first subcarriers may be disposed at subcarriers whose subcarrier indices within the three 26-RUs are from 98 to 149 in the second 20 MHz partial band.

For yet another example, the first frequency band is 80 MHz, and the second frequency band may be a first 20 MHz partial band, second 20 MHz partial band, third 20 MHz partial band and fourth 20 MHz partial band included in the 80 MHz. The first subcarriers may be disposed at subcarriers whose subcarrier indices within the three 26-RUs are from 405 to −354 in the first 20 MHz partial band. The first subcarriers may be disposed at subcarriers whose subcarrier indices within the three 26-RUs are from −163 to −112 in the second 20 MHz partial band. The first subcarriers may be disposed at subcarriers whose subcarrier indices within the three 26-RUs are from 112 to 163 in the third 20 MHz partial band. The first subcarriers may be disposed at subcarriers whose subcarrier indices within the three 26-RUs are from 354 to 405 in the fourth 20 MHz partial band.

The space of the first to fourth subcarriers may be 78.125 KHz. The first to fourth subcarriers are subcarriers for a PPDU to which the first wireless LAN system is applied. IFFT may be performed on the PPDU to which the first wireless LAN system is applied. If the first frequency band is 20 MHz, 64-point IFFT may be performed on the PPDU to which the first wireless LAN system is applied. If the first frequency band is 40 MHz, 128-point (or 512-point in 11ax) IFFT may be performed on the PPDU to which the first wireless LAN system is applied. If the first frequency band is 80 MHz, 256-point (or 1024-point in 11ax) IFFT may be performed on the PPDU to which the first wireless LAN system is applied.

Different IFFT may be applied to the PPDU to which the first wireless LAN system is applied and the wake-up frame to which the second wireless LAN system is applied. Detailed contents are described later.

For another example, the coefficient may be inserted into only 13 subcarriers whose subcarrier indices are a multiple of 4 in subcarriers except DC in the first subcarrier. The coefficient may be −1 or 1.

In this case, the coefficient may be inserted using a coefficient of a 1× long training field (LTF) sequence for the preset frequency band.

The on signal may be generated by inserting the coefficient into the 13 subcarriers within a 20 MHz band and performing inverse fast Fourier transform (IFFT). Accordingly, the spacing of the 13 subcarriers may be 312.5 KHz.

For yet another example, the coefficient may be inserted into only 7 subcarriers whose subcarrier indices are a multiple of 8 in subcarriers except DC in the first subcarrier.

In this case, the coefficient may be inserted using a coefficient of a 2× short training field (STF) sequence for the preset frequency band.

The M is a binary sequence of a preset 15-bit length and may be defined as follows.

$$M=\{-1,-1,-1,1,1,1,-1,1,1,1,-1,1,1,-1,1\}$$

The on signal may be generated by inserting the coefficient into the 7 subcarriers within a 20 MHz band and performing IFFT.

That is, the data field may be transmitted to a receiving device supporting the first wireless LAN system through the at least one RU. The wake-up frame may be transmitted to a receiving device supporting the second wireless LAN system through the three 26-RUs. That is, the three 26-RUs cannot be assigned to a receiving device supporting the first wireless LAN system, and can be assigned to only a receiving device supporting the second wireless LAN system.

Furthermore, the data frame and the wake-up frame may be transmitted simultaneously. That is, the data frame and the wake-up frame can be transmitted simultaneously through different frequency band according to an OFDMA scheme.

According to an example of this specification, a transmitting device generates a wake-up packet by applying an OOK modulation method and transmits the wake-up packet. Accordingly, a receiving device can reduce power consumption using an envelope detector when performing wake-up decoding. Accordingly, the receiving device can decode the wake-up packet with minimum power.

Furthermore, resource efficiency can be maximized by transmitting a wake-up packet using an RU not allocated to a receiving device supporting 802.11ax. Accordingly, a transmitting device can transmit a wake-up packet and an HE PPDU simultaneously.

BRIEF DESCRIPTION OF THE DRAWINGS

FIG. 1 is a conceptual view illustrating the structure of a wireless local area network (WLAN).

FIG. 28 illustrates various examples of a symbol repetition method repeating n number of symbols according to an exemplary embodiment of this specification.

DESCRIPTION OF EXEMPLARY EMBODIMENTS

Figure 2:
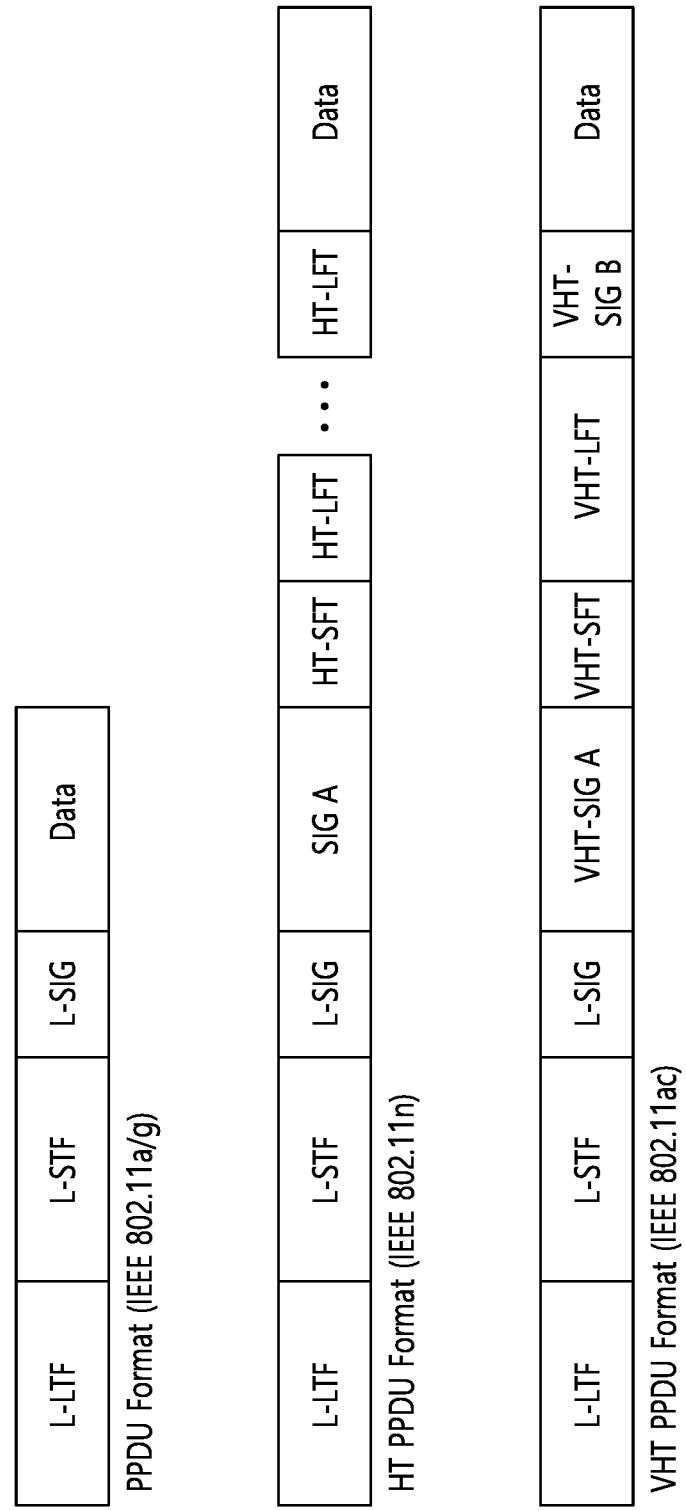
FIG. 2 is a diagram illustrating an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various names such as a mobile terminal, a wireless device, a wireless transmit/receive unit (WTRU), user equipment (UE), a mobile station (MS), a mobile subscriber unit and simply a user.

Meanwhile, a term "user" may be used as various meanings, and may be used to mean an STA participating in uplink MIMO and/or uplink OFDMA transmission in wireless LAN communication, for example, but is not limited thereto.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (or a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
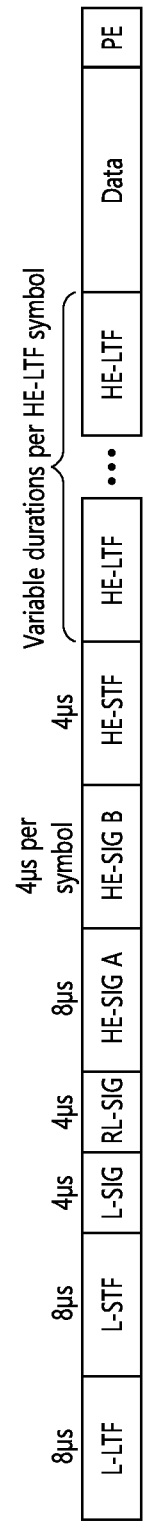
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (or an MAC payload), and a packet extension (PE) field. The respective fields may be transmitted during an illustrated time period (that is, 4 or 8 µs).

More detailed description of the respective fields of FIG. 3 will be made below.

Figure 4:
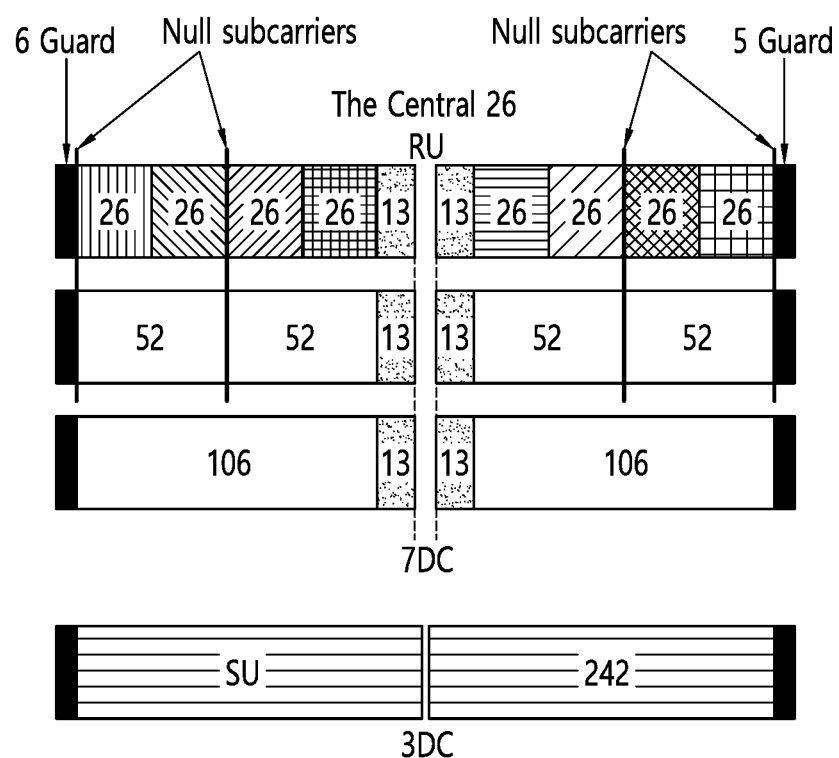
FIG. 4 is a diagram illustrating the layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
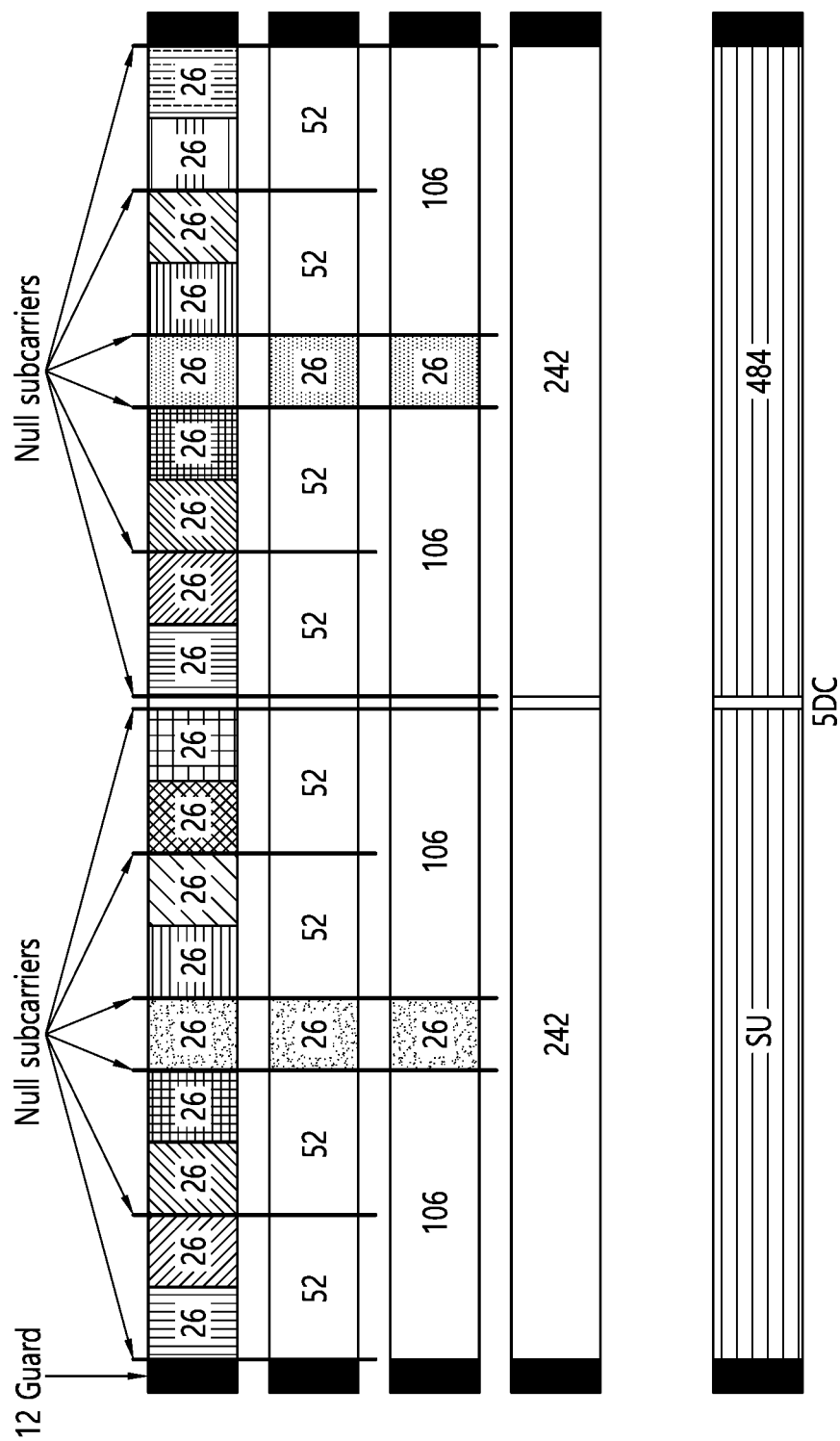
FIG. 5 is a diagram illustrating the layout of resource units (RUs) used in a band of 40 MHz.

FIG. 5 is a diagram illustrating a layout of resource units (RUs) used in a band of 40 MHz.

As in the case where RUs having various sizes are used in the example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
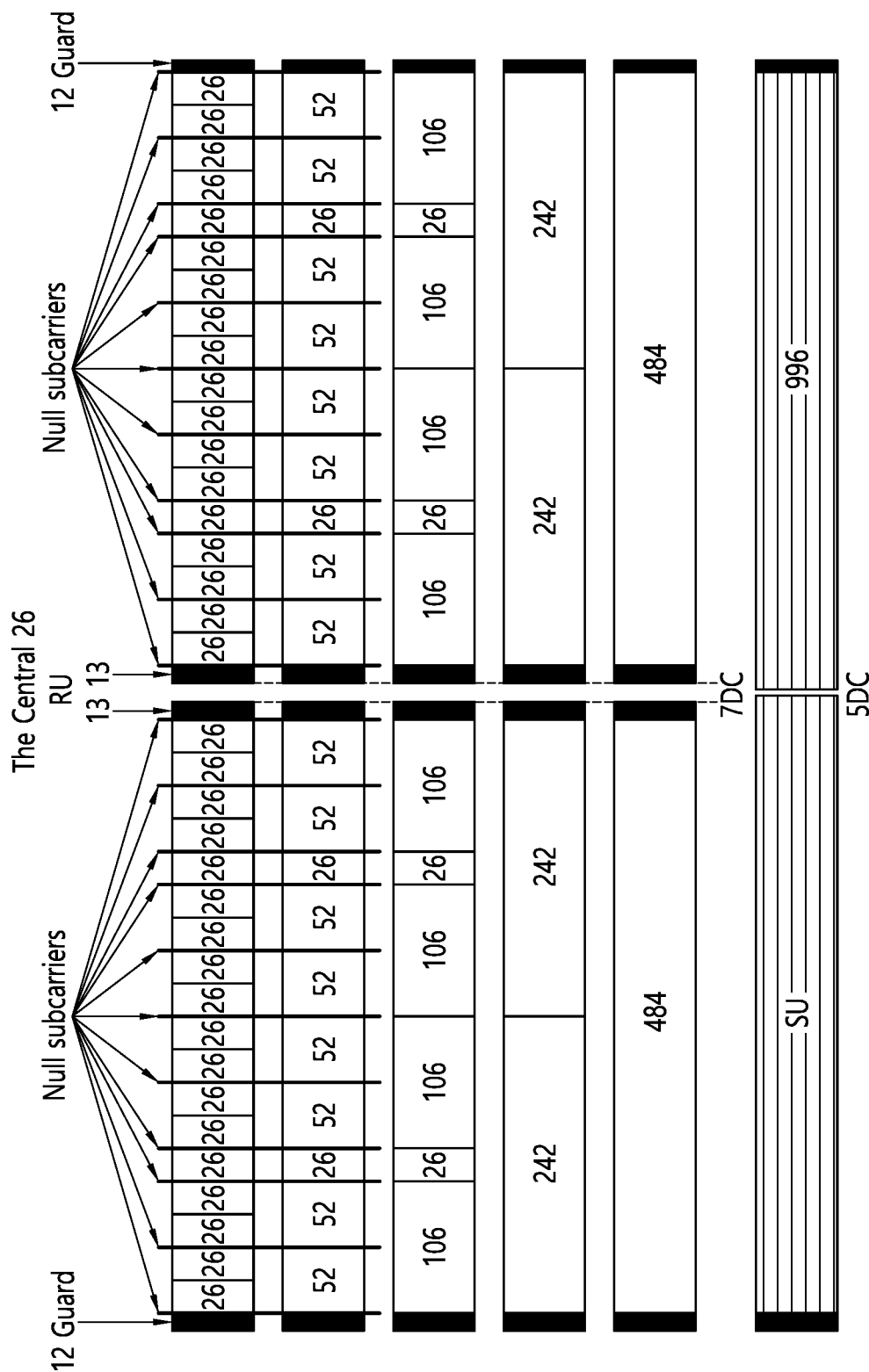
FIG. 6 is a diagram illustrating the layout of resource units (RUs) used in a band of 80 MHz.

FIG. 6 is a diagram illustrating a layout of resource units (RUs) used in a band of 80 MHz.

Figure 26:
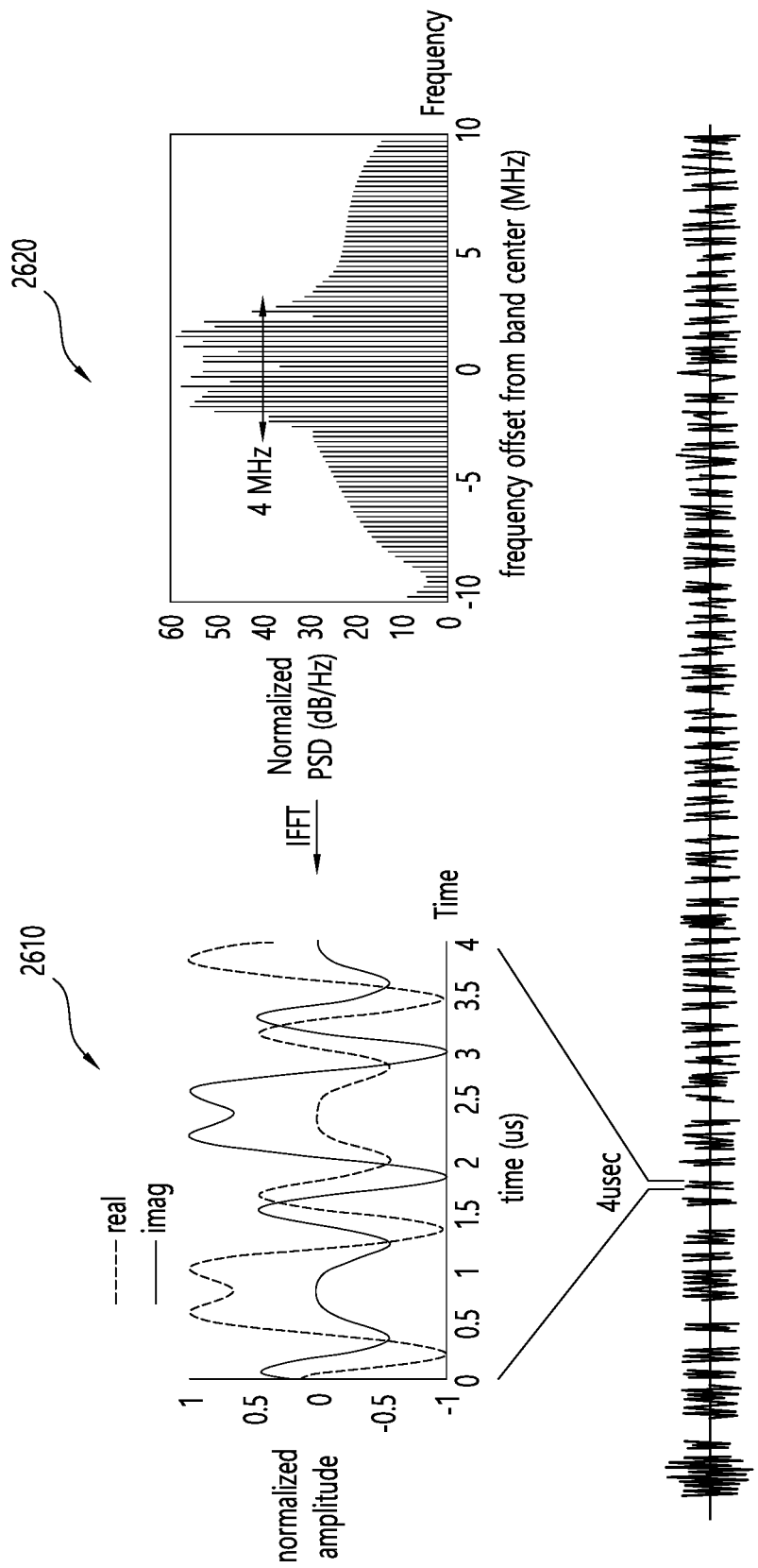
FIG. 26 illustrates a method for designing an OOK pulse according to an exemplary embodiment of this specification.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Figure 7:
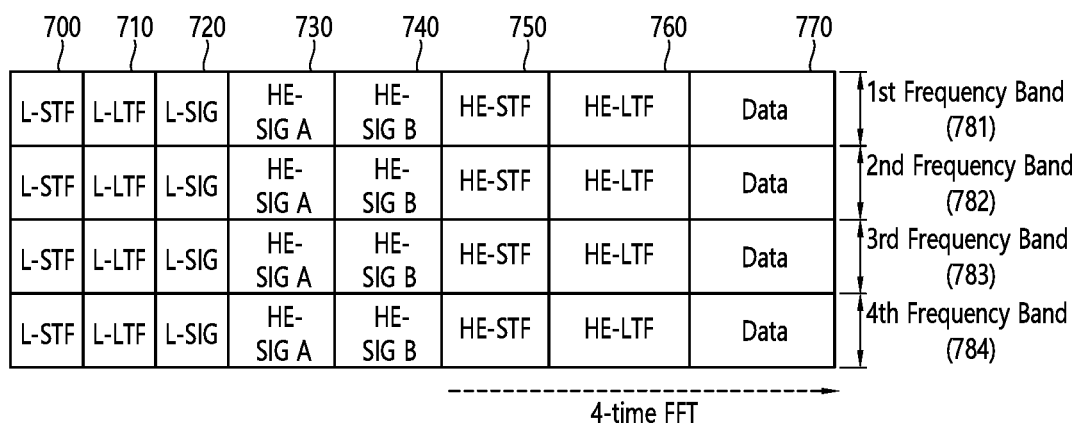
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment An HE-SIG-B 740 may be included only in the case of the PPDU for the multiple users (MUs) as described above. Principally, an HE-SIG-A 750 or an HE-SIG-B 760 may include resource allocation information (or virtual resource allocation information) for at least one receiving STA.

Figure 8:
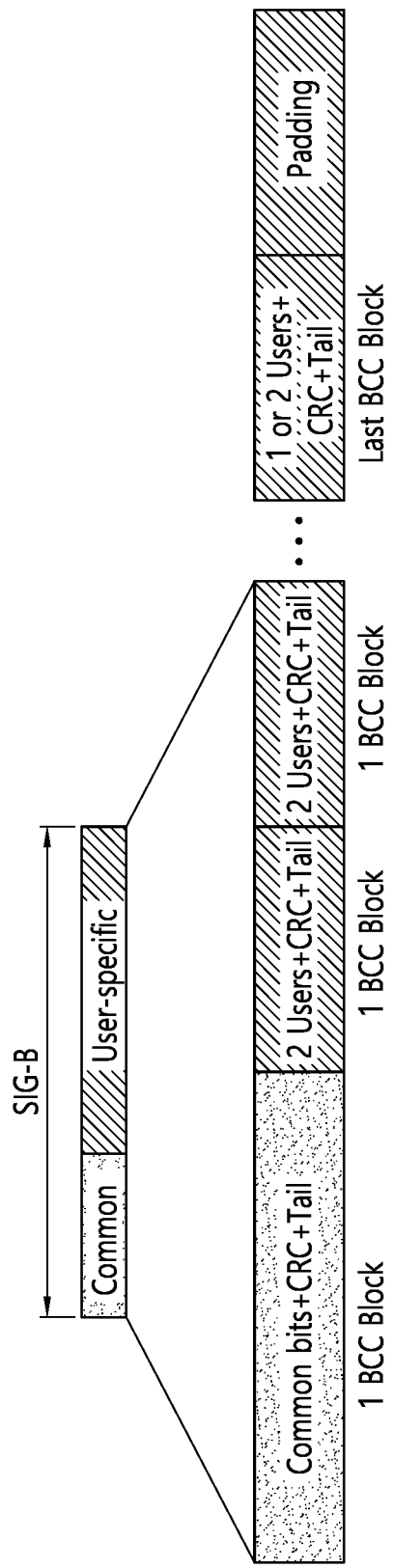
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at the frontmost part and the corresponding common field is separated from a field which follows behind thereof to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N(=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 ns and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (or or a frame) which the AP transmits to the STA may be expressed as a terms called downlink data (or a downlink frame) and data (or a frame) which the STA transmits to the AP may be expressed as a term called uplink data (or an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (or a MAC protocol data unit (MPDU)). The PPDU header may include a PHY header and a PHY preamble and the PSDU (or MPDU) may include the frame or indicate the frame (or an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (or the downlink frame and the downlink PPDU) to the plurality of respective STAs through the plurality of respective frequency resources on an overlapped time resource. The plurality of frequency resources may be a plurality of subbands (or sub channels) or a plurality of resource units (RUs). The DL MU OFDMA transmission may be used together with the DL MU MIMO transmission. For example, the DL MU MIMO transmission based on a plurality of space-time streams (or spatial streams) may be performed on a specific subband (or sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (or sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (or spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (or spatial streams) may be performed on a specific subband (or sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 9:
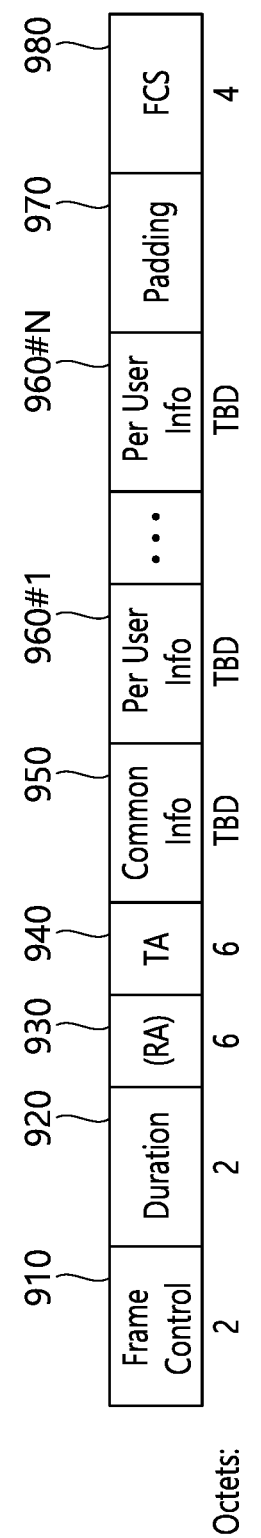
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

In addition, the RA field 930 may include address information of the receiving STA of a corresponding trigger frame, and may be optionally omitted. The TA field 940 includes address information of an STA (e.g., AP) for transmitting the trigger frame, and the common information field 950 includes common control information applied to the receiving STA for receiving the trigger frame.

Figure 10:
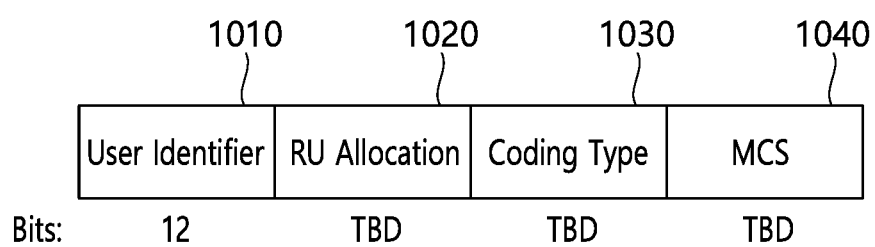
FIG. 10 illustrates an example of a sub-field included in each user information field.

FIG. 10 illustrates an example of a sub-field included in a per user information field. Some parts of the sub-field of FIG. 10 may be omitted, and extra sub-fields may be added. Further, a length of each of the sub-fields shown herein may change.

As shown in the drawing, the Length field 1010 may be given that same value as the Length field of the L-SIG field of the uplink PPDU, which is transmitted in response to the corresponding trigger frame, and the Length field of the L-SIG field of the uplink PPDU indicates the length of the uplink PPDU. As a result, the Length field 1010 of the trigger frame may be used for indicating the length of its respective uplink PPDU.

Additionally, a Cascade Indicator field 1020 indicates whether or not a cascade operation is performed. The cascade operation refers to a downlink MU transmission and an uplink MU transmission being performed simultaneously within the same TXOP. More specifically, this refers to a case when a downlink MU transmission is first performed, and, then, after a predetermined period of time (e.g., SIFS), an uplink MU transmission is performed. During the cascade operation, only one transmitting device performing downlink communication (e.g., AP) may exist, and multiple transmitting devices performing uplink communication (e.g., non-AP) may exist.

A CS Request field 1030 indicates whether or not the status or NAV of a wireless medium is required to be considered in a situation where a receiving device that has received the corresponding trigger frame transmits the respective uplink PPDU.

A HE-SIG-A information field 1040 may include information controlling the content of a SIG-A field (i.e., HE-SIG-A field) of an uplink PPDU, which is being transmitted in response to the corresponding trigger frame.

A CP and LTF type field 1050 may include information on a LTF length and a CP length of the uplink PPDU being transmitted in response to the corresponding trigger frame. A trigger type field 1060 may indicate a purpose for which the corresponding trigger frame is being used, e.g., general triggering, triggering for beamforming, and so on, a request for a Block ACK/NACK, and so on.

Meanwhile, the remaining description on FIG. 9 will be additionally provided as described below.

It is preferable that the trigger frame includes per user information fields 960#1 to 960#N corresponding to the number of receiving STAs receiving the trigger frame of FIG. 9. The per user information field may also be referred to as a "RU Allocation field".

Additionally, the trigger frame of FIG. 9 may include a Padding field 970 and a Sequence field 980.

It is preferable that each of the per user information fields 960#1 to 960#N shown in FIG. 9 further includes multiple sub-fields.

FIG. 10 illustrates an example of a sub-field being included in a per user information field. Among the sub-fields of FIG. 10, some may be omitted, and other additional sub-fields may also be added. Additionally, the length of each of the sub-fields shown in the drawing may be varied.

A User Identifier field 1010 indicates an identifier of an STA (i.e., receiving STA) to which the per user information corresponds, and an example of the identifier may correspond to all or part of the AID.

Additionally, a RU Allocation field 1020 may be included in the sub-field of the per user information field. More specifically, in case a receiving STA, which is identified by the User Identifier field 1010, transmits an uplink PPDU in response to the trigger frame of FIG. 9, the corresponding uplink PPDU is transmitted through the RU, which is indicated by the RU Allocation field 1020. In this case, it is preferable that the RU that is being indicated by the RU Allocation field 1020 corresponds to the RU shown in FIG. 4, FIG. 5, and FIG. 6.

The sub-field of FIG. 10 may include a Coding Type field 1030. The Coding Type field 1030 may indicate a coding type of the uplink PPDU being transmitted in response to the trigger frame of FIG. 9. For example, in case BBC coding is applied to the uplink PPDU, the Coding Type field 1030 may be set to '1', and, in case LDPC coding is applied to the uplink PPDU, the Coding Type field 1030 may be set to '0'.

Hereinafter, this specification proposes an example for improving a control field included in a PPDU. The control field improved by this specification includes a first control field, including control information necessary to interpret the PPDU, and a second control field including control information for demodulating the data field of the PPDU. The first and second control fields may be various fields. For example, the first control field may be the HE-SIG-A 730 shown in FIG. 7, and the second control field may be the HE-SIG-B 740 shown in FIGS. 7 and 8.

Hereinafter, a detailed example in which the first or second control field is improved is described.

In the following example, there is proposed a control identifier inserted into a first control field or a second control field. The size of the control identifier may be various, and may be implemented as -bit information, for example 1.

The control identifier (e.g., 1-bit identifier) may indicate whether a 242-RU is assigned if 20 MHz transmission is performed, for example. As shown in FIGS. 4 to 6, RUs having various sizes may be used. Such an RU may be basically divided into two types of RUs. For example, all the RUs shown in FIGS. 4 to 6 may be divided into a 26-type RU and a 242-type RU. For example, the 26-type RU may include a 26-RU, a 52-RU, and a 106-RU. The 242-type RU may include a 242-RU, a 484-RU, and RUs greater than them.

The control identifier (e.g., 1-bit identifier) may indicate that a 242-type RU has been used. That is, the control identifier may indicate that a 242-RU is included or a 484-RU or 996-RU is included. If a transmission frequency band in which a PPDU is transmitted is a 20 MHz band, a 242-RU is a single RU corresponding to the full bandwidth of a transmission frequency band (i.e., 20 MHz). Accordingly, the control identifier (e.g., 1-bit identifier) may indicate whether a single RU corresponding to the full bandwidth of the transmission frequency band is assigned.

For example, if a transmission frequency band is a 40 MHz band, the control identifier (e.g., 1-bit identifier) may indicate whether a single RU corresponding to the full bandwidth (i.e., 40 MHz band) of a transmission frequency band is assigned. That is, the control identifier may indicate whether a 484-RU is assigned for 40 MHz transmission.

For example, if a transmission frequency band is an 80 MHz band, the control identifier (e.g., 1-bit identifier) may indicate whether a single RU corresponding to the full bandwidth (i.e., 80 MHz band) of a transmission frequency band is assigned. That is, the control identifier may indicate whether a 996-RU is assigned for 80 MHz transmission.

Various technical effects can be achieved through the control identifier (e.g., 1-bit identifier).

First, if a single RU corresponding to the full bandwidth of a transmission frequency band is assigned through the control identifier (e.g., 1-bit identifier), assignment information of an RU may be omitted. That is, assignment information of an RU can be omitted because not a plurality of RUs, but only one RU is assigned to the full bandwidth of a transmission frequency band.

Furthermore, the control identifier may be used as signaling for a full bandwidth MU-MIMO. For example, if a single RU is assigned to the full bandwidth of a transmission frequency band, multiple users may be assigned to the corresponding single RU. That is, signals for respective users are not separated temporally and spatially, but signals for multiple users may be multiplexed with the same single RU using other schemes (e.g., space multiplexing). Accordingly, the control identifier (e.g., 1-bit identifier) may also be used to indicate whether the full bandwidth MU MIMO is used.

Figure 11:
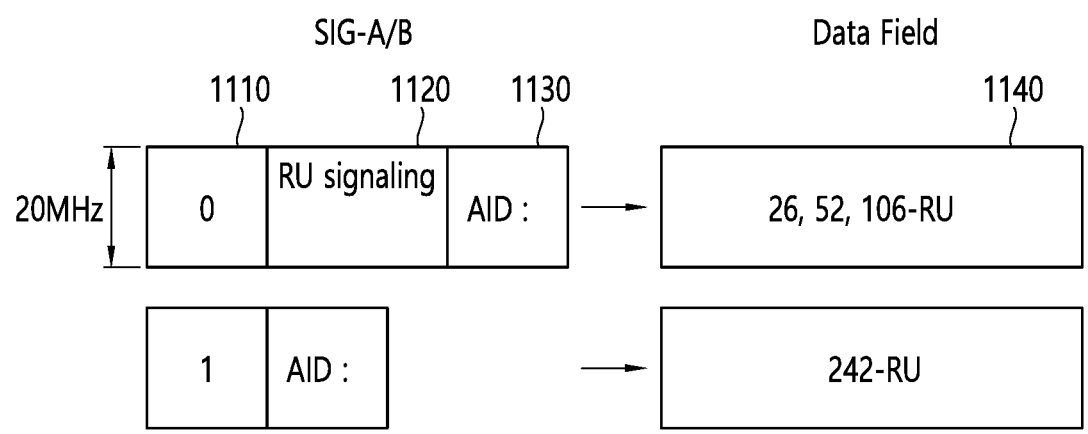
FIG. 11 is a block diagram illustrating an example of a control field and a data field configured according to the present embodiment.

FIG. 11 is a block diagram illustrating an example of a control field and a data field configured according to the present embodiment.

A left block of FIG. 11 shows information included in the first and/or second control field of a PPDU, and a right block of FIG. 11 shows information included in the data field of the PPDU. The PPDU related to FIG. 11 may be a PPDU for a multi-user, that is, a plurality of reception apparatuses. Specifically, the PPDU may have a different field structure for multiple users and a single user. The example of FIG. 11 may be a PPDU for a multi-user.

The example of FIG. 11 has been illustrated as being used for 20 MHz transmission, but the bandwidth of a transmission frequency band is not limited and may be applied to 40 MHz, 80 MHz or 160 MHz transmission.

As shown in the left block of FIG. 11, the control identifier (e.g., 1-bit identifier) may be included in the first and/or second control field. For example, if the control identifier 1110 is included in a first control field, information on assignment information 1120 for an RU may be included in a second control field. Furthermore, the identification information 1130 of a reception apparatus that receives the PPDU of FIG. 11 may be included in the second control field. The identification information 1130 of the reception apparatus may indicate that a data field 1140 corresponding to the second control field has been assigned to which reception apparatus, and may be implemented as an AID, for example.

As shown in FIG. 11, assignment information for an RS may be omitted from the second control field depending on a control identifier (e.g., 1-bit identifier). For example, if a control identifier is set to "1", the assignment information 1120 for an RU may be omitted from the second control field, and the identification information 1130 of a reception apparatus may be included. Furthermore, if the control identifier is set to "0", the assignment information 1120 for an RU may be included in the second control field, and the identification information 1130 of a reception apparatus may also be included in the second control field.

The assignment information 1120 of an RU of FIG. 11 may be included in the common field of SIG-B shown in FIG. 8. The identification information 1130 of FIG. 11 may be included in the user-specific field of SIG-B shown in FIG. 8.

Additionally, referring to FIG. 11, RU signaling information for a user or common information, such as stream assignment-related information, may be included in the common field of SIG-B. The common field may include common information for all users that receive the PPDU of FIG. 11. If the assignment information 1120 for an RU is omitted, there is a technical effect in that overhead is reduced.

According to another example, if 20 MHz transmission is used, to assign a 242-RU may be considered to be single user (SU) transmission, and thus the control identifier (e.g., 1-bit identifier) may be omitted. In this case, an operation may be different depending on the first control field (e.g., HE-SIG-A) SU/MU identification field. That is, if an SU/MU identification field included in a first control field indicates MU transmission, there may be an example in which the control identifier is omitted and only an RU of a 26-type is assigned.

Hereinafter, another example of the present embodiment is described.

Figure 12:
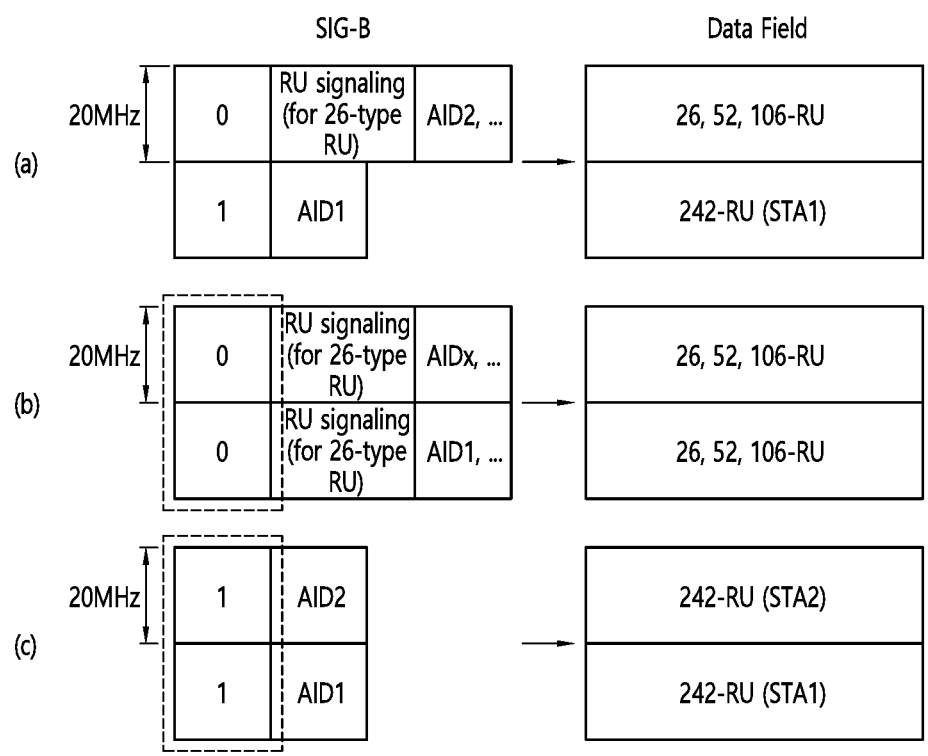
FIG. 12 shows an example of the present embodiment for 40 MHz transmission.

FIG. 12 shows an example of the present embodiment for 40 MHz transmission.

A left block of FIG. 12 shows information corresponding to a first and/or second control field. Hereinafter, for convenience of description, it is described that the left block of FIG. 12 corresponds to a second control field (i.e., SIG-B) and a right block of FIG. 12 corresponds to the data field of a PPDU.

As shown, each of the control field and the data field corresponds to a 20 MHz band.

In the example of FIG. 12, if the control identifier (e.g., 1-bit identifier) is set to "1", assignment information for an RU may be omitted. In the example of FIG. 12, the control identifier (e.g., 1-bit identifier) may indicate whether a 242-RU (or 242-type RU) is used.

Referring to FIG. 12, the control identifier is included in the front part of the common field of SIG-B. In the example of FIG. 12, the control identifier may be called a "242 unit bitmap." What RU assignment information may be omitted depending on the "242 unit bitmap" is the same as that of FIG. 11 and is the same as that an overhead reduction effect occurs.

If only a 242-RU is assigned in a channel of full 40 MHz, the "242 unit bitmap" may be set to "1." Referring to a sub-figure (b) of FIG. 12, if only a 26-type RU is assigned in the 40 MHz channel, the "242 unit bitmap" may be set to "00." Referring to a sub-figure (c) of FIG. 12, if only a 242-RUs is assigned in the 40 MHz channel, the "242 unit bitmap" may be set to "11." Since the last symbol of the SIG-B part needs to be aligned with the longest SIGB symbol of a 20 MHz channel, an overhead reduction effect is reduced if RU assignment information is omitted from any one 20 MHz channel. Accordingly, if only a 242-RU is assigned in all 20 MHz channels, there may be an example in which the "242 unit bitmap" is set to "1."

Hereinafter, in an example, another example of the control identifier (e.g., 1-bit identifier) is proposed. Specifically, there is proposed an example in which the control identifier is divided into two identifiers. That is, there are proposed a first identifier indicating whether a 242-type RU is assigned to each 20 MHz channel and a second identifier indicating whether a 484-RU (or a 242-type RU having a different size) is assigned in a corresponding 20 MHz channel.

Furthermore, there is proposed an improved example related to a frequency mapping relation between the second control field (i.e., SIG-B) and the data field. An additional example related to frequency mapping between the second control field (i.e., SIG-B) and the data field may also be applied to the example (i.e., the example of FIG. 11 or FIG. 12), but the example of FIG. 13 is chiefly described below, for convenience of description.

Figure 13:
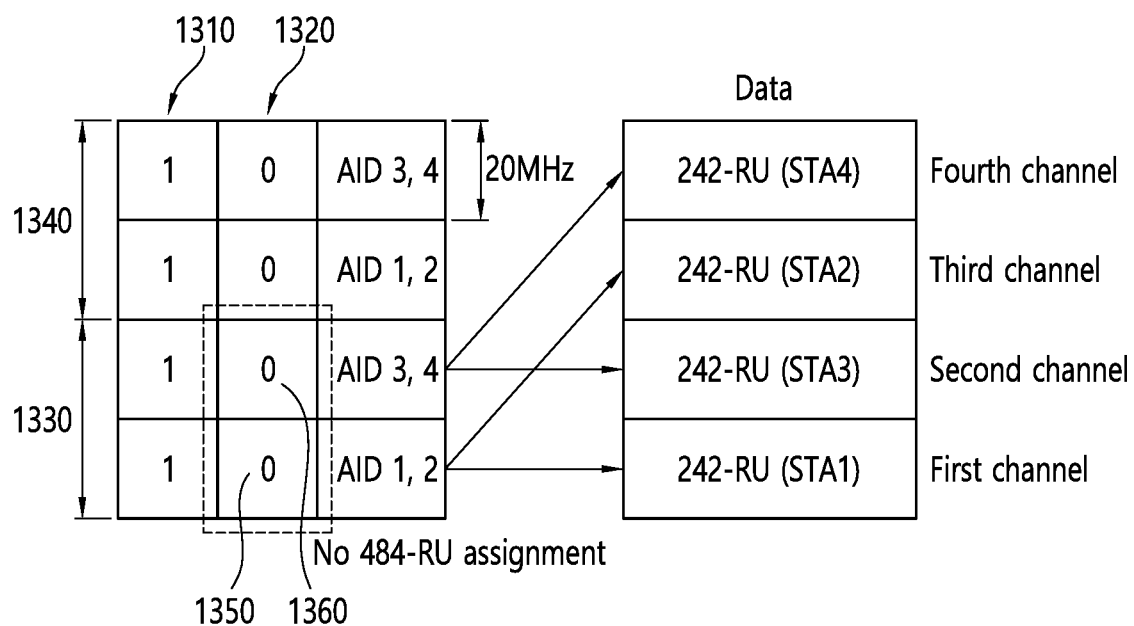
FIG. 13 shows an example in which this specification is applied to 80 MHz transmission.

FIG. 13 shows an example in which this specification is applied to 80 MHz transmission.

In the example of FIG. 13, a first identifier 1310 is configured every 20 MHz channel. That is, four 1-bit identifiers indicating whether a 242-type RU is assigned may be inserted every 20 MHz channel. In this case, since a 484-RU may be assigned within an 80 MHz band, an additional identifier, that is, a second identifier 1320 indicating whether a specific 20 MHz channel (i.e., 242 chunk) is used for a 242-RU or a 484-RU may be additionally included. If both the first and second identifiers are used, a total of 8-bit information may be used for the first/second identifier in the 80 MHz band.

The first and second identifiers may also be indicated as a "242 unit bitmap" and a "484 unit assignment indication field." The first and second identifiers may be implemented as a field of 2 bits. For example, if a second identifier 1350 corresponding to a first channel and a second identifier 1360 corresponding to a second channel are set to "00", a 484-RU is not assigned in a corresponding PPDU. For example, if the first and second identifiers are set to "1" and "0", this may indicate that assignment is performed using only a 242-RU.

The example of FIG. 13 is an example related to the first identifier 1310 and the second identifier 1320. However, an example related to a frequency mapping relation between the second control field (i.e., SIG-B) and the data field may be additionally applied.

Specifically, the second control field (i.e., SIG-B) may be configured separately every 20 MHz channel. However, this specification proposes an example in which low two 20 MHz channels 1330 and upper two 20 MHz channels 1340 are independently configured. Specifically, there is proposed an example in which SIG-B corresponding to upper or lower two 20 MHz channels is configured and duplicated and used for the remaining two 20 MHz channels.

In this specification, all or some of the proposed fields, for example, SIG-B may be configured according to a duplication method. For example, if four 20 MHz channels shown in the example of FIG. 13 are sequentially divided into first to fourth channels from the bottom, the contents of SIG-B included in the first and second channels may be the same as those of SIG-B included in the third and fourth channels. Furthermore, as shown, in the SIG-B corresponding to the second channel, an AID3 corresponding to an STA3 is first indicated, and an AID corresponding to an STA4 is then indicated as 4. Accordingly, in the SIG-B corresponding to the second channel, the STA3 may be assigned to a data field corresponding to the second channel, and the STA4 may be assigned to a data field corresponding to the fourth channel. That is, in the SIG-B corresponding to the second channel, STA identification information related to the data field corresponding to the second channel may be first indicated. STA identification information related to the data field corresponding to the fourth channel may be indicated.

Furthermore, referring to FIG. 13, the SIG-B corresponding to the first channel may indicate the data field corresponding to the first channel, may indicate an STA (i.e., the STA 1) assigned to the data field corresponding to the first channel, may indicate the data field corresponding to the third channel, and may indicate an STA (i.e., the STA 2) assigned to the data field corresponding to the third channel. That is, the SIG-B included in the first channel may indicate STA identification information related to the data field corresponding to the first channel and STA identification information related to the data field corresponding to the third channel.

Figure 14:
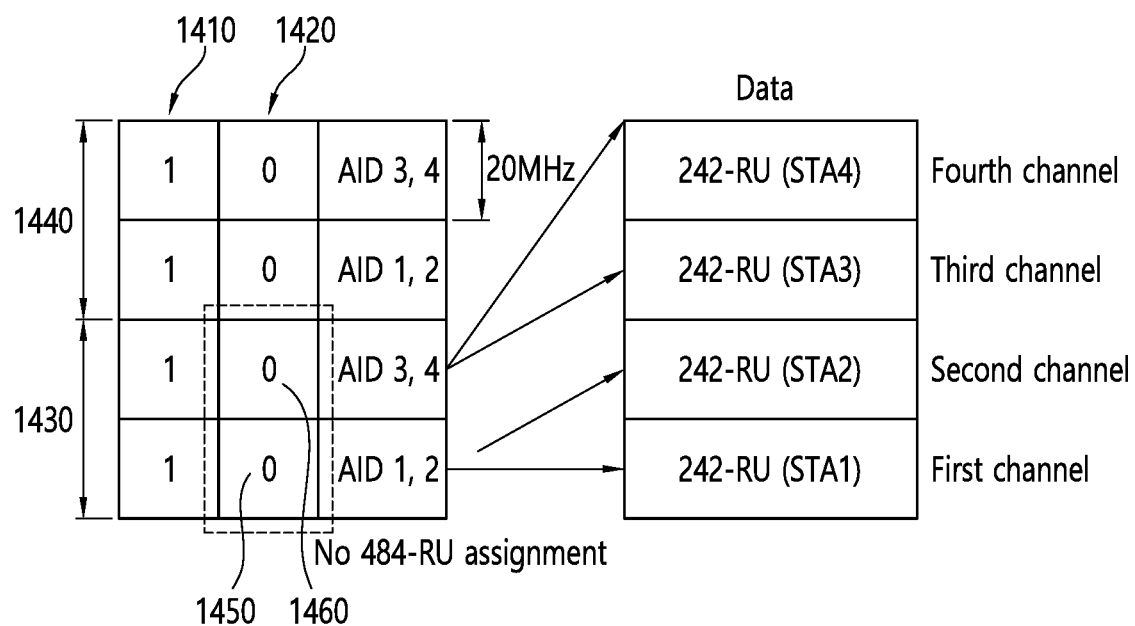
FIG. 14 shows an example in which a control signal is modified according to this specification.

FIG. 14 shows an example in which a control signal is modified according to this specification.

Referring to FIG. 14, a first identifier 1410 is included in the foremost of an SIG-B field corresponding to each 20 MHz, and a second identifier 1420 is then included.

The first/second identifier of FIG. 14 may be used identically with the first/second identifier of FIG. 13. Furthermore, like the example of FIG. 13, the example of FIG. 14 may have a preset mapping relation between SIG-B and a data field. However, unlike in the example of FIG. 13, in the example of FIG. 14, SIG-B corresponding to a first channel is mapped to a data field corresponding to the first/second channel, and SIG-B corresponding to the second channel is mapped to a data field corresponding to a third/fourth channel.

Figure 15:
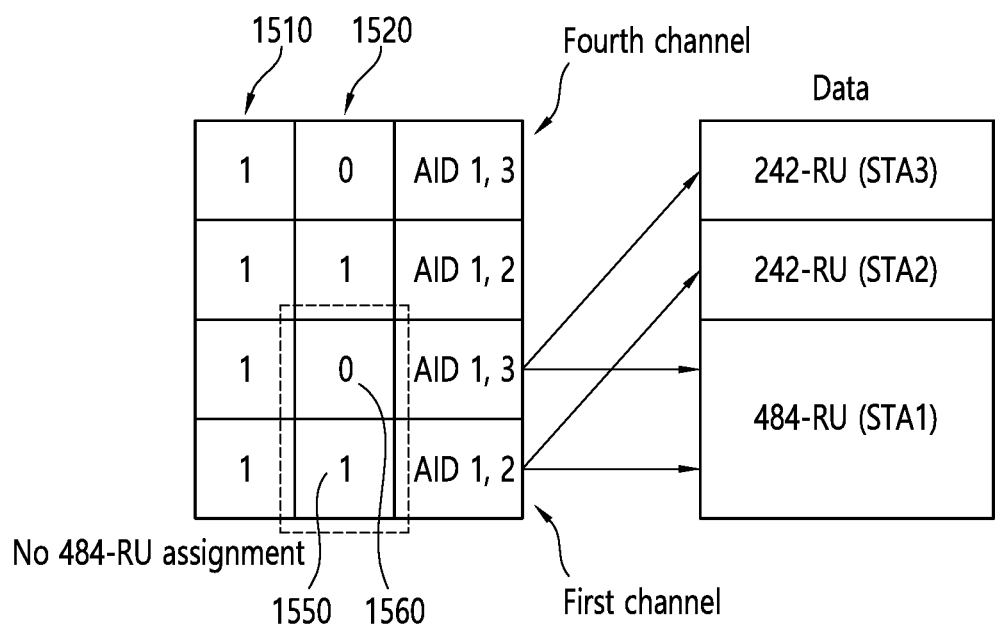
FIG. 15 shows an additional example of a control signal according to this specification.

FIG. 15 shows an additional example of a control signal according to this specification.

Referring to FIG. 15, a first identifier 1510 is included in the foremost of an SIG-B field corresponding to each 20 MHz, and a second identifier 1520 is then included. A first/second identifier according to the example of FIG. 15 may correspond to the first/second identifier of FIG. 13 and/or FIG. 14.

As shown in FIG. 15, part of or the entire information of the SIG-B field corresponding to a first/second channel may be duplicated on a third/fourth channel. That is, as shown in FIG. 15, the SIG-B fields corresponding to the first/second channels indicate {AID1, 2} and {AID1, 3}. The SIG-B fields corresponding to the third/fourth channels may also indicate {AID1, 2} and {AID1, 3}.

Referring to FIG. 15, a second identifier 1550 corresponding to the first channel indicates "1", and a second identifier 1560 corresponding to the second channel indicates "0." This indicates that a 484-RU is assigned to the first/second channel and a 484-RU is not assigned to the third/fourth channel. In the example of FIG. 15, all the first identifiers 1510 are set to "1." As a result, in the data field of FIG. 15, a 484-RU is assigned to the first/second channel, a 242-RU is assigned to the third channel, and a 242-RU is also assigned to the fourth channel.

Other characteristics of the example of FIG. 15 are the same as those of the examples of FIGS. 13 and 14.

Figure 16:
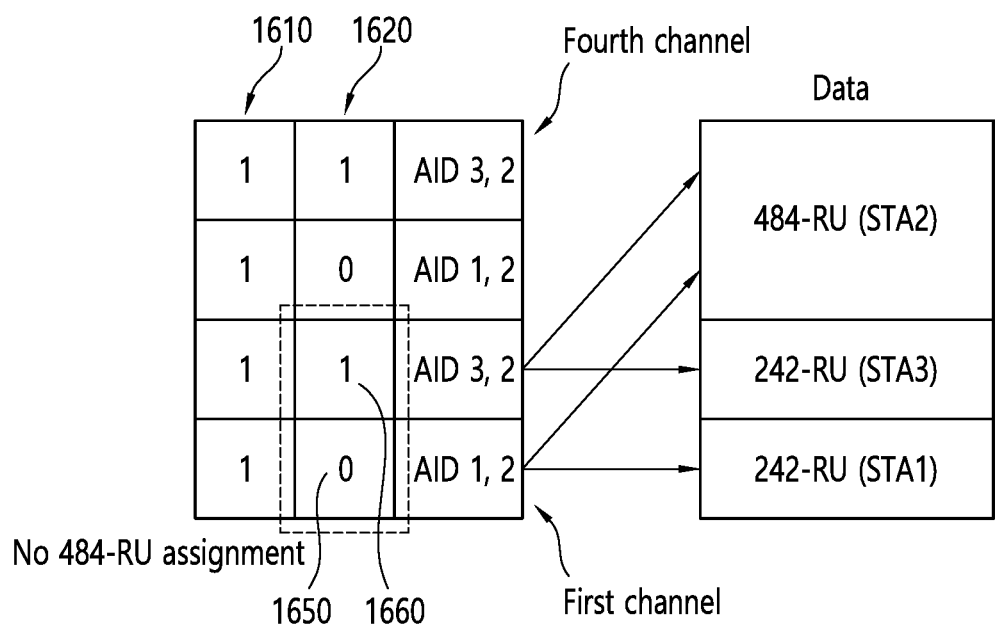
FIG. 16 shows an example in which a control signal and a frequency mapping relation are modified according to this specification.

FIG. 16 shows an example according to this specification.

Referring to FIG. 16, a first identifier 1610 is included in the foremost of an SIG-B field corresponding to each 20 MHz, and a second identifier 1620 is then included.

As shown in FIG. 16, part of or the entire information of the SIG-B field corresponding to a first/second channel may be duplicated on a third/fourth channel. That is, as shown in FIG. 16, the SIG-B fields corresponding to the first/second channels indicate {AID1, 2} and {AIDS, 2}. The SIG-B fields corresponding to the third/fourth channels may also indicate {AID1, 2} and {AIDS, 2}.

Referring to FIG. 16, a second identifier 1650 corresponding to the first channel indicates "0", and a second identifier 1660 corresponding to the second channel indicates "1." This indicates that a 484-RU is not assigned to the first/second channel and a 484-RU is assigned to the third/fourth channel. In the example of FIG. 16, all the first identifiers 1610 are set to "1." As a result, in the data field of FIG. 16, a 242-RU is assigned to the first/second channel, and a 484-RU is assigned to the third/fourth channel.

Other characteristics of the example of FIG. 16 are the same as those of the examples of FIGS. 13 to 15.

Figure 17:
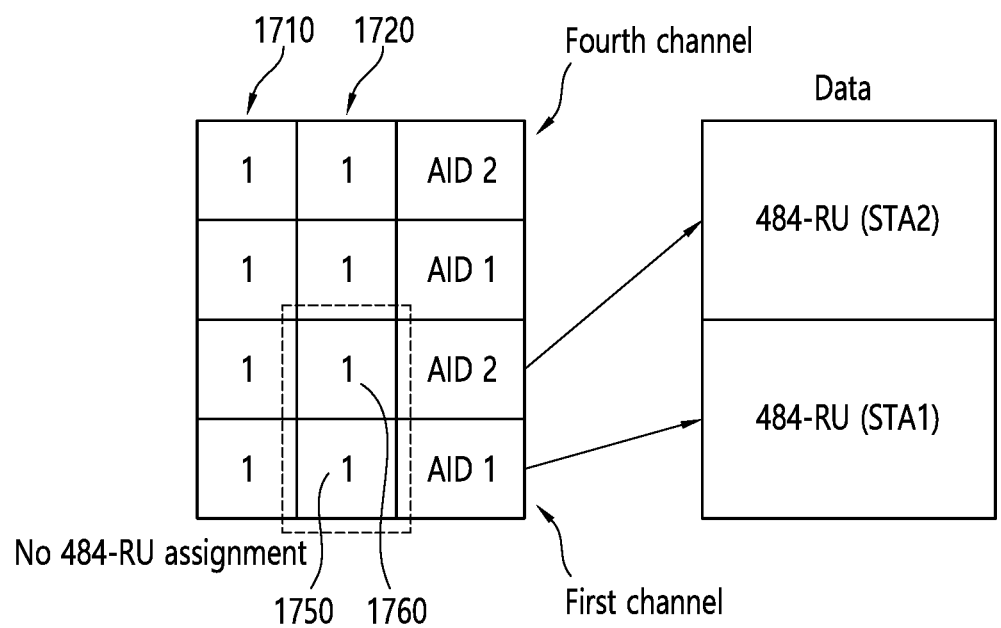
FIG. 17 shows an example in which a control signal and a frequency mapping relation are modified according to this specification.

FIG. 17 shows another example according to this specification.

Referring to FIG. 17, a first identifier 1710 is included in the foremost of an SIG-B field corresponding to each 20 MHz, and a second identifier 1720 is then included.

As shown in FIG. 17, part of or the entire information of the SIG-B field corresponding to a first/second channel may be duplicated on a third/fourth channel. That is, as shown in FIG. 17, the SIG-B fields corresponding to the first/second channels indicate {AID1} and {AID2}. The SIG-B fields corresponding to the third/fourth channels may also indicate {AID1} and {AID2}.

Referring to FIG. 17, a second identifier 1750 corresponding to the first channel indicates "1", and a second identifier 1760 corresponding to the second channel indicates "1." This indicates that a 484-RU is assigned to the first/second channel and a 484-RU is also assigned to the third/fourth channel.

Other characteristics of the example of FIG. 17 are the same as those of the examples of FIGS. 13 to 16.

Figure 18:
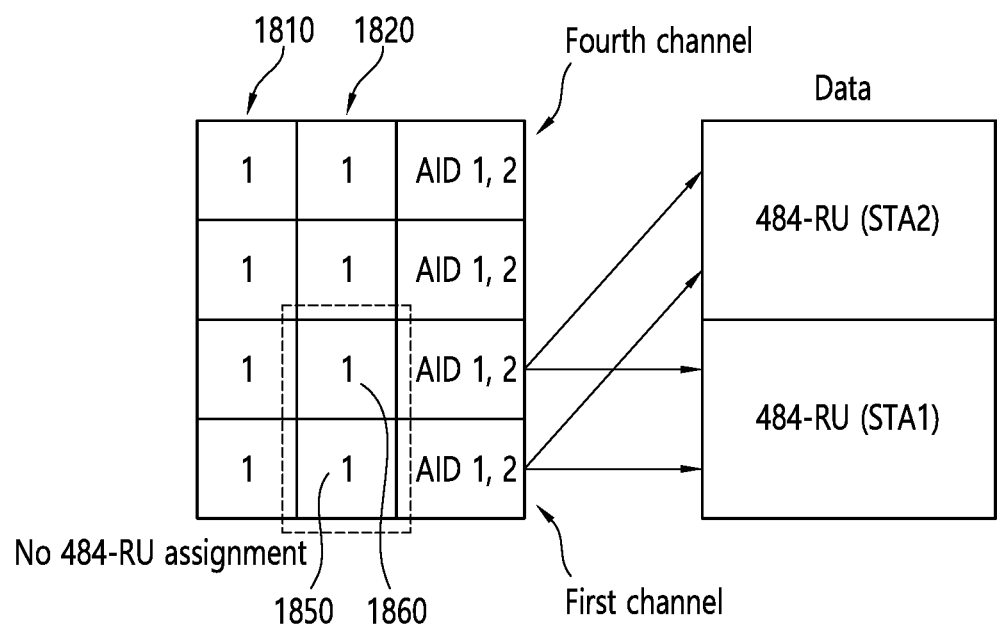
FIG. 18 shows an additional example of a control signal and frequency mapping relation according to this specification.

FIG. 18 shows another example according to this specification.

Referring to FIG. 18, a first identifier 1810 is included in the foremost of an SIG-B field corresponding to each 20 MHz, and a second identifier 1820 is then included.

As shown in FIG. 18, part of or the entire information of the SIG-B field corresponding to a first/second channel may be duplicated on a third/fourth channel. That is, as shown in FIG. 18, the SIG-B fields corresponding to the first/second channels indicate {AID1, 2} and {AID1, 2}. The SIG-B field corresponding to the third/fourth channels may also indicate {AID1, 2} and {AID1, 2}.

Referring to FIG. 18, a second identifier 1850 corresponding to the first channel indicates "1", and a second identifier 1860 corresponding to the second channel indicates "1." This indicates that a 484-RU is assigned to the first/second channel and a 484-RU is also assigned to the third/fourth channel.

Other characteristics of the example of FIG. 18 are the same as those of the examples of FIGS. 13 to 17.

Figure 19:
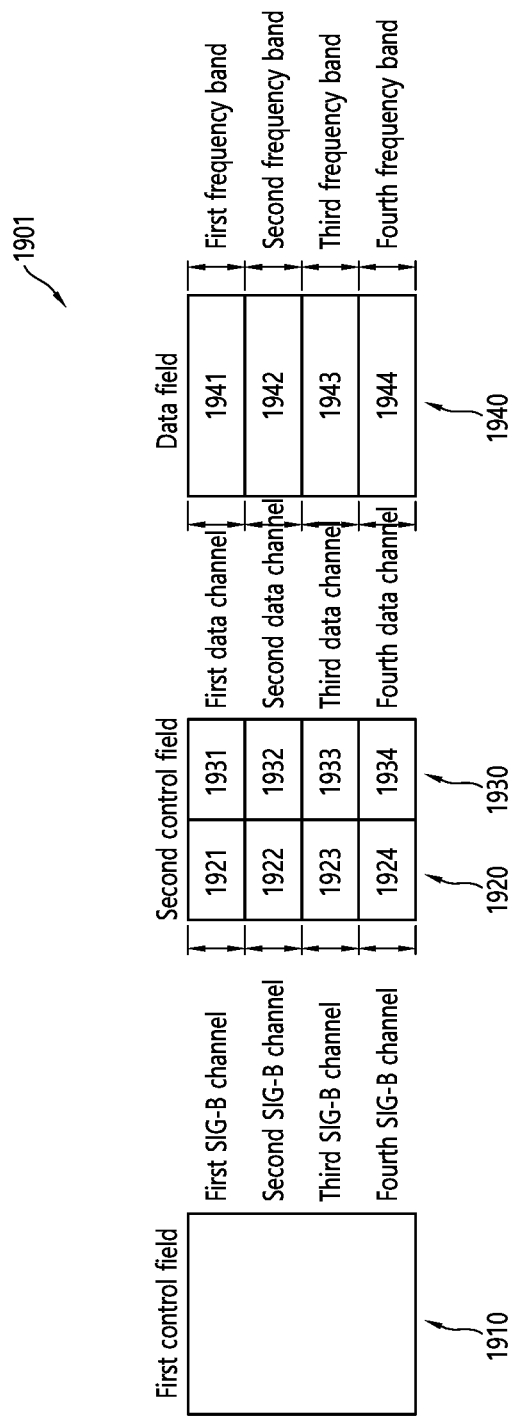
FIG. 19 is a diagram showing the relation between SIG-A, SIG-B and a data field according to the present embodiment.

FIG. 19 is a diagram showing the relation between SIG-A, SIG-B and a data field according to the present embodiment. The example of FIG. 19 is contents in which the contents are indicated on a single PPDU.

A PPDU 1901 of FIG. 19 may include all or some of the fields shown in FIG. 7. Specifically, as shown, the PPDU 1901 may include a first control field 1910, second control fields 1920 and 1930, and a data field 1940. The first control field 1910 may correspond to an SIG-A or HE-SIG A, and the second control field 1920 may correspond to an SIG-B or HE-SIG B.

The first control field 1910 may include the HE-SIG A 730 of FIG. 7 and the technical characteristics shown in FIGS. 11 to 18. Specifically, the first control field 1910 may include control information for the interpretation of the PPDU 1901. For example, as described in the example of FIG. 7, the first control field 1910 may include a sub field (indicates 20 MHz, 40 MHz, 80 MHz, 160 MHz, etc.) indicating a transmission frequency band in which the PPDU 1901 is transmitted.

Furthermore, the first control field 1910 may include the control identifier (e.g., the first identifier and/or the second identifier) described in FIGS. 11 to 18. Specifically, the first control field 1910 may include a 1-bit identifier indicating whether a single RU corresponding to the full bandwidth of a transmission frequency band is assigned. If the control identifier (e.g., 1-bit identifier) of the first control field 1910 is set to "1", this indicates that a single RU corresponding to the full bandwidth of a transmission frequency band is assigned. That is, if a transmission frequency band is a 20 MHz band, this indicates that a single 242-RU is assigned. For example, if a transmission frequency band is an 80 MHz band, this indicates that a single 996-RU is assigned. Meanwhile, as described above, the 1-bit identifier has a technical effect in that signaling for full bandwidth MU MIMO can be performed.

If the example of FIG. 19 is applied to 80 MHz transmission, the first control field 1910 may be included in the PPDU 1901 in such a way as to be duplicated according to a transmission frequency band after it is generated in a 20 MHz unit. That is, the first control field 1910 may be generated in a 20 MHz unit and may be duplicated to be suitable for an 80 MHz band.

The second control field may correspond to the HE-SIG B field, including the common field and a user-specific field, shown in FIG. 8. That is, the second control field may include a common field 1920 and a user-specific field 1930. As described above, the common field of SIG-B 1920 may include common information, such as RU assignment information for a user. For example, the common field of SIG-B 1920 may include RU assignment information having a look-up table form including specific n-bit mapping information. The RU assignment information may indicate arrangement or assignment information of an RU applied to the corresponding data field 1940. That is, as in FIGS. 4 to 6, the RU assignment information may indicate a structure in which a plurality of RUs is arranged. All STAs that have received the common field 1920 of the second control field may identify that the corresponding data field 1940 is configured with which RU.

In summary, in general, the second control field includes assignment information for a resource unit (RU) through the common field 1920. However, if a control identifier (e.g., 1-bit identifier) included in the first control field 1910 is set to "1", assignment information for an RU may be omitted. That is, the common field 1920 may be omitted. If the control identifier is set to "1", only one RU is used. Accordingly, the common field 1920 may be omitted because assignment information for an RU does not need to be separately configured. In other words, if a control identifier (e.g., 1-bit identifier) included in the first control field 1910 is set to "0", the common field 1920 of the second control field may include assignment information for a resource unit (RU). If a control identifier (e.g., 1-bit identifier) included in the first control field 1910 is set to "1", the common field 1920 of the second control field may not include assignment information for a resource unit (RU).

The second control fields 1920 and 1930 are used for the demodulation of the data field 1940. In this case, the second control field and the data field 1940 may have a mapping relation, such as that shown in FIGS. 13 to 18.

For example, if the example of FIG. 19 is related to 80 MHz transmission, the second control field may correspond to first to fourth SIG-B channels. That is, the second control field may be divided into four 20 MHz short channels.

In this case, the contents of second control fields 1921 and 1931 corresponding to a first SIG-B channel may be the same as the contents of second control fields 1923 and 1933 corresponding to a third SIG-B channel. In other words, in the PPDU 1901, a part of the second control field may be duplicated. The duplication of the second control field may be implemented in various manners.

For convenience of description, the four second control fields corresponding to the first to fourth SIG-B channels may be called first, second, third, and fourth signal fields. In this case, the second signal fields 1922 and 1932 may be duplicated to configure the fourth signal fields 1924 and 1934. That is, the contents of the second control fields 1922 and 1932 corresponding to the second SIG-B channel may be the same as the contents of the second control fields 1924 and 1934 corresponding to the fourth SIG-B channel.

If such duplication is performed, the first signal fields 1921 and 1931 may correspond to the data field 1941 of a first data channel and the data field 1943 of a third data channel. Furthermore, the second signal fields 1922 and 1932 may correspond to the data field 1942 of a second data channel and the data field 1944 of a fourth data channel.

In other words, the common field 1921 included in the first signal fields 1921 and 1931 may indicate assignment information related to an RU applied to the data field 1941 of the first data channel and assignment information related to an RU applied to the data field 1943 of the third data channel. In this case, the assignment information related to an RU applied to the data field 1941 of the first data channel is inserted into the first signal fields 1921 and 1931 in the form of one BCC block. One BCC block for the data field 1943 of the third data channel is then inserted.

Furthermore, the user-specific field 1931 included in the first signal fields 1921 and 1931 may include identification information (e.g., AID) of an STA assigned to the data field 1941 of the first data channel and identification information (e.g., AID) of an STA assigned to the data field 1943 of the third data channel. In this case, after two BCC blocks are inserted into the first signal fields 1921 and 1931, a BCC block for an STA assigned to the data field 1941 of the first data channel is inserted. Thereafter, a BCC block for an STA assigned to the data field 1943 of the third data channel is inserted.

In FIG. 19, frequency bands in which the second control fields 1920 and 1930 are transmitted have been indicated as four "SIG-B channels", and frequency bands in which the data field 1940 is transmitted have been indicated as four "data channels." However, each SIG-B channel and each data channel may be understood as corresponding to the four frequency band described in FIG. 7. That is, as described in the example of FIG. 7, each boundary surface of a data channel and each boundary surface of an SIG-B channel may not be perfectly matched. This is described based on a corresponding 20 MHz frequency band. The second control field 1921, 1931 corresponding to the first frequency band corresponds to two data fields 1941 and 1943 corresponding to the first/third frequency band. Furthermore, the second control field 1922, 1932 corresponding to the second frequency band corresponds to two data fields 1942 and 1944 corresponding to the second/the fourth frequency band.

Figure 20:
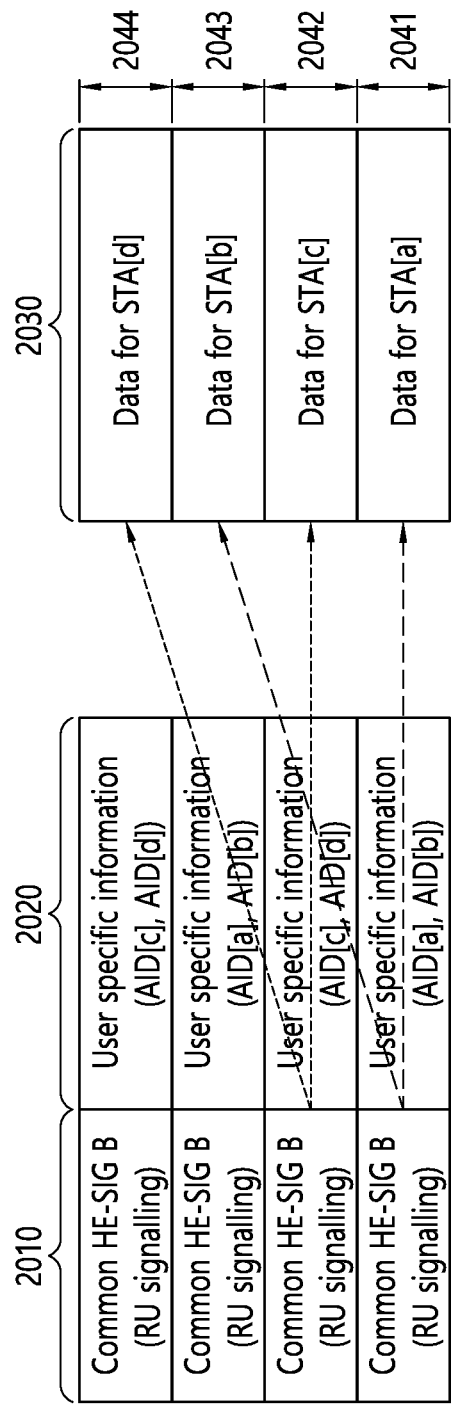
FIG. 20 is a diagram showing an example of SIG-B used for 80 MHz transmission.

FIG. 20 is a diagram showing an example of SIG-B used for 80 MHz transmission.

The example of FIG. 20 proposes a further materialized example of the example of FIG. 19. As shown in FIG. 20, SIG-B includes a common field 2010 and a user-specific field 2020. Furthermore, the common fields 2010 and user-specific fields 2020 of the SIG-Bs include four fields corresponding to four frequency bands 2041, 2042, 2043, and 2044 corresponding to 20 MHz channels, respectively. In FIG. 20, the four divided SIG-B fields may be called various names, such as first to fourth signal fields.

If SIG-B fields are divided in a 20 MHz band unit as in FIG. 20, the SIG-B corresponding to the first frequency band 2041 is mapped to the data fields of the first and third frequency bands, and the SIG-B corresponding to the second frequency band 2042 is mapped to the data fields of the second and fourth frequency bands. Furthermore, the SIG-B corresponding to the first frequency band 2041 may be duplicated to configure the SIG-B corresponding to the third frequency band 2043. The SIG-B corresponding to the second frequency band 2042 may be duplicated to configure the SIG-B corresponding to the fourth frequency band 2044.

Referring to FIG. 20, the common field corresponding to the first frequency band 2041 includes an RU signalling field, which is used for the data fields corresponding to the first and third frequency bands. The RU signalling field shown in FIG. 20 may be configured with a single look-up table based on 20 MHz. The common field corresponding to the first frequency band 2041 corresponds to data fields corresponding to two frequency bands, so two RU signalling fields may be transmitted simultaneously. The first field of the two RU signalling fields indicates the data field corresponding to the first frequency band 2041, and the second field thereof indicates the data field corresponding to the third frequency band 2043.

The same technical characteristics is also applied to the SIG-B corresponding to the second frequency band 2042. That is, the SIG-B corresponding to the second frequency band 2042 may include two RU signalling fields for data fields corresponding to the second and fourth frequency bands 2042 and 2044.

Two RU signaling fields are not independently present, but may correspond to one unified look-up table. That is, two RU signaling fields may be designed to indicate the assignment of discontiguous 40 MHz.

As described above, the SIG-Bs corresponding to the first and the third frequency bands may be duplicated on the second and fourth frequency bands.

The example may be modified in various ways. For example, additional technical characteristics to be described later may be applied to the RU lookup table and the RU signalling field.

For example, RUs corresponding to a 20 MHz band may be configured as a combination of 26-RU, 52-RU, 106-RU (or 242-RU, aggregated 484-RU or 996-RU). In this case, if the number of combinations is 32 or less, an RU lookup table may be configured through 5-bit information. In this case, if a MU-MIMO scheme is determined to be used for a 106-RU or more RUs, the assignment of approximately 12 106-RUs is present. That is, if a MU-MIMO indicator (i.e., MU-MIMO field) of 3 bits or 4 bits is additionally used, 1) information related to a combination of RUs and 2) information related to an RU to which MU-MIMO for 20 MHz can be signaled.

In this case, the signal related to the MU-MIMO scheme may be materialized as follows.

For example, if a 106-RU is included in a combination of RUs indicated by 5-bit information, a 3-bit or 4-bit MU-MIMO indicator (i.e., MU-MIMO field) may be materialized as follows.

1) 3-bit MU-MIMO indicator: this may indicate a total of 8 user STAs that may be multiplexed with a 106-RU. For example, a total number of users may be indicated. Specifically, if the 3-bit MU-MIMO indicator is "000", it may indicate that one user has been multiplexed with a corresponding 106-RU according to the MU-MIMO scheme. If the 3-bit MU-MIMO indicator is "111", it may indicate that a total of 8 user STAs have been multiplexed with a corresponding 106-RU according to the MU-MIMO scheme. That is, this may indicate that the MU-MIMO scheme has been applied and the number of user STAs multiplexed according to the MU-MIMO scheme simultaneously.

For example, if two 106-RUs are included in a combination of RUs indicated by 5-bit information, the MU-MIMO indicator (i.e., MU-MIMO field) may be materialized as follows.

2) 4-Bit MU-MIMO Indicator

First, the 4-bit MU-MIMO indicator may indicate a user STA multiplexed with each 106-RU by 2 bits. In this case, a combination of the number of users that may be multiplexed with each 106-RU may be limited, and may be configured as follows, for example.

a) 2 bits for the first 106-RU may indicate four user STA, and 2 bits for the second 106-RU may indicate four user STA.

b) A combination of user STAs that may be assigned to each 106-RU may be indicated using the number of 16 cases that may be represented using 4-bit information.

E.g. (2,6), (4,4), (8,8), . . .

A combination of user STAs that may be assigned to each 106-RU may be indicated using the number of 16 cases that may be represented using 3-bit information.

E.g. (2,6), (4,4), (8,8) . . .

A PPDU that is used in the IEEE standard is described as a PPDU structure being transmitting mainly within a channel bandwidth of 20 MHz. A PPDU structure that is transmitted within a bandwidth (e.g., 40 MHz, 80 MHz) that is wider than the channel bandwidth of 20 MHz may correspond to a structure applying linear scaling of the PPDU structure being used in the channel bandwidth of 20 MHz.

The PPDU that is used in the IEEE standard is generated based on a 64 Fast Fourier Transform (FFT), and a cyclic prefix (CP) portion may correspond to ¼. In this case, the length of a valid (or effective) symbol section (or FFT section) may be equal to 3.2 us, a CP length may be equal to 0.8 us, and a symbol duration may be equal to 4 us (=3.2 us+0.8 us), which corresponds to/is related with a sum of the length of the valid symbol section and the CP length.

A wireless network is ubiquitous, and the wireless network is generally installed indoors but is also often installed outdoors. The wireless network transmits and receives information by using diverse techniques. For example, although the wireless network will not be limited only to this, two of the most broadly supplied techniques that are used for communication correspond to an IEEE 802.11n standard and an IEEE 802.11ac standard, which follow the IEEE 802.11 standard.

The IEEE 802.11 standard designates a common Medium Access Control (MAC) layer, which provides diverse functions for operating the IEEE 802.11 based wireless LAN (WLAN). The MAC layer controls access of shared radio, and, by using a protocol that enhances communication through a radio medium, the MAC layer manages and maintains communication between IEEE 802.11 stations (e.g., a wireless network card (NIC) of a personal computer (PC), another wireless device or stations (STA), and an access point (AP)).

As the next new product of the 802.11ac, IEEE 802.11ax was proposed in order to enhance efficiency of a WLAN network, most particularly, in high-density regions, such as public hotspots and other high-traffic regions. Additionally, the IEEE 802.11 may also use orthogonal frequency division multiple access (OFDMA). A High Efficiency WLAN study group (HEW SG) within an IEEE 802.11 Work Group considers an enhancement in spectrum efficiency in order to enhance the system throughput/surface in a high-density scenario of an access point (AP) and/or station (STA).

Although small computing devices, such as wearable devices, sensors, mobile devices, and so on, are restricted due to their compact battery capacity, small computing devices support wireless communication techniques, such as Wi-Fi, Bluetooth®, Bluetooth® Low Energy (BLE), and so on, and, then, the small computing devices should exchange data by being connected to other computing devices, such as smart phones, tablets, personal computers, and so on. Since such communication consumes power, it is important to minimize power consumption of such communication. One of the most ideal strategies for minimizing power consumption is to maintain data transmission and reception without excessively increasing delay (or latency) and to turn off the power for communication blocks as frequently as possible. More specifically, a communication block is transmitted immediately before data reception, and the communication block is turned on only when data that needs to be woken up exists, and, during the rest of the time, the power of the communication block is turned off.

Hereinafter, a Low-Power Wake-Up Receiver (LP-WUR) will be described in detail.

The communication system (or communication sub-system) that is described in this specification includes a main radio (802.11) and a low-power wake-up receiver.

The main radio is used for the transmission and reception of user data. The main radio is turned off when there is no data or packet that is to be transmitted. The low-power wake-up receiver wakes up the main radio when there is a packet that is to be received. At this point, the user data is transmitted and received by the main radio.

The low-power wake-up receiver is not used (or provide) for the user data. The low-power wake-up receiver corresponds to/is related with a receiver for simply waking up the main radio. More specifically, the low-power wake-up receiver does not include a transmitter. The low-power wake-up receiver is activated while the main radio is turned off. During its activated state, the low-power wake-up receiver aims to achieve its target power consumption of less than 1 mW. Additionally, the low-power wake-up receiver uses a narrow band of less than 5 MHz. Furthermore, a target transmission range of the low-power wake-up receiver is the same as a target transmission range of the legacy 802.11.

Figure 21:
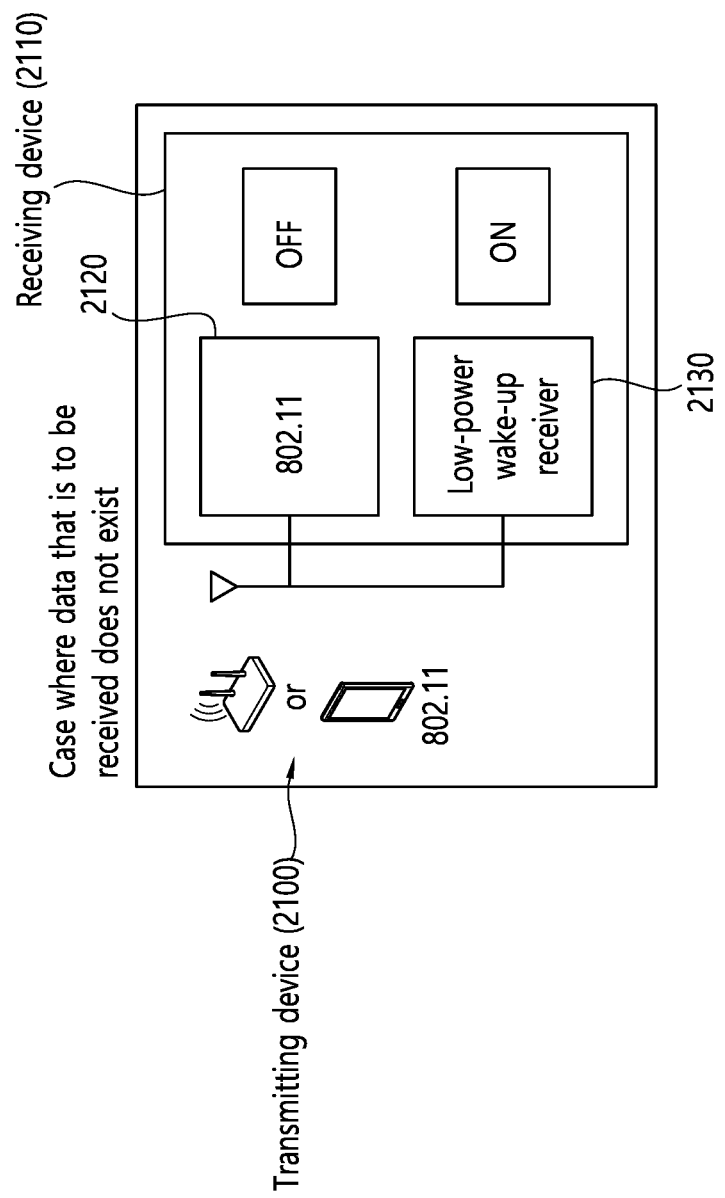
FIG. 21 is a diagram illustrating a low-power wake-up receiver in an environment where data is not received.
Figure 22:
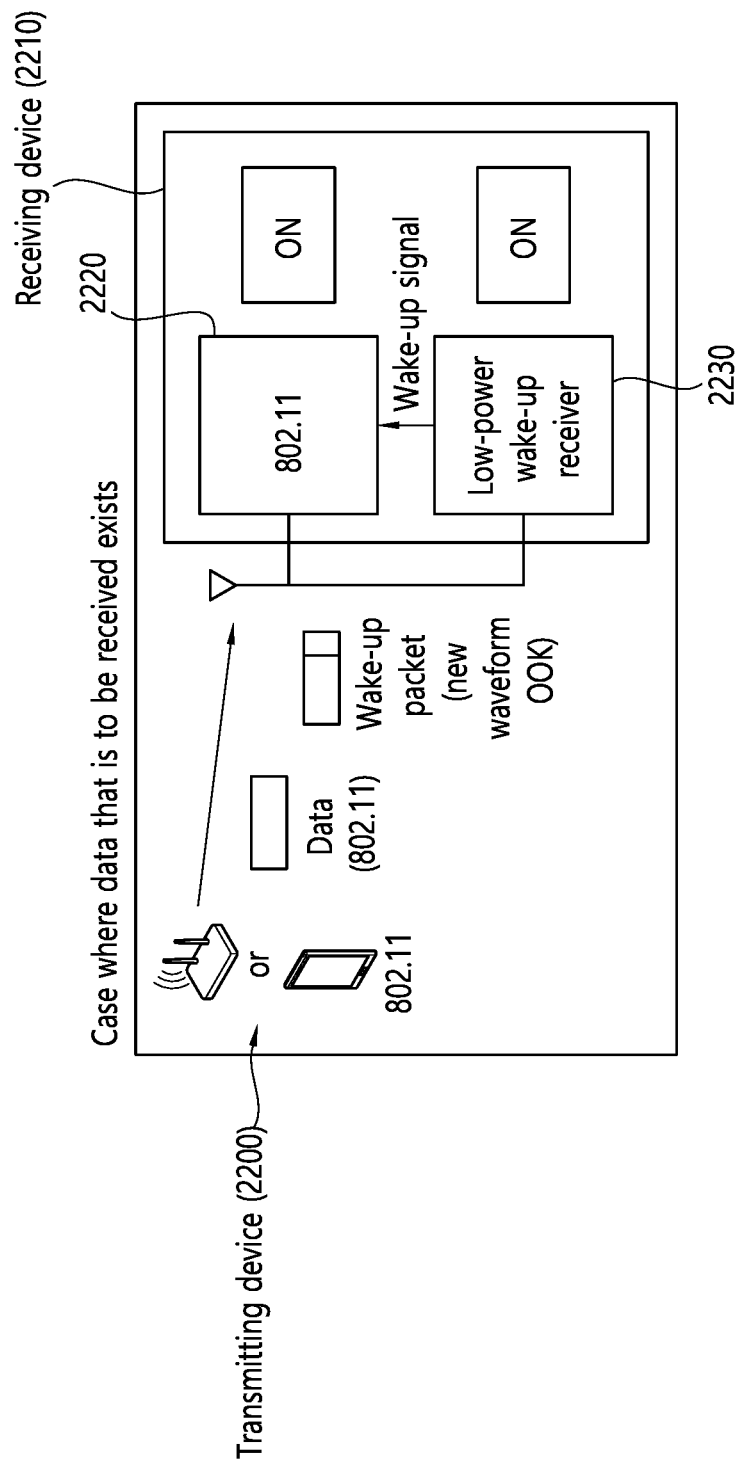
FIG. 22 is a diagram illustrating a low-power wake-up receiver in an environment where data is received.
Figure 23:
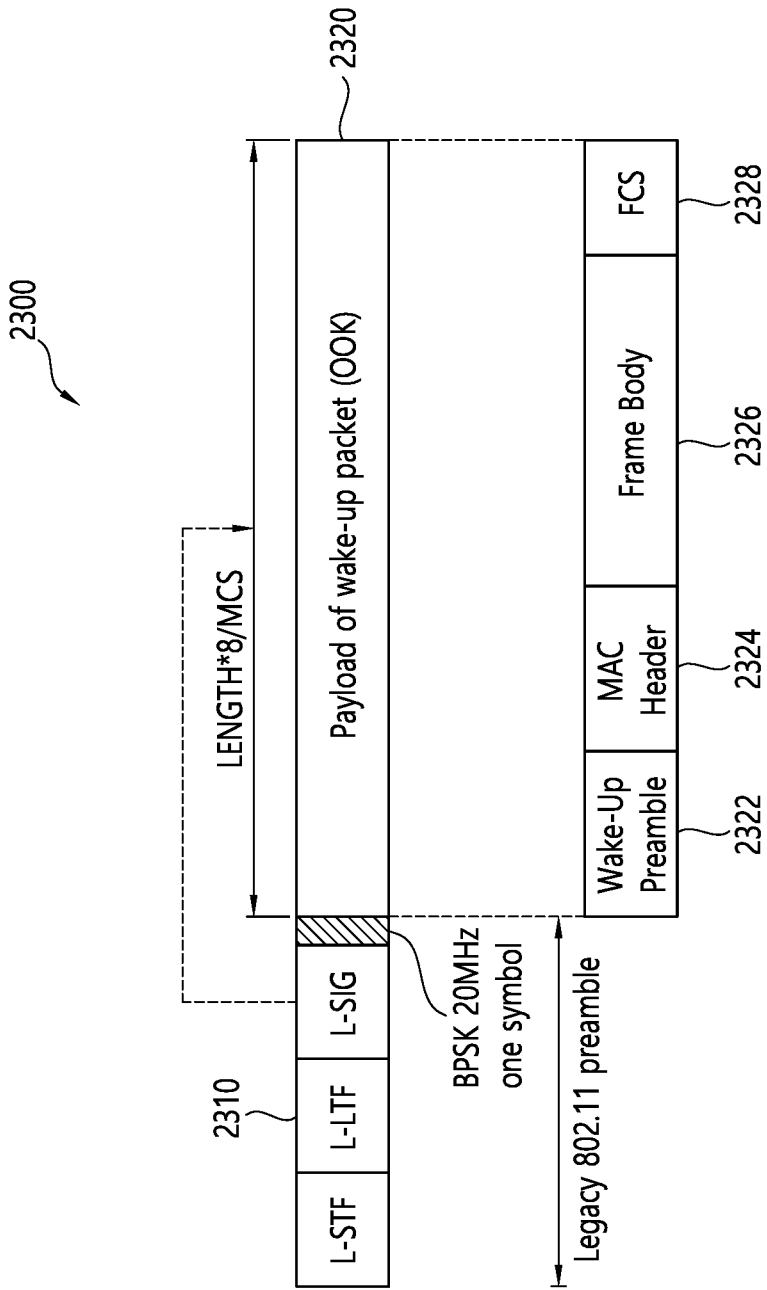
FIG. 23 illustrates an example of a wake-up packet structure according to an exemplary embodiment of this specification.

FIG. 21 is a diagram illustrating a low-power wake-up receiver in an environment where data is not received. FIG. 22 is a diagram illustrating a low-power wake-up receiver in an environment where data is received.

As shown in FIG. 21 and FIG. 22, in case data that is to be transmitted and received exists, one of the methods for implementing the most ideal transmission and reception strategy is to add a low-power wake-up receiver (LP-WUR) that is capable of waking up a main radio, such as Wi-Fi, Bluetooth® radio, Bluetooth® Low Energy (BLE) radio, and so on.

Referring to FIG. 21, the Wi-Fi/BT/BLE radio (2120) is turned off, and the low-power wake-up receiver (2130) is turned on in a state where data is not received. According to part of the related studies, the power consumption of such low-power wake-up receiver (LP-WUR) may be less than 1 mW.

However, as shown in FIG. 22, if a wake-up packet is received, the low-power wake-up receiver (2230) wakes up the entire (or whole) Wi-Fi/BT/BLE radio (2220) so that a data packet following the wake-up packet can be accurately received. However, in some cases, actual data or an IEEE 802.11 MAC frame may be included in the wake-up packet. In this case, although the entire Wi-Fi/BT/BLE radio (2220) cannot be woken up, the necessary process should be carried out by waking up only part of the Wi-Fi/BT/BLE radio (2220). This may result in a considerable amount of power saving.

An exemplary technique that is described in this specification defines a method of a segmented wake-up mode for a Wi-Fi/BT/BLE radio using a low-power wake-up receiver. For example, actual data being included in a wake-up packet may be directly delivered to a memory block without waking up the Wi-Fi/BT/BLE radio.

As another example, in case an IEEE 802.11 MAC frame is included in the wake-up packet, only a MAC processor of the Wi-Fi/BT/BLE wireless device (or radio) needs to be woken up in order to process the IEEE 802.11 MAC frame, which is included in the wake-up packet. More specifically, the power of a PHY module of the Wi-Fi/BT/BLE radio may be turned off or maintained in a low-power mode.

Since a plurality of segmented wake-up modes for a Wi-Fi/BT/BLE radio using a low-power wake-up receiver are defined, when a wake-up packet is received, the power of the Wi-Fi/BT/BLE radio must be turned on. However, according to the exemplary embodiment of this specification, only a necessary (or required) part (or configuration element) of the Wi-Fi/BT/BLE radio may be selectively woken up, thereby saving a larger amount of energy and reducing stand-by (or waiting) time. A large number of solutions using the pow-power wake-up receiver wakes up the entire Wi-Fi/BT/BLE radio when receiving a wake-up packet. According to an exemplary aspect that is discussed in this specification, since only a part (or element) of the Wi-Fi/BT/BLE radio that is required for processing the receiving data is woken up, a considerable amount of energy is saved, and unnecessary stand-by (or waiting) time that is needed for waking up the main radio may be reduced.

Additionally, according to this exemplary embodiment, the low-power wake-up receiver (2230) may wake up the main radio (2220) based on the wake-up packet that is transmitted from a transmitting device (2200).

Furthermore, the transmitting device (2200) may be configured to transmit the wake-up packet to a receiving device (2210). For example, the transmitting device (500) may instruct the low-power wake-up receiver (2230) to wake up the main radio (2220).

Figure 24:
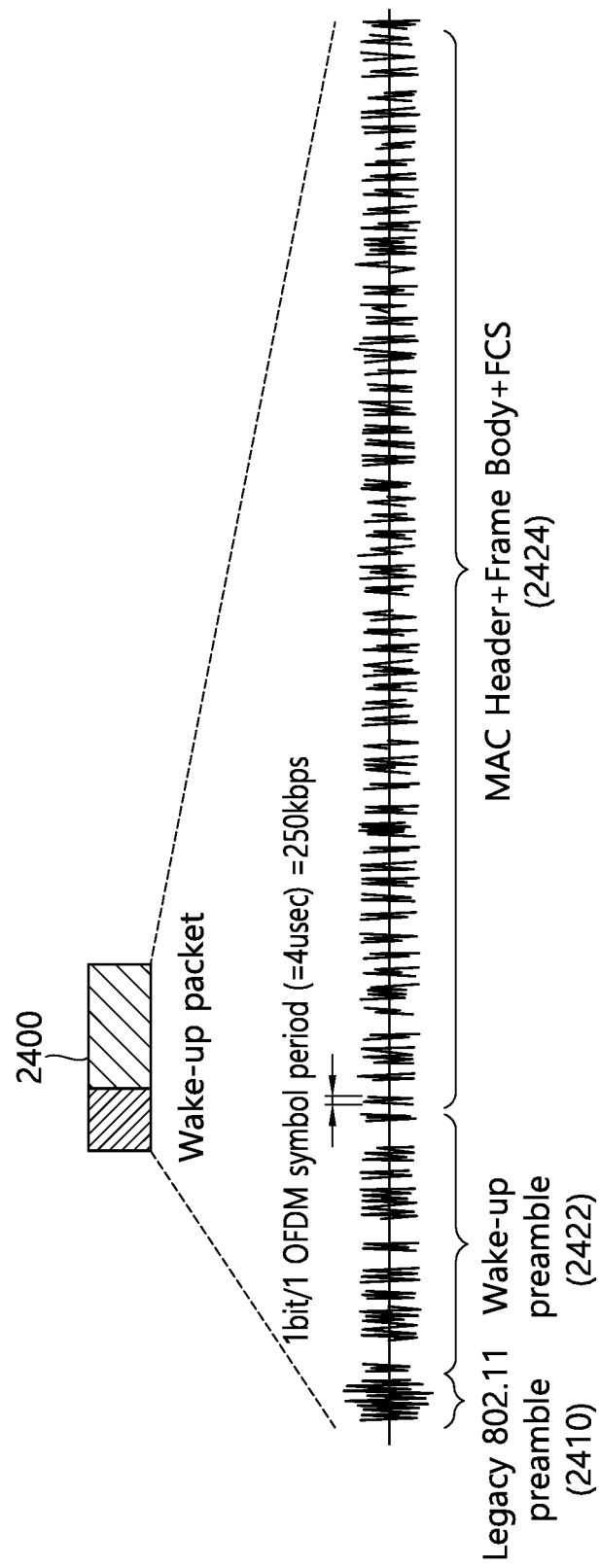
FIG. 24 illustrates a signal waveform of a wake-up packet according to an exemplary embodiment of this specification.

FIG. 24 illustrates an example of a wake-up packet structure according to an exemplary embodiment of this specification.

A wake-up packet may include one or more legacy preambles. One or more legacy devices may decode or process the legacy preamble(s).

Additionally, the wake-up packet may include a payload after a legacy preamble. The payload may be modulated by using a simple modulation scheme, e.g., an On-Off Keying (OOK) scheme.

Referring to FIG. 24, the transmitting device may be configured to generate and/or transmit a wake-up packet (2400). And, the receiving device may be configured to process the received wake-up packet (2400).

Additionally, the wake-up packet (2400) may include a legacy preamble, which is defined by the IEEE 802.11 specification, or another random preamble (2410). And, the wake-up packet (2400) may also include a payload (2420).

A legacy preamble provides a coexistence with a legacy STA. The legacy preamble (2410) for the coexistence uses an L-SIG field for protecting the packet. Through the L-SIG field within the legacy preamble (2410), an 802.11 STA may detect a beginning (or a start point) of the legacy preamble (2410). And, through the L-SIG field within the legacy preamble (2410), the 802.11 STA may know (or acknowledge) an end (or last part) of the packet. Additionally, by adding a symbol that is modulated by using BPSK after the L-SIG, a false alarm of an 802.11n terminal (or device) may be reduced. A symbol (4 us) that is modulated by using BPSK also has a 20 MHz bandwidth, just as the legacy part. The legacy preamble (2410) corresponds to/is related with a field for a third party legacy STA (an STA not including an LP-WUR). The legacy preamble (2410) is not decoded by the LP-WUR.

The payload (2420) may include a wake-up preamble (2422). The wake-up preamble (2422) may include a sequence of bits that are configured to identify the wake-up packet (2400). The wake-up preamble (2422) may, for example, include a PN sequence.

Additionally, the payload (2420) may include a MAC header (2424) including address information of a receiving device, which receives the wake-up packet (2400), or an identifier of the receiving device.

Additionally, the payload (2420) may include a frame body (2426), which may include other information of the wake-up packet. For example, length or size information of the payload may be included in the frame body (2426).

Furthermore, the payload (2420) may include a frame check sequence (FCS) field (2428) including a cyclic redundancy check (CRC) value. For example, the FCS field (2428) may include a CRC-8 value or a CRC-16 value of the MAC header (2424) and the frame body (2426).

Figure 25:
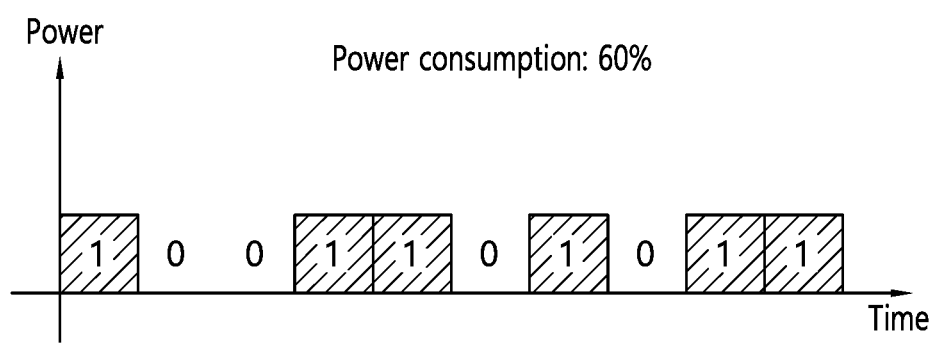
FIG. 25 illustrates a diagram for describing a principle for determining consumed power in accordance with a ratio between bit value 1 and 0 that configure information of a binary sequence format by using the OOK scheme.

FIG. 25 illustrates a signal waveform of a wake-up packet according to an exemplary embodiment of this specification.

Referring to FIG. 25, a wake-up packet (2500) includes a legacy preamble (802.11 preamble (2510) and a payload being modulated by OOK. In other words, the wake-up packet (2500) is configured of a format in which a legacy preamble and a new LP-WUR signal waveform coexist.

Additionally, the legacy preamble (2510) may be modulated in accordance with an OFDM modulation scheme. More specifically, the OOK scheme is not applied to the legacy preamble (2510). Conversely, the payload may be modulated in accordance with the OOK scheme. However, a wake-up preamble (2522) within the payload may be modulated in accordance with a different modulation scheme.

If the legacy preamble (2510) is transmitted within a channel bandwidth of 20 MHz in which 64 FFT is applied, the payload may be transmitted within a channel bandwidth of approximately 4.06 MHz. This will be described in more detail in the following description of an OOK pulse designing method.

Firstly, a modulation method using the OOK scheme and a Manchester coding method will be described in detail.

FIG. 26 illustrates a diagram for describing a principle for determining consumed power in accordance with a ratio between bit value 1 and 0 that configure information of a binary sequence format by using the OOK scheme.

Referring to FIG. 26, information of a binary sequence format having 1 or 0 as the bit values is expressed in the drawing. By using such bit values of 1 or 0 of the binary sequence format information, an OOK modulation scheme communication may be carried out. More specifically, by considering the bit values of the binary sequence format information, the OOK modulation scheme communication may be carried out. For example, in case of using a light-emitting diode in visible light communication, in case the bit value configuring the binary sequence format information is equal to 1, the light-emitting diode is turned on, and, in case the bit value is equal to 0, the light-emitting diode is turned off. Thus, the light-emitting diode may be turned on and off (i.e., flicker). As the receiving device receives and recovers the data being transmitted in the form of visible light in accordance with the above-described on and off state (or flickering) of the light-emitting diode, the communication using visible light may be carried out. However, since the flickering of the light-emitting diode cannot be recognized by the human eye, people think and feel that the lighting is continuously maintained in the on state.

For simplicity in the description, as shown in FIG. 26, information of a binary sequence format having 10 bit values is used in this specification. Referring to FIG. 26, information of a binary sequence format having a value of '1001101011'. As described above, in case the bit value is equal to 1, the transmitting device is turned on, and, in case the bit value is equal to 0, the transmitting device is turned off. Accordingly, among the 10 bit values, the symbols are turned on in 6 bit values. In this case, given that 100% of the consumed power is used when all of the symbols are turned on in all of the 10 bit values, and, in case a duty cycle shown in FIG. 26 is followed, the consumed power is 60%.

More specifically, it may be said that the consumed power of the transmitter is determined in accordance with a ratio between 1s and 0s configuring the binary sequence format information. In other words, in case there is a constraint condition specifying that the consumed power of the transmitter should be maintained at a specific value, the ratio between the 1s and 0s configuring the binary sequence format information should also be maintained. For example, in case of a lighting device, since the lighting should be maintained at a specific luminance value that is wanted by the users, the ratio between the 1s and 0s configuring the binary sequence format information should also be maintained accordingly.

However, for the wake-up receiver (WUR), since the receiving device is the subject, the transmission power is not significantly important. One of the main reasons for using the OOK is because the amount of consumed power during the decoding of a received signal is considerably small. Before performing the decoding, the difference between the amount of consumed power in the main radio and in the WUR is small. However, as the decoding process is carried out, the difference in the amount of consumed power becomes apparent. The approximate amount of consumed power is as shown below.

The current Wi-Fi power consumption is approximately 100 mW. More specifically, power may be consumed as follows: Resonator+Oscillator+PLL (1500 uW)->LPF (300 uW)->ADC (63 uW)->decoding processing (OFDM receiver) (100 mW).

However, the WUR power consumption is approximately 1 mW. More specifically, power may be consumed as follows: Resonator+Oscillator (600 uW)->LPF (300 uW)->ADC(20 uW)->decoding processing (Envelope detector) (1 uW).

Figure 27:
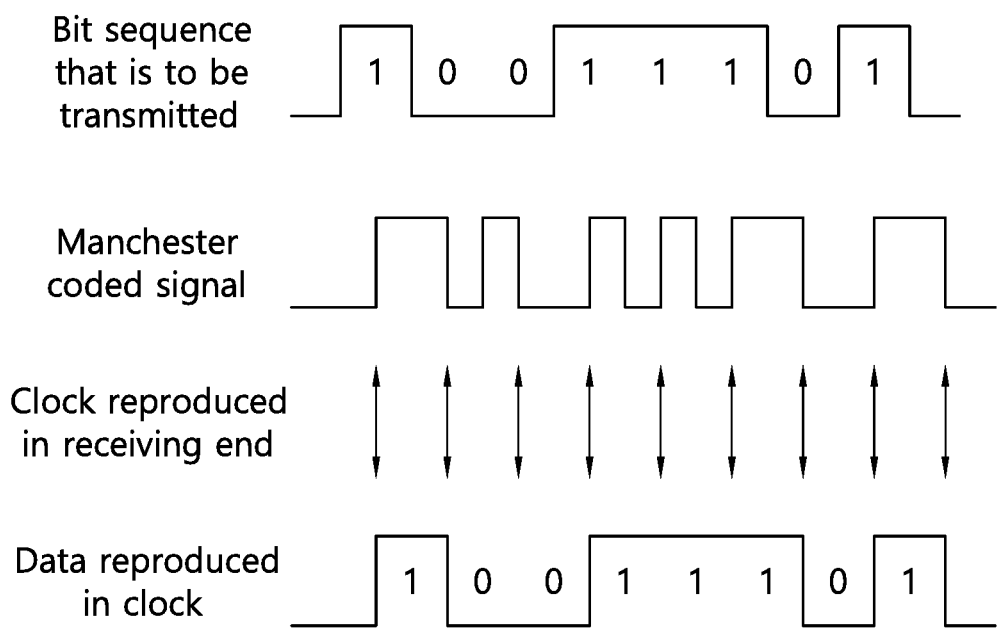
FIG. 27 is a descriptive diagram of a Manchester coding method according to an exemplary embodiment of this specification.

FIG. 27 illustrates a method for designing an OOK pulse according to an exemplary embodiment of this specification.

In order to generate an OOK pulse, an OFDM transmitting device of 802.11 may be re-used. The transmitting device may generate a sequence having 64 bits by applying 64-point FFT, just as in the legacy 802.11.

The transmitting device should generate the payload of a wake-up packet by performing modulation using the OOK scheme. However, since the wake-up packet is used for low-power communication, the OOK scheme is applied to the ON-signal. Herein, the ON-signal corresponds to/is related with a signal having the actual power value, and an OFF-signal corresponds to/is related with a signal that does not have an actual power value. Although the OOK scheme is also applied to the OFF-signal, since the OFF-signal is not a signal that is generated by using the transmitting device, and, accordingly, since the signal is not actually transmitted, the OFF-signal is not considered when generating the wake-up packet.

In the OOK scheme, Information (bit) 1 may correspond to the ON-signal, and Information (bit) 0 may correspond to the OFF-signal. On the other hand, if the Manchester coding method is applied, it may be indicated that Information 1 is shifted from the OFF-signal to the ON-signal, and that Information 0 is shifted from the ON-signal to the OFF-signal. Conversely, it may also be indicated that Information 1 is shifted from the ON-signal to the OFF-signal, and that Information 0 is shifted from the OFF-signal to the ON-signal. The Manchester coding method will be described later on in detail.

Referring to FIG. 27, as shown in the right side frequency domain graph (2720), the transmitting device selects 13 consecutive subcarriers of the reference band, 20 MHz band, as a sample and applies a sequence. In FIG. 27, among the subcarriers of the 20 MHz band, the 13 subcarriers that are located in the middle are selected as the sample. More specifically, among the 64 subcarriers, the transmitting device selects subcarriers having subcarriers indexes ranging from −6 to +6. At this point, since subcarrier index 0 is a DC subcarrier, this subcarrier may be nulled as 0. A specific sequence is configured only in the sample of the selected 13 subcarriers, and all of the remaining subcarriers excluding the 13 selected subcarriers (subcarrier indexes ranging from −32 to −7 and subcarrier indexes ranging from +7 to +31) are set to 0.

Additionally, since subcarrier spacing corresponds to/is related with 312.5 KHz, the 13 subcarriers have a channel bandwidth of approximately 4.06 MHz. More specifically, it may be understood that, in the 20 MHz band of the frequency domain, power exists only in 4.06 MHz. Thus, as described above, by focusing the power to the center, it will be advantageous in that a Signal to Noise Ratio (SNR) may be increased, and that power consumption in an AC/DC converter of the receiving device may be reduced. Additionally, since the sampling frequency band is reduced to 4.06 MHz, the amount of the consumed power may be reduced accordingly.

Additionally, as shown in the left side time domain graph (2710), the transmitting device performs 64-point IFFT on the 13 subcarriers, so as to generate one ON-signal in the time domain. One ON-signal has the size of 1 bit. More specifically, a sequence being configured of 13 subcarriers may correspond to 1 bit. Conversely, the transmitting device may not transmit the OFF-signal at all. By performing IFFT, a symbol of 3.2 us may be generated, and, if a cyclic prefix (CP) (0.8 us) is included, one symbol having the length of 4 us may be generated. More specifically, 1 bit indicating one ON-signal may be loaded in one symbol.

The reason for configuring and transmitting a bit, as described in the above-described exemplary embodiment, is to reduce power consumption in the receiving device by using an envelope detector. Thus, the receiving device may decode a packet with a minimum amount of power.

However, a basic data rate for one information may correspond to 125 Kbps (8 us) or 62.5 Kbps (16 us).

By generalizing the description presented above, a signal being transmitted from the frequency domain is as described below. More specifically, each signal having a length of K within the 20 MHz band may be transmitted by being loaded in K number of consecutive subcarriers, among the total of 64 subcarriers. More specifically, as a number of subcarriers being used for transmitting a signal, the value K may correspond to the bandwidth of an OOK pulse. Coefficients of subcarriers other than the K number of subcarriers are equal to 0. At this point, indexes of the K number of subcarriers being used by a signal corresponding to information 0 and information 1 are the same. For example, a subcarrier index that is being used may be indicated as 33-floor(K/2): 33+ceil(K/2)−1.

At this point, Information 1 and Information 0 may have the following values.

Information 0=zeros(1,K)
Information 1=alpha*ones(1,K)

The alpha is a power normalization factor and may, for example, be equal to 1/sqrt(K).

FIG. 28 is a descriptive diagram of a Manchester coding method according to an exemplary embodiment of this specification.

Manchester coding is a type of line coding that corresponds to/is related with a coding method in which a transition in a magnitude value occurs at a midpoint of one bit period. And, information of this method may be indicated as shown below in the following table.

TABLE 1

| Original data | Clock | | Manchester value |
|---|---|---|---|
| 0 | 0 | XOR | 0 |
|  | 1 |  | 1 |
| 1 | 0 |  | 1 |
|  | 1 |  | 0 |

More specifically, the Manchester coding method (or technique) refers to a method of converting data from 1 to 01 and from 0 to 10 or from 1 to 10 and from 0 to 01. Table 1 shows an example of data being converted from 1 to 10 and from 0 to 01 by using Manchester coding.

As shown in FIG. 28, from top to bottom, the drawing illustrates a bit sequence that is to be transmitted, a Manchester coded signal, a clock that is reproduced by the receiving end, and data that is reproduced by the clock.

If data is transmitted from the transmitting end by using the Manchester coding method, the receiving end reads the data after a brief moment based on a transition point, wherein transition of 1→0 or 0→1 occurs. Then, after recovering the data and recognizing the transition point of transitioning 1→0 or 0→1 as the transition point of the block, the clock is recovered. Alternatively, when a symbol is divided based on the transition point, a simple decoding may be performed by comparing the power level of the front part of the symbol and the power level of the back part of the symbol based on the midpoint of the symbol.

As shown in FIG. 28, the bit sequence that is to be transmitted corresponds to/is related with 10011101, and the bit sequence that is to be transmitted being processed with Manchester coding corresponds to/is related with 0110100101011001, the clock that is reproduced in the receiving end recognizes a transition point of the Manchester-coded signal as the transition point of the block, and, then, data is recovered by using the clock, which is reproduced as described above.

When using the above-described Manchester coding method, communication may be carried out in a synchronization method by using only a data transmission channel and without using a separate clock.

Additionally, in the above-described, by using only the data transmission channel, a TXD pin may be used for data transmission, and an RXD pin may be used for data reception. Therefore, a synchronized two-way transmission may be performed.

This specification proposes diverse symbol types that can be used in a WUR and the corresponding data rate.

Since STAs requiring robust performance (or capacity) and STAs receiving intense signals from an AP are intermixed, depending upon the situation, supporting an efficient data rate is needed. In order to achieve a reliable and robust performance, a symbol-based Manchester coding method and a symbol repetition method may be used. Additionally, in order to achieve a high data rate, a symbol reduction method may be used.

At this point, each symbol may be generated by using the legacy 802.11 OFDM transmitter. And, the number of subcarriers that are used for generating each symbol may be equal to 13. However, the number of subcarriers will not be limited only to this.

Additionally, each symbol may use OOK modulation, which is configured of an ON-signal and an OFF-signal.

A symbol that is generated for the WUR may be configured of a cyclic prefix (CP) (or a guard interval (GI)) and a signal part indicating actual information. By diversely configuring the lengths of the CP and the actual information signal, or by repeating the CP and the actual information part, a symbol having diverse data rates may be designed.

Diverse example related to the symbol types are shown below.

For example, a basic WUR symbol may be indicated as CP+3.2 us. More specifically, 1 bit is indicated by using a symbol having the same length as the legacy Wi-Fi. Most particularly, the transmitting device performs IFFT after applying a specific sequence to all of the subcarriers that are available for usage (e.g., 13 subcarrier), thereby configuring an information signal part of 3.2 us. At this point, among all of the subcarriers that are available for usage, a coefficient of 0 may be loaded in a DC subcarrier or middle subcarrier index.

Different sequence may be applied to the subcarriers that are available for usage in accordance with a 3.2 us ON-signal and a 3.2 us OFF-signal. The 3.2 us OFF-signal may be generated by applying 0s to all of the coefficients.

The CP may select and use a part corresponding having a specific length at an end part of the information signal 3.2 us that immediately follows the CP. At this point, the CP may correspond to 0.4 us or 0.8 us. This length corresponds to/is related with the same length as the guard interval of 802.11ac.

Therefore, a 1-bit information corresponding to one basic WUR symbol may be indicated as shown below in the following table.

TABLE 2

| Information '0' | Information '1' |
|---|---|
| 3.2 us OFF-signal | 3.2 us ON-signal |

Table 2 does not separately indicate the CP. Actually, when including the CP, CP+3.2 us may indicate one 1-bit information. More specifically, the 3.2 us ON-signal may be regarded as a (CP+3.2 us) ON-signal, and the 3.2 us OFF-signal may be regarded as a (CP+3.2 us) OFF signal.

For example, a symbol having Manchester coding applied thereto may be indicated as CP+1.6 us+CP+1.6 us or CP+1.6 us+1.6 us. The symbol having Manchester coding applied thereto may be generated as described below.

In an OOK transmission using a Wi-Fi transmitting device, the time period used for transmitting one bit (or symbol) excluding the guard interval of the transmitted signal is equal to 3.2 us. At this point, if Manchester coding is also applied, a shift in the signal size (or magnitude) should occur in 1.6 us. More specifically, each sub-information having a length of 1.6 us should be given a value of 0 or 1, and the corresponding signal may be configured by using the method described below.

Information 0->1 0 (Each may be referred to as sub-information 1 0 or sub-symbol 1 (ON) 0 (OFF).)

First 1.6 us (sub-information 1 or sub-symbol 1): Sub-information 1 may be given a value of beta*ones(1,K). Herein, the beta indicates/is related with a power normalization element and may, for example, be equal to 1/sqrt(ceil(K/2)).

Additionally, in order to generate the symbol having Manchester coding applied thereto, a specific sequence is applied to all subcarriers that are available for usage (e.g., 13 subcarriers) in units of 2 spaces. More specifically, each even-number indexed subcarrier of the specific pattern is nulled by using 0. For example, when it is assumed that an ON-signal is configured by using 13 subcarriers, the specific sequence having a coefficient at an interval of 2 spacesmay-correspondto {a 0 b 0 c 0 d 0 e 0f0 g}, {0 a0b0c0d0 e0f 0}, or {a 0 b 0 c 0 0 0 d 0 e 0 f}. At this point, a, b, c, d, e, f, g may correspond to 1 or −1.

More specifically, among the 64 subcarriers, the transmitting device maps the specific sequence to K number of consecutive subcarriers (e.g., 33-floor(K/2): 33+ceil(K/2)−1) and sets a coefficient of 0 for the remaining subcarriers. Thereafter, the transmitting device performs IFFT. Thus, a time domain signal may be generated. Since the time domain signals has coefficients existing at an interval of 2 spaces within the frequency domain, the time domain signal corresponds to/is related with a 3.2 us-length signal of having a cycle of 1.6 us. One of a first 1.6 us-cycle signal and a second 1.6 us-cycle signal may be selected and used as sub-information 1.

Second 1.6 us (sub-information 0 or sub-symbol 0): Sub-information 0 may be given a value of zeros(1,K). Similarly, among the 64 subcarriers, the transmitting device maps the specific sequence to K number of consecutive subcarriers (e.g., 33-floor(K/2): 33+ceil(K/2)−1) and performs IFFT, thereby generating a time domain signal. Sub-information 0 may correspond to a 1.6 us OFF-signal. The 1.6 us OFF-signal may be generated by setting all of the coefficients to 0.

One of a first 1.6 us-cycle signal and a second 1.6 us-cycle signal of the time domain may be selected and used as sub-information 0. Simply, zero signals (1,32) may also be used as sub-information 0.

Information 1->0 1(Each may be referred to as sub-information '0', '1' or sub-symbol 0 (OFF) 1 (ON).)

Since Information 1 is also divided into a first 1.6 us (sub-information 0) and a second 1.6 us (sub-information 1), a signal corresponding to each sub-information may be configured by using the same method as the method for generating Information 0.

When performing the method for generating Information 0 and Information 1 by using Manchester coding, a consecutive occurrence of OFF-symbols may be prevented as compared to the legacy method. Accordingly, a problem of coexistence with the legacy Wi-Fi device does not occur. The problem of coexistence refers to a problem that occurs when another device transmits a signal after determining that the channel is in a channel idle state, due to the existence of consecutive OFF-symbols. If the OOK modulation is only used, the sequence may, for example, correspond to 100001, wherein the OFF-symbol occurs consecutively. However, if Manchester coding is used, the sequence may correspond to 100101010110, wherein the OFF-symbols cannot be consecutive.

According to the description provided above, the sub-information may be referred to as a 1.6 us information signal. The 1.6 us information signal may correspond to a 1.6 us ON-signal or a 1.6 OFF-signal. The 1.6 us ON-signal and the 1.6 us OFF-signal may have different sequences applied thereto in each subcarrier.

The CP may select and use a part corresponding having a specific length at an end part of the information signal 1.6 us that immediately follows the CP. At this point, the CP may correspond to 0.4 us or 0.8 us. This length corresponds to/is related with the same length as the guard interval of 802.11ac.

Therefore, a 1-bit information corresponding to a symbol having Manchester coding applied thereto may be indicated as shown below in the following table.

TABLE 3

| Information '0' | Information '1' |
| --- | --- |
| 1.6 us ON-signal + 1.6 us OFF-signal or 1.6 us OFF-signal + 1.6 us ON-signal | 1.6 us OFF-signal + 1.6 us ON-signal or 1.6 us ON-signal + 1.6 us OFF-signal |

Table 3 does not separately indicate the CP. Actually, when including the CP, CP+1.6 us+CP+1.6 us or CP+1.6 us+1.6 us may indicate one 1-bit information. More specifically, in case of the former structure, the 1.6 us ON-signal and the 1.6 us OFF-signal may be respectively regarded as a (CP+1.6 us) ON-signal and a (CP+1.6 us) OFF-signal.

As yet another example, proposed herein is a method for generating a wake-up packet by repeating symbols in order to enhance performance.

A symbol repetition method is applied to a wake-up payload (724). The symbol repetition method refers to a repetition of time signals after IFFT and cyclic prefix (CP) insertion in each symbol. Thus, the length (time (or duration)) of the wake-up payload (724) becomes two times its initial length.

More specifically, a method for generating a wake-up packet by applying a symbol, which indicates information such as Information 0 or Information 1, to a specific sequence and by repeating this process is proposed as described below.

Option 1: Information 0 and Information 1 may be indicated by being repeated as the same symbol.
Information 0->0 0 (Information 0 is repeated 2 times)
Information 1->1 1 (Information 1 is repeated 2 times)
Option 2: Information 0 and Information 1 may be indicated by being repeated as different symbols.
Information 0->0 1 or 1 0 (Information 0 and Information 1 are repeated)
Information 1->1 0 or 0 1 (Information 1 and Information 0 are repeated)

Hereinafter, a method of decoding a signal, by a receiving device, being transmitted from a transmitting device after applying the symbol repetition method will be described in detail.

The transmitted signal may correspond to a wake-up packet, and a method for decoding the wake-up packet may be broadly divided into two different types. A first type corresponds to a non-coherent detection method, and a second type corresponds to a coherent detection method. The non-coherent detection method refers to a method wherein a phase relation between signals of the transmitting device and the receiving device is not fixed. Therefore, the receiving device is not required to measure and adjust the phase of the received signal. Conversely, in the coherent detection method, the phase between the signals of the transmitting device and the receiving device is required to be matched.

The receiving device includes the above-described low-power wake-up receiver. In order to reduce power consumption, the low-power wake-up receiver may decode a packet (wake-up packet), which is transmitted by using the OOK modulation scheme, by using an envelope detector.

The envelope detector uses a method of decoding a received signal by measuring the power or magnitude of the corresponding signal. The receiving device determines in advance a threshold value based on the power or magnitude of the received signal, which is measured by using the envelope detector. Thereafter, when the receiving device decodes the symbol having OOK applied thereto, if the symbol is greater than or equal to the threshold value, the symbol is determined as Information 1, and, if the symbol is smaller than the threshold value, the symbol is determined as Information 0.

A method for decoding a symbol having the symbol repetition method applied thereto is as described below. In the above-described Option 1, the receiving device may calculate the power corresponding to a case where Symbol 1 (symbol including Information 1) is transmitted by using a wake-up preamble (722) and may use the calculated power to determine a threshold value.

More specifically, when an average power level between two symbols is calculated, and, if the calculated average power level is equal to or greater than the threshold value, the symbol is determined as Information 1 (1 1). And, if the calculated average power level is equal to or smaller than the threshold value, the symbol is determined as Information 0 (0 0).

Additionally, in the above-described Option 2, the information may be determined by comparing the power levels of the two symbols without performing the process of determining the threshold value.

More specifically, when it is given that Information 1 is configured of 0 1 and that Information 0 is configured of 1 0, if the power level of a first symbol is greater than the power level of a second symbol, the information is determined as Information 0. Conversely, if the power level of the first symbol is smaller than the power level of the second symbol, the information is determined as Information 1.

The order of the symbols may be reconfigured by an interleaver. Herein, the interleaver may be applied in packet units and units of a specific number of symbols.

Moreover, in addition to two symbols, the symbol repetition may be extended by using n number of symbols, as described below. FIG. 11 illustrates various examples of a symbol repetition method repeating n number of symbols according to an exemplary embodiment of this specification.

Option 1: As described in FIG. 11, Information 0 and Information 1 may be indicated by being repeated n number of times as the same symbol.

Information 0->0 0 . . . 0 (Information 0 is repeated n number of times)

Information 1->1 1 . . . 1 (Information 1 is repeated n number of times)

Option 2: As described in FIG. 11, Information 0 and Information 1 may be indicated by being repeated n number of times as different symbols.

Information 0->0 1 0 1 . . . or 1 0 1 0 . . . (Information 0 and Information 1 are alternately repeated n number of times)

Information 1->1 0 1 0 . . . or 0 1 0 1 . . . (Information 1 and Information 0 are alternately repeated n number of times)

Option 3: As described in FIG. 11, n number of symbols may be indicated by configuring one half of the symbols of Information 0 and by configuring another half of the symbols of Information 1.

Information 0->0 0 . . . 1 1 . . . or 1 1 . . . 0 0 . . . (n/2 number of symbols is configured of Information 0, and the remaining n number of symbols is configured of Information 1)

Information 1->1 1 . . . 0 0 . . . or 0 0 . . . 1 1 . . . (n/2 number of symbols is configured of Information 0, and the remaining n number of symbols is configured of Information 1)

Option 4: As described in FIG. 11, when n is an odd number, a total of n number of symbols may be indicated by differentiating the number of Symbol 1's (symbol including Information 1) and the number of sSymbol 0's (symbols including Information 0) from one another.

Information 0->n number of symbols configured of an odd number of Symbol 1's and an even number of Symbol 0's, or n number of symbols configured of an even number of Symbol 1's and an odd number of Symbol 0's Information 1->n number of symbols configured of an odd number of Symbol 0's and an even number of Symbol 1's, or n number of symbols configured of an even number of Symbol 0's and an odd number of Symbol 1's Additionally, the order of the symbols may be reconfigured by an interleaver. Herein, the interleaver may be applied in packet units and units of a specific number of symbols.

Moreover, as described above, the receiving device may determine the symbol (or information) as Information 0 or Information 1 by determining the threshold value and comparing the power levels of n number of symbols.

However, if consecutive Symbol 0's (or OFF-signals) are used, a problem of coexistence with the legacy Wi-Fi device and/or another device may occur. The problem of coexistence refers to a problem that occurs when another device transmits a signal after determining that the channel is in a channel idle state, due to the existence of consecutive OFF-symbols. Therefore, in order to resolve the problem of coexistence, since it is preferable to avoid the usage of consecutive OFF-signals, the method proposed in Option 2 may be preferred.

Additionally, this may be extended to a method of expressing m number of information sets by using n number of symbols. In this case, the first or last m number of information sets may be indicated as symbols 0 (OFF) or 1 (ON) in accordance with the corresponding information sets, and n-m number of redundant symbols 0 (OFF) or 1 (ON) may be consecutively configured after or before the first or last m number of information sets.

For example, if a code rate of 3/4 is applied to information 010, the information may correspond to 1,010 or 010,1 or 0,010 or 010,0. However, in order to prevent the usage of consecutive OFF symbols, it may be preferable to apply a code rate of ½ or less.

Similarly, in this exemplary embodiment, the order of the symbols may be reconfigured by an interleaver. Herein, the interleaver may be applied in packet units and units of a specific number of symbols.

Hereinafter, various exemplary embodiments of a symbol having the symbol repetition method applied thereto will be described in detail.

Generally, a symbol having the symbol repetition method applied thereto may be indicated as n number of (CP+3.2 us) or CP+n number of (1.6 us).

As shown in FIG. 11, 1 bit is indicated by using n (n>=2) number of information signals (symbols), and, after applying a specific sequence to all of the subcarriers that are available for usage (e.g., 13 subcarriers), IFFT is performed so as to configure an information signal (symbol) of 3.2 us.

Different sequences may be applied to the subcarriers that are available for usage in accordance with a 3.2 us ON-signal and a 3.2 us OFF-signal. The 3.2 us OFF-signal may be generated by applying 0s to all of the coefficients.

The CP may select and use a part corresponding having a specific length at an end part of the information signal 3.2 us that immediately follows the CP. At this point, the CP may correspond to 0.4 us or 0.8 us. This length corresponds to the same length as the guard interval of 802.11ac.

Therefore, a 1-bit information corresponding to a general symbol having the symbol repetition method applied thereto may be indicated as shown below in the following table.

TABLE 4

| Information '0' | Information '1' |
|---|---|
| All 3.2 us OFF-signals or two specific consecutive signals are 3.2 us ON-signal + 3.2 us OFF-signal, and the remaining signals are all ON or all OFF or two specific consecutive signals are 3.2 us OFF-signal + 3.2 us ON-signal, and the remaining signals are all ON or all OFF or a specific number (or ceil(n/2) number or floor(n/2) number) of signals located at specific positions are 3.2 us OFF-signals, and the remaining signals are 3.2 us ON-signals Ex) ON + OFF + ON + OFF . . . | All 3.2 us ON-signals or two specific consecutive signals are 3.2 us OFF-signal + 3.2 us ON-signal, and the remaining signals are all ON or all OFF or two specific consecutive signals are 3.2 us ON-signal + 3.2 us OFF-signal, and the remaining signals are all ON or all OFF or a specific number (or ceil(n/2) number or floor(n/2) number) of signals located at specific positions are 3.2 us ON-signals, and the remaining signals are 3.2 us OFF-signals Ex) OFF + ON + OFF + ON + OFF . . . |

Table 4 does not separately indicate the CP. Actually, when including the CP, n number of (CP+3.2 us) or CP+n number of (3.2 us) may indicate one 1-bit information. More specifically, in case of the n number of (CP+3.2 us), the 3.2 us ON-signal may be regarded as a (CP+3.2 us) ON-signal, and the 3.2 us OFF-signal may be regarded as a (CP+3.2 us) OFF-signal.

As another example, a symbol having the symbol repetition method applied thereto may be indicated as CP+3.2 us+CP+3.2 us or CP+3.2 us+3.2 us.

According to this exemplary embodiment, 1 bit is indicated by using two information signals (symbols), and, after applying a specific sequence to all of the subcarriers that are available for usage (e.g., 13 subcarriers), IFFT is performed so as to configure an information signal (symbol) of 3.2 us.

Different sequences may be applied to the subcarriers that are available for usage in accordance with a 3.2 us ON-signal and a 3.2 us OFF-signal. The 3.2 us OFF-signal may be generated by applying 0s to all of the coefficients.

The CP may select and use a part corresponding having a specific length at an end part of the information signal 3.2 us that immediately follows the CP. At this point, the CP may correspond to 0.4 us or 0.8 us. This length corresponds to the same length as the guard interval of 802.11ac.

Therefore, a 1-bit information corresponding to a symbol having the symbol repetition method applied thereto may be indicated as shown below in the following table.

TABLE 5

| Information '0' | Information '1' |
|---|---|
| 3.2 us OFF-signal + 3.2 us OFF-signal or 3.2 us ON-signal + 3.2 us OFF-signal or 3.2 us OFF-signal + 3.2 us ON-signal | 3.2 us ON-signal + 3.2 us ON-signal or 3.2 us OFF-signal + 3.2 us ON-signal or 3.2 us ON-signal + 3.2 us OFF-signal |

Table 5 does not separately indicate the CP. Actually, when including the CP, CP+3.2 us+CP+3.2 us or CP+3.2 us+3.2 us may indicate one 1-bit information. More specifically, in case of CP+3.2 us+CP+3.2 us, the 3.2 us ON-signal may be regarded as a (CP+3.2 us) ON-signal, and the 3.2 us OFF-signal may be regarded as a (CP+3.2 us) OFF-signal.

As yet another example, a symbol having the symbol repetition method applied thereto may be indicated as CP+3.2 us+CP+3.2 us+CP+3.2 us or CP+3.2 us+3.2 us+3.2 us.

According to this exemplary embodiment, 1 bit is indicated by using three information signals (symbols), and, after applying a specific sequence to all of the subcarriers that are available for usage (e.g., 13 subcarriers), IFFT is performed so as to configure an information signal (symbol) of 3.2 us.

Different sequences may be applied to the subcarriers that are available for usage in accordance with a 3.2 us ON-signal and a 3.2 us OFF-signal. The 3.2 us OFF-signal may be generated by applying 0s to all of the coefficients.

The CP may select and use a part corresponding having a specific length at an end part of the information signal 3.2 us that immediately follows the CP. At this point, the CP may correspond to 0.4 us or 0.8 us. This length corresponds to the same length as the guard interval of 802.11ac.

Therefore, a 1-bit information corresponding to a symbol having the symbol repetition method applied thereto may be indicated as shown below in the following table.

TABLE 6

| Information '0' | Information '1' |
|---|---|
| 3.2 us OFF-signal + 3.2 us OFF-signal + 3.2 us OFF-signal or 3.2 us ON-signal + 3.2 us ON-signal + 3.2 us OFF-signal or 3.2 us ON-signal + 3.2 us OFF-signal + 3.2 us ON-signal | 3.2 us ON-signal + 3.2 us ON-signal + 3.2 us ON-signal or 3.2 us ON-signal + 3.2 us OFF-signal + 3.2 us ON-signal or 3.2 us ON-signal + 3.2 us ON-signal + 3.2 us OFF-signal |

TABLE 6-continued

| Information '0' | Information '1' |
|---|---|
| or 3.2 us ON-signal + | or 3.2 us OFF-signal + |
| 3.2 us OFF-signal + | 3.2 us ON-signal + |
| 3.2 us ON-signal | 3.2 us OFF-signal |

Table 6 does not separately indicate the CP. Actually, when including the CP, CP+3 0.2 us+CP+3 0.2 us+CP+3 0.2 us or CP+3 0.2 us+3 0.2 us+3.2 us may indicate one 1-bit information. More specifically, in case of CP+3.2 us+CP+3.2 us+CP+3.2 us, the 3.2 us ON-signal may be regarded as a (CP+3.2 us) ON-signal, and the 3.2 us OFF-signal may be regarded as a (CP+3.2 us) OFF-signal.

As yet another example, a symbol having the symbol repetition method applied thereto may be indicated as CP+3.2 us+CP+3.2 us+CP+3.2 us+CP+3.2 us or CP+3 0.2 us+3.2 us+3.2 us+3 0.2 us.

According to this exemplary embodiment, 1 bit is indicated by using four information signals (symbols), and, after applying a specific sequence to all of the subcarriers that are available for usage (e.g., 13 subcarriers), IFFT is performed so as to configure an information signal (symbol) of 3.2 us.

Different sequences may be applied to the subcarriers that are available for usage in accordance with a 3.2 us ON-signal and a 3.2 us OFF-signal. The 3.2 us OFF-signal may be generated by applying 0s to all of the coefficients.

The CP may select and use a part corresponding having a specific length at an end part of the information signal 3.2 us that immediately follows the CP. At this point, the CP may correspond to 0.4 us or 0.8 us. This length corresponds to the same length as the guard interval of 802.11ac.

Therefore, a 1-bit information corresponding to a symbol having the symbol repetition method applied thereto may be indicated as shown below in the following table.

TABLE 7

| Information '0' | Information '1' |
|---|---|
| 3.2 us OFF-signal + | 3.2 us ON-signal + |
| 3.2 us OFF-signal + | 3.2 us ON-signal + |
| 3.2 us OFF-signal + | 3.2 us ON-signal + |
| 3.2 us OFF-signal | 3.2 us ON-signal |
| or 3.2 us ON-signal + | or 3.2 us ON-signal + |
| 3.2 us ON-signal + | 3.2 us ON-signal + |
| 3.2 us ON-signal + | 3.2 us OFF-signal + |
| 3.2 us OFF-signal | 3.2 us ON-signal |
| or 3.2 us ON-signal + | or 3.2 us ON-signal + |
| 3.2 us ON-signal + | 3.2 us ON-signal + |
| 3.2 us OFF-signal + | 3.2 us ON-signal + |
| 3.2 us ON-signal | 3.2 us OFF-signal |
| or 3.2 us ON-signal + | or 3.2 us ON-signal + |
| 3.2 us ON-signal + | 3.2 us OFF-signal + |
| 3.2 us OFF-signal + | 3.2 us ON-signal + |
| 3.2 us ON-signal | 3.2 us ON-signal |

TABLE 7-continued

| Information '0' | Information '1' |
|---|---|
| or 3.2 us ON-signal + | or 3.2 us ON-signal + |
| 3.2 us OFF-signal + | 3.2 us ON-signal + |
| 3.2 us ON-signal + | 3.2 us OFF-signal + |
| 3.2 us ON-signal | 3.2 us ON-signal |
| or 3.2 us ON-signal + | or 3.2 us OFF-signal + |
| 3.2 us OFF-signal + | 3.2 us ON-signal + |
| 3.2 us ON-signal + | 3.2 us OFF-signal + |
| 3.2 us OFF-signal | 3.2 us ON-signal |
| or 3.2 us ON-signal + | or 3.2 us OFF-signal + |
| 3.2 us ON-signal + | 3.2 us OFF-signal + |
| 3.2 us OFF-signal + | 3.2 us ON-signal + |
| 3.2 us OFF-signal | 3.2 us ON-signal |
| or 3.2 us OFF-signal + | or 3.2 us ON-signal + |
| 3.2 us OFF-signal + | 3.2 us ON-signal + |
| 3.2 us ON-signal + | 3.2 us OFF-signal + |
| 3.2 us ON-signal | 3.2 us OFF-signal |

Table 7 does not separately indicate the CP. Actually, when including the CP, CP+3 0.2 us+CP+3 0.2 us+CP+3 0.2 us+CP+3.2 us or CP+3.2 us+3.2 us+3 0.2 us+3.2 us may indicate one 1-bit information. More specifically, in case of CP+3.2 us+CP+3.2 us+CP+3.2 us+CP+3.2 us, the 3.2 us ON-signal may be regarded as a (CP+3.2 us) ON-signal, and the 3.2 us OFF-signal may be regarded as a (CP+3.2 us) OFF-signal.

As yet another example, a symbol having Manchester coding applied thereto may be indicated as n number of (CP+1.6 us+CP+1.6 us) or CP+n number of (1.6 us+1.6 us).

According to this exemplary embodiment, 1 bit is indicated by a symbol that is repeated n (n>=2) number of times, and, after applying a specific sequence to all of the subcarriers that are available for usage (e.g., 13 subcarriers) and setting a coefficient of 0 for the remaining subcarriers, IFFT is performed so as to generate a signal (symbol) of 3.2 us having a cycle of 1.6 us. Herein, one of the configured signals is selected and set (or configured) as a 1.6 us information signal (symbol).

A sub-information may be referred to as a 1.6 us information signal. The 1.6 us information signal may correspond to a 1.6 us ON-signal or a 1.6 us OFF-signal. The 1.6 us ON-signal and the 1.6 us OFF-signal may have different sequences applied thereto in each subcarrier. The 1.6 us OFF-signal may be generated by applying 0s to all of the coefficients.

The CP may select and use a part corresponding having a specific length at an end part of the information signal 1.6 us that immediately follows the CP. At this point, the CP may correspond to 0.4 us or 0.8 us. This length corresponds to the same length as the guard interval of 802.11ac.

Therefore, a 1-bit information corresponding to a symbol having Manchester coding applied thereto based on symbol repetition may be indicated as shown below in the following table.

TABLE 8

| Information '0' | Information '1' |
|---|---|
| (1.6 us ON-signal + 1.6 us OFF-signal) is repeated n number of times | (1.6 us OFF-signal + 1.6 us ON-signal) is repeated n number of times |
| or (1.6 us OFF-signal + 1.6 us ON-signal) is repeated n number of times | or (1.6 us ON-signal + 1.6 us OFF-signal) is repeated n number of times |
| (1.6 us ON-signal + 1.6 us OFF-signal) + (1.6 us OFF-signal + 1.6 us ON-signal) is repeated floor(n/2) number of times + (1.6 us ON-signal + 1.6 us OFF-signal) when needed | (1.6 us OFF-signal + 1.6 us ON-signal) + (1.6 us ON-signal + 1.6 us OFF-signal) is repeated floor(n/2) number of times + (1.6 us OFF-signal + 1.6 us ON-signal) when needed |
| (1.6 us OFF-signal + 1.6 us ON-signal) + (1.6 us ON-signal + 1.6 us OFF-signal) is | (1.6 us ON-signal + 1.6 us OFF-signal) + (1.6 us OFF-signal + 1.6 us ON-signal) is |

TABLE 8-continued

| Information '0' | Information '1' |
|---|---|
| repeated floor(n/2) number of times + (1.6 us OFF-signal + 1.6 us ON-signal) when needed | repeated floor(n/2) number of times + (1.6 us ON-signal + 1.6 us OFF-signal) when needed |

Table 8 does not separately indicate the CP. Actually, when including the CP, n number of (CP+1.6 us+CP+1.6 us) or CP+n number of (1.6 us+1.6 us) may indicate one 1-bit information. More specifically, in case of the n number of (CP+1.6 us+CP+1.6 us), the 1.6 us ON-signal may be regarded as a (CP+1.6 us) ON-signal, and the 1.6 us OFF-signal may be regarded as a (CP+1.6 us) OFF-signal.

As shown in the above-described exemplary embodiments, by using the symbol repetition method, the range requirement of the low-power wake-up communication may be satisfied. In case of applying only the OOK scheme, the data rate for one symbol is 250 Kbps (4 us). At this point, if the symbol is repeated 2 times by using the symbol repetition method, the data rate may become 125 Kbps (8 us), and, if the symbol is repeated 4 times, the data rate may become 62.5 Kbps (16 us), and, if the symbol is repeated 8 times, the data rate may become 31.25 Kbps (32 us). In case of the low-power communication, if the BCC does not exist, the symbol should be repeated 8 times in order to satisfy the range requirement.

Hereinafter, various embodiments of a symbol subjected/applied to a symbol reduction scheme among symbol types that can be used for a WUR will be described.

Figure 29:
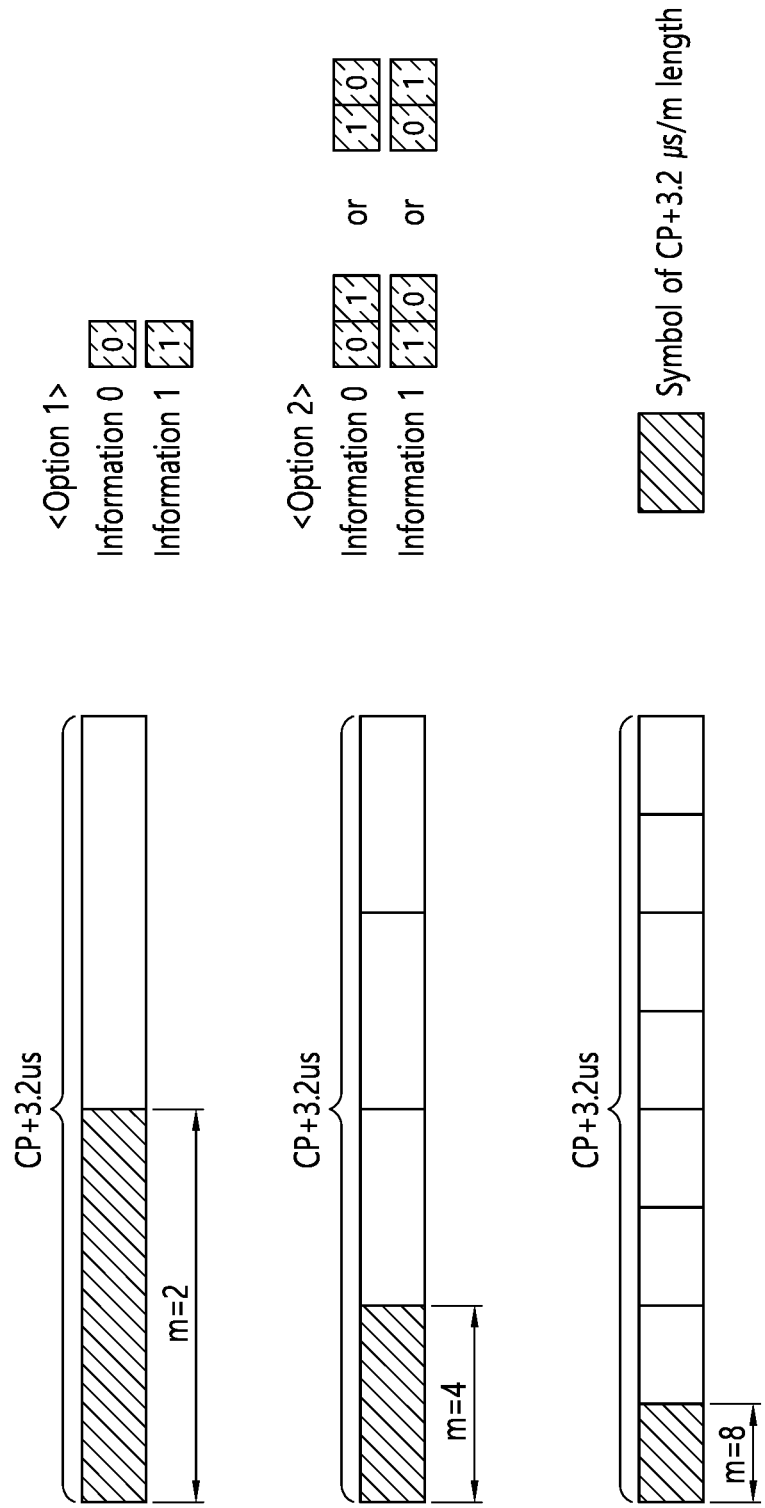
FIG. 29 shows various examples of a symbol reduction scheme according to an embodiment.

FIG. 29 shows various examples of a symbol reduction scheme according to an embodiment.

According to the embodiment of FIG. 29, as m increases, a symbol is reduced, and accordingly the length of a symbol carrying one piece of information is reduced. When m=2, the length of a symbol carrying one piece of information is CP+1.6 us. When m=4, the length of a symbol carrying one piece of information is CP+0.8 us. When m=8, the length of a symbol carrying one piece of information is CP+0.4 us.

The shorter a symbol length is, a higher data rate may be obtained. When only OOK is applied, a data rate for one symbol is 250 Kbps (4 us). In a case where a symbol reduction scheme is applied: when m=2, the data rate may be 500 Kbps (2 us); when m=4, the data rate may be 1 Mbps (1 us); when m=8, the data rate may be 2 Mbps (0.5 us).

For example, a symbol to which a symbol reduction scheme is applied may be represented as CP+3.2 us/m (m=2, 4, 8, 16, 32, . . . ) (Option 1).

As in Option 1 of FIG. 29, one bit is represented using a symbol to which a symbol reduction scheme is applied, a particular sequence is applied to all available subcarriers (for example, 13 subcarriers) by a unit of m subcarriers, and a coefficient of 0 is set for the remaining subcarriers. Then, IFFT is performed on the subcarriers to which the particular sequence is applied, thereby generating 3.2 us signals having a period of 3.2 us/m, one of which is mapped to a 3.2 us/m information signal (information 1).

For example, when a particular sequence is applied to 13 subcarriers by a unit of two subcarriers (m=2), an on signal may be configured as follows.

On signal (information 1); {a 0b 0 c 0 d 0 e 0 f 0 g} or {0 a 0 b 0 c 0 d 0 e 0 f 0}, where a, b, c, d, e, f, and g are 1 or −1.

In another example, when a particular sequence is applied to 13 subcarriers by a unit of four subcarriers (m=4), an on signal may be configured as follows.

On signal (information 1): {a 0 0 0 b 0 0 0 c 0 0 0 d}, {0 a 0 0 0 b 0 0 0 c 0 0 0}, {0 0 a 0 0 0 b 0 0 0 c 0 0}, {0 0 0 a 0 0 0 b 0 0 0 c 10}, or {0 0 a 0 0 0 0 0 0 0 b 0 0}, where a, b, c, and d are 1 or −1.

In still another example, when a particular sequence is applied to 13 subcarriers by a unit of eight subcarriers (m=8), an on signal may be configured as follows.

On signal (information 1): {a 0 0 0 0 0 0 0 b 0 0 0 0}, {0 a 0 0 0 0 0 0 0 b 0 0 0}, {0 0 a 0 0 0 0 0 0 0 b 0 0}, {0 0 0 a 0 0 0 0 0 0 0 b 0} or {0 0 0 0 a 0 0 0 0 0 0 0 b}, where a and b is 1 or −1.

A 3.2 us/m information signal is divided into a 3.2 us/m on signal and a 3.2 us/m off signal. Different sequences may be applied to (available) subcarriers for the 3.2 us/m on signal and the 3.2 us/m off signal. The 3.2 us/m off signal may be generated by applying 0 to all coefficients.

A CP may be used by adopting a specified length of the following 3.2 us/m information signal from the back. Here, the CP may be 0.4 us or 0.8 us. This length is the same as the length of a guard interval in 802.11ac. However, when m=8, the CP cannot be 0.8 us. Alternatively, the CP may be 0.1 us or 0.2 us and may be a different value.

Therefore, one-bit information corresponding to a symbol to which a general symbol reduction scheme is applied may be represented as in the following table.

TABLE 9

| Information 0 | Information 1 |
|---|---|
| 3.2 us/m OFF-signal | 3.2 us/m ON-signal |

In Table 9, the CP is not indicated. Actually, CP+3.2 us/m including the CP may indicate one one-bit information. That is, the 3.2 us/m on signal may be considered as a CP+3.2 us/m on signal, and the 3.2 us/m off signal may be considered as a CP+3.2 us/m off signal.

In another example, a symbol to which a symbol reduction scheme is applied may be represented as CP+3.2 us/m+CP+3.2 us/m (m=2, 4, 8) (Option 2).

In OOK transmission using a Wi-Fi transmission device, the time used to transmit one bit (or symbol) excluding a guard interval of a transmission signal is 3.2 us. Here, when a symbol reduction scheme is applied, the time used to transmit one bit is 3.2 us/m. However, in this embodiment, the time used to transmit one bit is set to 3.2 us/m+3.2 us/m by repeating a symbol to which the symbol reduction scheme is applied, and transition in signal size between 3.2 us/m signals is allowed to occur using characteristics of Manchester coding. That is, each piece of sub-information having a length of 3.2 us/m needs to have a value of 0 or 1, and a signal may be configured as follows.

Information 0->1 0 (each may be called sub-information 1 or 0, or sub-symbol 1 (ON) or 0 (OFF))

First 3.2 us/m signal (sub-information 1 or sub-symbol 1): A particular sequence is applied by a unit of m spaces to all subcarriers (for example, 13 subcarriers) available to generate a symbol to which a symbol reduction scheme is applied. That is, the particular sequence may have a coefficient at intervals of m spaces. The transmission device maps particular sequences to K consecutive subcarriers among 64 subcarriers, sets a coefficient of 0 for the remaining subcarriers, and performs IFFT the subcarriers. Accordingly, a time-domain signal may be generated. Since the time-domain signal has a coefficient at intervals of m spaces in the frequency domain, a 3.2 us signal having a period of 3.2 us/m is generated. One of these signals may be adopted and used as a 3.2 us/m on signal (sub-information 1).

Second 3.2 us/m signal (sub-information 0 or sub-symbol 0): Similarly to the first 3.2 us/m signal, the transmission device may map particular sequences to K consecutive subcarriers among 64 subcarriers and may perform IFFT thereon, thereby generating a time-domain signal. Sub-information 0 may correspond to a 3.2 us/m off signal. The 3.2 us/m off signal may be generated by setting all coefficients to 0.

One of the first and second 3.2 us/m periodic signals of the time-domain signals may be selected and used as sub-information 0.

Information 1->0 1 (each may be called sub-information 0 or 1, or sub-symbol 0 (OFF) or 1 (ON))

Since information 1 is also divided into a first 3.2 us/m signal (sub-information 0) and a second 3.2 us/m signal (sub-information 1), a signal corresponding to each sub-information may be configured in the same manner as used for generating information 0.

Information 0 may be configured as 01, and information 1 may be configured as 10.

As in Option 2 of FIG. 29, one-bit information corresponding to a symbol to which a symbol reduction scheme is applied may be represented as in the following table.

TABLE 10

| Information 0 | Information 1 |
|---|---|
| 3.2 us/m OFF-signal + | 3.2 us/m ON-signal + |
| 3.2 us/m ON-signal or | 3.2 us/m OFF-signal or |
| 3.2 us/m ON-signal + | 3.2 us/m OFF-signal + |
| 3.2 us/m OFF-signal | 3.2 us/m ON-signal |

In Table 10, the CP is not indicated. Actually, CP+3.2 us/m including the CP may indicate one one-bit information. That is, the 3.2 us/m on signal may be considered as a CP+3.2 us/m on signal, and the 3.2 us/m off signal may be considered as a CP+3.2 us/m off signal.

Embodiments of Option 1 and Option 2 in FIG. 29 may be generalized as in the following table.

TABLE 11

| | Information 0 | Information 1 |
|---|---|---|
| Option 1 (m = 2, 4, 8) | 2 us OFF-signal | 2 us ON-signal |
| | 1 us OFF-signal | 1 us ON-signal |
| | 0.5 us OFF-signal | 0.5 us ON-signal |
| Option 2 (m = 4, 8) | 1 us OFF-signal + | 1 us ON-signal + |
| | 1 us ON-signal or | 1 us OFF-signal or |
| | 1 us ON-signal + | 1 us OFF-signal + |
| | 1 us OFF-signal | 1 us ON-signal |
| | 0.5 us OFF-signal + | 0.5 us ON-signal + |
| | 0.5 us ON-signal or | 0.5 us OFF-signal or |
| | 0.5 us ON-signal + | 0.5 us OFF-signal + |
| | 0.5 us OFF-signal | 0.5 us ON-signal |

In Table 11, each signal is represented by a length including a CP. That is, CP+3.2 us/m including a CP may indicate one one-bit information.

For example, when m=4 in Option 2, since the length of a symbol carrying one piece of information is CP+0.8 us, a 1 us off signal or 1 us on signal includes a CP (0.2 us)+0.8 us signal. In Option 2, since Manchester coding is applied, a symbol is repeated. Thus, when m=4, data rate for one piece of information may be 500 Kbps.

In another example, when m=8 in Option 2, since the length of a symbol carrying one piece of information is CP+0.4 us, a 0.5 us off signal or a 0.5 us on signal includes a CP (0.1 us)+0.4 us signal. In Option 2, since Manchester coding is applied, a symbol is repeated. Thus, when m=8, data rate for one piece of information may be 1 Mbps.

The following table shows data rates that can be obtainable through the foregoing embodiments.

TABLE 12

| CP | Default symbol (Embodiment 1) (CP + 3.2 us) | Man. Symbol (Embodiment 2) (CP + 1.6 + CP + 1.6) | Man. Symbol (Embodiment 3) (CP + 1.6 + 1.6) |
|---|---|---|---|
| 0.4 us | 277.8 | 250.0 | 277.8 |
| 0.8 us | 250.0 | 208.3 | 250.0 |

TABLE 13

| | Symbol rep. n (CP + 3.2 us) | | | Symbol rep. CP + n (3.2 us) | | | Man. symbol rep. n (CP + 1.6 us + CP + 1.6 us) | | |
|---|---|---|---|---|---|---|---|---|---|
| CP | n = 2 (Embodiment 4) | n = 3 (Embodiment 5) | n = 4 (Embodiment 6) | n = 2 (Embodiment 7) | n = 3 (Embodiment 8) | n = 4 (Embodiment 9) | n = 2 (Embodiment 10) | n = 3 (Embodiment 11) | n = 4 (Embodiment 12) |
| 0.4 us | 138.9 | 92.6 | 69.4 | 147.1 | 100.0 | 75.8 | 125.0 | 83.3 | 62.5 |
| 0.8 us | 125.0 | 83.3 | 62.5 | 138.9 | 96.2 | 73.5 | 104.2 | 69.4 | 52.1 |

TABLE 14

| CP | Man. symbol rep. CP + n (1.6 us + 1.6 us) | | | Symbol reduction CP + 3.2 us/m | | |
|---|---|---|---|---|---|---|
| | n = 2 (Embodiment 13) | n = 3 (Embodiment 14) | n = 4 (Embodiment 15) | m = 2 (Embodiment 16) | m = 4 (Embodiment 17) | m = 8 (Embodiment 18) |
| 0.4 us | 147.1 | 100.0 | 75.8 | 500.0 | 833.3 | 1250.0 |
| 0.8 us | 138.9 | 96.2 | 73.5 | 416.7 | 625.0 | NA |

TABLE 15

| CP | Symbol reduction CP + 3.2 us/m | | Man. symbol rep. w/Man. CP + 3.2 us/m + CP + 3.2 us/m | |
|---|---|---|---|---|
| | m = 4 | m = 8 | m = 4 | m = 8 |
| 0.1 us | 1111.1 | 2000 | 555.6 | 1000 |
| 0.2 us | 1000 | 1666.7 | 500 | 833.3 |

Hereinafter, there is proposed a method of transmitting a wake-up frame (WUR frame) using an HE PPDU (high efficiency PPDU or HEW PPDU) according to the 802.11ax standard in the 802.11ba system. Specifically, there is proposed a method of transmitting a 11ax data frame and at the same time, a WUR frame using center three 26-tone RUs of the 802.11ax system in the IEEE 802.11ba system.

A wake-up frame may be transmitted using a narrow band for power consumption or a performance gain. Meanwhile, in 802.11ax, an OFDMA scheme has been incorporated as a mandatory feature. When an HE MU PPDU is transmitted, assignment information for an RU in which each user data is transmitted has been carried on an HE-SIG-B. 40 entries of them have been reserved. Signaling for a case where a WUR packet is carried may be additionally taken into consideration using the 40 entries. That is, an ax STA may be signaled that an RU on which a WUR packet is carried has been empty. There is proposed a bit index for the signaling. In this case, there is proposed that the RU on which the WUR packet is carried include center three 26 tone RUs in 20 MHz. Data transmitted to one WUR STA may be carried on each of the three 26 tone RUs, but a situation in which data is transmitted to one WUR STA using the three RU may be taken into consideration.

First, if center three 26 tone RUs are used for a WUR packet, there is proposed an RU entry and bit index on which 11ax data is carried. If center three 26 tone RUs are used for a WUR packet in 20 MHz, the entry of an RU on which 11 ax data is carried includes the following four cases.

TABLE 16

| #1 | #2 | #3 | #4 | #5 | #6 | #7 | #8 | #9 |
|---|---|---|---|---|---|---|---|---|
| 26 | 26 | 26 | — | — | — | 26 | 26 | 26 |
| 26 | 26 | 26 | — | — | — | 26 | 52 | |
| | 52 | 26 | — | — | — | 26 | 26 | 26 |
| | 52 | 26 | — | — | — | 26 | 52 | |

In this case, the bit index may be signed using four of the reserved bits of Table 17 and Table 18.

TABLE 17

| 011101$x_1x_0$ | Reserved | 4 |
|---|---|---|
| 01111$y_2y_1y_0$ | Reserved | 8 |

TABLE 18

| 111$x_4x_3x_2x_1x_0$ | Reserved | 32 |
|---|---|---|

Embodiment 1

An RU on which 11 ax data is carried may be indicated like Table 19 using 011101$x_1x_0$ of Table 17. An ax STA may have been signaled that center three 26 tone RUs have been empty. Accordingly, a WUR STA may transmit a WUR packet using the center three 26 tone RUs. The same principle may be applied to the following embodiments.

TABLE 19

| Bit indices | #1 | #2 | #3 | #4 | #5 | #6 | #7 | #8 | #9 |
|---|---|---|---|---|---|---|---|---|---|
| 01110100 | 26 | 26 | 26 | — | — | — | 26 | 26 | 26 |
| 01110101 | 26 | 26 | 26 | — | — | — | 26 | 52 | |
| 01110110 | | 52 | 26 | — | — | — | 26 | 26 | 26 |
| 01110111 | | 52 | 26 | — | — | — | 26 | 52 | |

Embodiment 2

An RU on which 11 ax data is carried may be indicated like Table 20 using 01111$y_2y_1y_0$ of Table 17. In this case, $y_2$ may be fixed to 1.

TABLE 20

| Bit indices | #1 | #2 | #3 | #4 | #5 | #6 | #7 | #8 | #9 |
|---|---|---|---|---|---|---|---|---|---|
| 01111100 | 26 | 26 | 26 | — | — | — | 26 | 26 | 26 |
| 01111101 | 26 | 26 | 26 | — | — | — | 26 | 52 | |
| 01111110 | | 52 | 26 | — | — | — | 26 | 26 | 26 |
| 01111111 | | 52 | 26 | — | — | — | 26 | 52 | |

Embodiment 3

An RU on which 11ax data is carried may be indicated like Table 21 to Table 28 using 111$x_4x_3x_2x_1x_0$ of Table 18.

TABLE 21

| Bit indices | #1 | #2 | #3 | #4 | #5 | #6 | #7 | #8 | #9 |
|---|---|---|---|---|---|---|---|---|---|
| 11100000 | 26 | 26 | 26 | — | — | — | 26 | 26 | 26 |
| 11100001 | 26 | 26 | 26 | — | — | — | 26 | 52 | |
| 11100010 | | 52 | 26 | — | — | — | 26 | 26 | 26 |
| 11100011 | | 52 | 26 | — | — | — | 26 | 52 | |

Embodiment 4

TABLE 22

| Bit indices | #1 | #2 | #3 | #4 | #5 | #6 | #7 | #8 | #9 |
|---|---|---|---|---|---|---|---|---|---|
| 11100100 | 26 | 26 | 26 | — | — | — | 26 | 26 | 26 |
| 11100101 | 26 | 26 | 26 | — | — | — | 26 | 52 | |
| 11100110 | 52 | | 26 | — | — | — | 26 | 26 | 26 |
| 11100111 | 52 | | 26 | — | — | — | 26 | 52 | |

Embodiment 5

TABLE 23

| Bit indices | #1 | #2 | #3 | #4 | #5 | #6 | #7 | #8 | #9 |
|---|---|---|---|---|---|---|---|---|---|
| 11101000 | 26 | 26 | 26 | — | — | — | 26 | 26 | 26 |
| 11101001 | 26 | 26 | 26 | — | — | — | 26 | 52 | |
| 11101010 | 52 | | 26 | — | — | — | 26 | 26 | 26 |
| 11101011 | 52 | | 26 | — | — | — | 26 | 52 | |

Embodiment 6

TABLE 24

| Bit indices | #1 | #2 | #3 | #4 | #5 | #6 | #7 | #8 | #9 |
|---|---|---|---|---|---|---|---|---|---|
| 11101100 | 26 | 26 | 26 | — | — | — | 26 | 26 | 26 |
| 11101101 | 26 | 26 | 26 | — | — | — | 26 | 52 | |
| 11101110 | 52 | | 26 | — | — | — | 26 | 26 | 26 |
| 11101111 | 52 | | 26 | — | — | — | 26 | 52 | |

Embodiment 7

TABLE 25

| Bit indices | #1 | #2 | #3 | #4 | #5 | #6 | #7 | #8 | #9 |
|---|---|---|---|---|---|---|---|---|---|
| 11110000 | 26 | 26 | 26 | — | — | — | 26 | 26 | 26 |
| 11110001 | 26 | 26 | 26 | — | — | — | 26 | 52 | |
| 11110010 | 52 | | 26 | — | — | — | 26 | 26 | 26 |
| 11110011 | 52 | | 26 | — | — | — | 26 | 52 | |

Embodiment 8

TABLE 26

| Bit indices | #1 | #2 | #3 | #4 | #5 | #6 | #7 | #8 | #9 |
|---|---|---|---|---|---|---|---|---|---|
| 11110100 | 26 | 26 | 26 | — | — | — | 26 | 26 | 26 |
| 11110101 | 26 | 26 | 26 | — | — | — | 26 | 52 | |
| 11110110 | 52 | | 26 | — | — | — | 26 | 26 | 26 |
| 11110111 | 52 | | 26 | — | — | — | 26 | 52 | |

Embodiment 9

TABLE 27

| Bit indices | #1 | #2 | #3 | #4 | #5 | #6 | #7 | #8 | #9 |
|---|---|---|---|---|---|---|---|---|---|
| 11111000 | 26 | 26 | 26 | — | — | — | 26 | 26 | 26 |
| 11111001 | 26 | 26 | 26 | — | — | — | 26 | 52 | |
| 11111010 | 52 | | 26 | — | — | — | 26 | 26 | 26 |
| 11111011 | 52 | | 26 | — | — | — | 26 | 52 | |

Embodiment 10

TABLE 28

| Bit indices | #1 | #2 | #3 | #4 | #5 | #6 | #7 | #8 | #9 |
|---|---|---|---|---|---|---|---|---|---|
| 11111100 | 26 | 26 | 26 | — | — | — | 26 | 26 | 26 |
| 11111101 | 26 | 26 | 26 | — | — | — | 26 | 52 | |
| 11111110 | 52 | | 26 | — | — | — | 26 | 26 | 26 |
| 11111111 | 52 | | 26 | — | — | — | 26 | 52 | |

Hereinafter, more specifically, there is proposed a tone plan for transmitting an ON-signal in center three 26 tone RUs for a WUR packet (or WUR data). A tone plan for transmitting an ON-signal in center three 26 tone RUs is described with reference to FIGS. 4 to 6 showing the arrangement of RUs used on an 20 MHz/40 MHz/80 MHz band.

<Tone Plan in 20 MHz Band>

As in FIG. 4, the tone indices of center three 26 tone RUs are −42~42 including DC in 20 MHz. When a WUR packet is transmitted, 4 MHz may be commonly taken into consideration. In this case, tone indices −26~25 or −25~26 may be used. In this case, DC may be −3~3 (or −1~1). The tone plan may be configured by inserting a coefficient of 1 or −1 into a 4 MHz tone and inserting a coefficient of 0 into the remaining tones of the three 26 tone RUs.

That is, if a 4 MHz band of −26~25 is taken into consideration, a coefficient of 1 or −1 is inserted into −26~−4 (or −2) and 4 (or 2)~25, and a coefficient of 0 is inserted into −3~3 (or −1~1), −42~−27, 26~42.

Or a coefficient of 1 or −1 may be inserted into only a tone having a tone index of a multiple of 2, a multiple of 4 or a multiple of 8 (2-box unit, 4-box unit or 8-box unit) other than DC of a 4 MHz band. A coefficient of 0 may be inserted into tones within three 26 tone RUs.

Or a coefficient of a 1×, 2×, 4× HE-LTF or a 1×, 2× HE-STF having the same tone index may be inserted into a coefficient within a 4 MHz band. A coefficient of 0 may be inserted into tones within other three 26 tone RUs. The role of a guard tone can be performed by inserting a coefficient of 0 into a tone having a −42~−27 and 26~42 tone index. The guard tone may perform the role of reducing interference from a surrounding tone RU.

<Tone Plan in 40 MHz Band>

As in FIG. 5, the tone indices of center three 26 tone RUs of each 20 MHz subband of 40 MHz are −163~−84 in a left 20 MHz subband including a null subcarrier, and are 84~163 in a right 20 MHz subband. When a WUR packet is transmitted, 4 MHz may be commonly taken into consideration. In this case, −149~−98 may be used as tone indices in a left 20 MHz subband, and 98~149 may be used as tone indices in a right 20 MHz subband. In this case, in the null subcarrier, tone indices are −137, −110 in the left 20 MHz subband and are 110, 137 in the right 20 MHz subband. The tone plan may be configured by inserting a coefficient of 1 or −1 the remaining 4 MHz tone and inserting a coefficient of 0 into the remaining tones of the three 26 tone RUs.

Or a coefficient of 1 or −1 may also be inserted into the null subcarrier.

Or a coefficient of a 1×, 2×, 4× HE-LTF or a 1×, 2× HE-STF having the same tone index may be inserted into a coefficient within a 4 MHz band. A coefficient of 0 may be inserted into tones within the remaining three 26 tone RUs. The role of a guard tone can be performed by inserting a coefficient of 0 into the tone indices of −163~−150 and −97~−84 of a left 20 MHz subband and the tone indices of 84~97 and 150~163 of a right 20 MHz subband. The guard tone can perform the role of reducing interference from a surrounding tone RU.

<Tone Plan in 80 MHz Band>

As in FIG. 6, the tone indies of center three 26 tone RUs of each 20 MHz subband of 80 MHz are −419~−340 in a first 20 MHz subband including a null subcarrier, and are −177~−98 in a second 20 MHz subband, and are 98~177 in a third 20 MHz subband, and are 340~419 in a fourth 20 MHz subband. When a WUR packet is transmitted, 4 MHz may be commonly taken into consideration. In this case, tone indices may be −405~−354 in the first 20 MHz subband, may be −163~−112 in the second 20 MHz subband, may be 112~163 in the third 20 MHz subband, and may be 354~405 in the fourth 20 MHz subband. In this case, in the null subcarrier, tone indices are −393, −366 in the first 20 MHz subband, tone indices are −151, −124 in the second 20 MHz subband, tone indices are 124, 151 in the third 20 MHz subband, and tone indices are 366, 393 in the fourth 20 MHz subband. The tone plan may be configured by inserting a coefficient of 1 or −1 into the remaining 4 MHz tone and inserting a coefficient of 0 into the remaining tones of the three 26 tone RUs.

Or a coefficient of 1 or −1 may also be inserted into the null subcarrier.

Or a coefficient of a 1×, 2×, 4× HE-LTF or 1×, 2× HE-STF having the same tone index may be inserted into a coefficient within the 4 MHz band. A coefficient of 0 may be inserted into tones within the remaining three 26 tone RUs. The role of a guard tone can be performed by inserting a coefficient of 0 into the tone indices −419~−406 and −353~−340 of the first 20 MHz subband, the tone indices −177~−164 and −111~−98 of the second 20 MHz subband, the tone indices 98~111 and 164~177 of the third 20 MHz subband, and the tone indices 340~353 and 406~419 of the fourth 20 MHz subband. The guard tone can perform the role of reducing interference from a surrounding tone RU.

As described above, a coefficient of the 1×, 2×, 4×HE-LTF or 1×, 2× HE-STF having the same tone index may be inserted into the tones of a 4 MHz band in which a wake-up packet is transmitted without any change. This is described specifically below.

First, a coefficient of a 1×, 2×, 4×HE-LTF sequence may be used for the tone index of an RU used for the transmission of a wake-up packet without any change.

An example of a 1×LTF sequence for a 20 MHz band may be determined as follows.

$$HELTF_{-122,122}=\{0,0,-1,0,0,0,+1,0,0,0,+1,0,0,0,-1,0,$$
$$0,0,+1,0,0,0,-1,0,0,0,+1,0,0,0,+1,0,0,0,+1,0,0,0,+$$
$$1,0,0,0,-1,0,0,0,-1,0,0,0,+1,0,0,0,+1,0,0,0,+1,0,$$
$$0,0,-1,0,0,0,-1,0,0,0,-1,0,0,0,+1,0,0,0,-1,0,0,0,-$$
$$1,0,0,0,+1,0,0,0,+1,0,0,0,-1,0,0,0,-1,0,0,0,+1,0,$$
$$0,0,-1,0,0,0,-1,0,0,0,+1,0,0,0,-1,0,0,0,0,0,0,0,-$$
$$1,0,0,0,+1,0,0,0,+1,0,0,0,+1,0,0,0,+1,0,0,0,+1,0,$$
$$0,0,+1,0,0,0,-1,0,0,0,-1,0,0,0,-1,0,0,0,-1,0,0,0,-$$
$$1,0,0,0,+1,0,0,0,-1,0,0,0,-1,0,0,0,-1,0,0,0,+1,0,$$
$$0,0,-1,0,0,0,-1,0,0,0,+1,0,0,0,-1,0,0,0,-1,0,0,0,+$$
$$1,0,0,0,-1,0,0,0,+1,0,0,0,-1,0,0,0,-1,0,0,0,-1,0,$$
$$0,0,-1,0,0,0,-1,0,0\}$$ [Equation 1]

An example of a 1×LTF sequence for a 40 MHz band may be determined as follows.

$$HELTF_{-244,244}=\{+1,0,0,0,+1,0,0,0,+1,0,0,0,+1,0,0,0,-$$
$$1,0,0,0,+1,0,0,0,+1,0,0,0,-1,0,0,0,-1,0,0,0,+1,0,$$
$$0,0,-1,0,0,0,+1,0,0,0,-1,0,0,0,+1,0,0,0,-1,0,0,0,-$$
$$1,0,0,0,+1,0,0,0,-1,0,0,0,+1,0,0,0,+1,0,0,0,+1,0,$$
$$0,0,-1,0,0,0,-1,0,0,0,+1,0,0,0,+1,0,0,0,+1,0,0,0,+$$
$$1,0,0,0,+1,0,0,0,+1,0,0,0,+1,0,0,0,+1,0,0,0,-1,0,$$
$$0,0,+1,0,0,0,+1,0,0,0,-1,0,0,0,-1,0,0,0,+1,0,0,0,-$$
$$1,0,0,0,+1,0,0,0,-1,0,0,0,+1,0,0,0,-1,0,0,0,-1,0,$$
$$0,0,+1,0,0,0,-1,0,0,0,+1,0,0,0,+1,0,0,0,+1,0,0,0,-$$
$$1,0,0,0,-1,0,0,0,+1,0,0,0,+1,0,0,0,+1,0,0,0,+1,0,$$
$$0,0,-1,0,0,0,+1,0,0,0,-1,0,0,0,+1,0,0,0,-1,0,0,0,-$$
$$1,0,0,0,-1,0,0,0,0,0,0,+1,0,0,0,+1,0,0,0,-1,0,0,$$
$$0,-1,0,0,0,+1,0,0,0,-1,0,0,0,+1,0,0,0,+1,0,0,0,+1,$$
$$0,0,0,+1,0,0,0,+1,0,0,0,+1,0,0,0,-1,0,0,0,+1,0,0,$$
$$0,+1,0,0,0,-1,0,0,0,-1,0,0,0,+1,0,0,0,-1,0,0,0,+1,$$
$$0,0,0,+1,0,0,0,+1,0,0,0,+1,0,0,0,+1,0,0,0,-1,0,0,$$
$$0,+1,0,0,0,-1,0,0,0,-1,0,0,0,-1,0,0,0,+1,0,0,0,+1,$$
$$0,0,0,-1,0,0,0,-1,0,0,0,-1,0,0,0,+1,0,0,0,-1,0,0,$$
$$0,-1,0,0,0,-1,0,0,0,-1,0,0,0,+1,0,0,0,-1,0,0,0,-1,$$
$$0,0,0,+1,0,0,0,+1,0,0,0,-1,0,0,0,+1,0,0,0,-1,0,0,$$
$$0,-1,0,0,0,-1,0,0,0,-1,0,0,0,+1,0,0,0,-1,0,0,0,-1,$$
$$0,0,0,+1,0,0,0,+1,0,0,0,+1,0,0,0,-1,0,0,0,-1,0,0,$$
$$0,+1,0,0,0,+1,0,0,0,+1\}$$ [Equation 2]

An example of a 1×LTF sequence for an 80 MHz band may be determined as follows.

$$HELTF_{-500,500}=\{-1,0,0,0,-1,0,0,0,+1,0,0,0,+1,0,0,0,+$$
$$1,0,0,0,+1,0,0,0,+1,0,0,0,-1,0,0,0,-1,0,0,0,-1,0,$$
$$0,0,+1,0,0,0,+1,0,0,0,-1,0,0,0,-1,0,0,0,+1,0,0,0,-$$
$$1,0,0,0,+1,0,0,0,-1,0,0,0,-1,0,0,0,-1,0,0,0,-1,0,$$
$$0,0,-1,0,0,0,-1,0,0,0,+1,0,0,0,+1,0,0,0,-1,0,0,0,-$$
$$1,0,0,0,+1,0,0,0,-1,0,0,0,+1,0,0,0,-1,0,0,0,-1,0,$$
$$0,0,-1,0,0,0,-1,0,0,0,-1,0,0,0,+1,0,0,0,+1,0,0,0,-$$
$$1,0,0,0,-1,0,0,0,+1,0,0,0,-1,0,0,0,+1,0,0,0,-1,0,$$
$$0,0,+1,0,0,0,+1,0,0,0,+1,0,0,0,+1,0,0,0,+1,0,0,0,-$$
$$1,0,0,0,-1,0,0,0,+1,0,0,0,+1,0,0,0,-1,0,0,0,+1,0,$$
$$0,0,-1,0,0,0,+1,0,0,0,-1,0,0,0,-1,0,0,0,-1,0,0,0,-$$
$$1,0,0,0,+1,0,0,0,-1,0,0,0,-1,0,0,0,-1,0,0,0,-1,0,$$
$$0,0,-1,0,0,0,-1,0,0,0,+1,0,0,0,+1,0,0,0,+1,0,0,0,-$$
$$1,0,0,0,-1,0,0,0,+1,0,0,0,+1,0,0,0,-1,0,0,0,+1,0,$$
$$0,0,-1,0,0,0,+1,0,0,0,+1,0,0,0,+1,0,0,0,+1,0,0,0,+$$
$$1,0,0,0,+1,0,0,0,-1,0,0,0,-1,0,0,0,+1,0,0,0,+1,0,$$
$$0,0,-1,0,0,0,+1,0,0,0,-1,0,0,0,+1,0,0,0,+1,0,0,0,+$$
$$1,0,0,0,+1,0,0,0,-1,0,0,0,+1,0,0,0,+1,0,0,0,-1,0,$$
$$0,0,-1,0,0,0,+1,0,0,0,-1,0,0,0,+1,0,0,0,-1,0,0,0,+$$
$$1,0,0,0,+1,0,0,0,+1,0,0,0,+1,0,0,0,+1,0,0,0,-1,0,$$
$$0,0,-1,0,0,0,+1,0,0,0,+1,0,0,0,-1,0,0,0,+1,0,0,0,-$$
$$1,0,0,0,+1,0,0,0,-1,0,0,0,-1,0,0,0,-1,0,0,0,-1,0,$$
$$0,0,+1,0,0,0,-1,0,0,0,+1,0,0,0,-1,0,0,0,-1,0,0,0,$$
$$0,0,0,-1,0,0,0,+1,0,0,0,+1,0,0,0,-1,0,0,0,-1,0,$$
$$0,0,+1,0,0,0,+1,0,0,0,-1,0,0,0,-1,0,0,0,+1,0,0,0,+$$
$$1,0,0,0,-1,0,0,0,+1,0,0,0,+1,0,0,0,+1,0,0,0,+1,0,$$
$$0,0,+1,0,0,0,+1,0,0,0,+1,0,0,0,+1,0,0,0,-1,0,0,0,-$$
$$1,0,0,0,+1,0,0,0,+1,0,0,0,-1,0,0,0,+1,0,0,0,-1,0,$$
$$0,0,+1,0,0,0,+1,0,0,0,+1,0,0,0,+1,0,0,0,-1,0,0,0,+$$
$$1,0,0,0,+1,0,0,0,+1,0,0,0,+1,0,0,0,-1,0,0,0,-1,0,$$
$$0,0,-1,0,0,0,+1,0,0,0,+1,0,0,0,-1,0,0,0,+1,0,0,0,+$$
$$1,0,0,0,+1,0,0,0,+1,0,0,0,+1,0,0,0,-1,0,0,0,+1,0,$$
$$0,0,+1,0,0,0,-1,0,0,0,-1,0,0,0,+1,0,0,0,-1,0,0,0,-$$
$$1,0,0,0,+1,0,0,0,-1,0,0,0,+1,0,0,0,-1,0,0,0,-1,0,$$
$$0,0,-1,0,0,0,-1,0,0,0,+1,0,0,0,-1,0,0,0,+1,0,0,0,-$$
$$1,0,0,0,-1,0,0,0,-1,0,0,0,+1,0,0,0,+1\}$$ [Equation 3]

An example of a 2×LTF sequence for a 20 MHz band may be determined as follows.

$$HELTF_{-122,22}=\{-1,0,-1,0,-1,0,+1,0,+1,0,-1,0,+1,0,-$$
$$1,0,-1,0,-1,0,-1,0,+1,0,-1,0,+1,0,-1,0,-1,0,+1,$$
$$0,+1,0,-1,0,+1,0,+1,0,+1,0,+1,0,+1,0,-1,0,+1,0,-$$
$$1,0,+1,0,-1,0,-1,0,+1,0,+1,0,-1,0,+1,0,-1,0,-1,$$

0,-1,0,-1,0,+1,0,-1,0,+1,0,+1,0,+1,0,-1,0,-1,0,+
1,0,-1,0,-1,0,-1,0,-1,0,-1,0,+1,0,-1,0,-1,0,-1,
0,+1,0,+1,0,+1,0,-1,0,-1,0,+1,0,0,0,+1,0,-1,0,+
1,0,+1,0,-1,0,+1,0,+1,0,-1,0,+1,0,+1,0,-1,0,-1,
0,+1,0,-1,0,+1,0,+1,0,+1,0,+1,0,-1,0,+1,0,-1,0,+
1,0,+1,0,-1,0,-1,0,+1,0,-1,0,-1,0,-1,0,-1,
0,+1,0,-1,0,+1,0,+1,0,-1,0,-1,0,+1,0,+1,0,-1,0,+
1,0,-1,0,-1,0,-1,0,-1,0,+1,0,-1,0,+1,0,+1,0,+1,
0,-1,0,-1,0,+1,0,-1,0,-1,0,-1,0,-1,0,-1,0,+1,0,-
1,0,+1}       [Equation 4]

An example of a 2×LTF sequence for a 40 MHz band may be determined as follows.

$HELTF_{-244,244}$={+1,0,-1,0,-1,0,-1,0,-1,0,-1,0,+1,
0,+1,0,-1,0,-1,0,+1,0,-1,0,+1,0,-1,0,-1,0,-
1,0,-1,0,-1,0,+1,0,+1,0,+1,0,+1,0,-1,0,+1,0,-1,
0,+1,0,+1,0,-1,0,-1,0,-1,0,-1,0,-1,0,+1,0,+1,0,-
1,0,-1,0,-1,0,-1,0,+1,0,-1,0,+1,0,+1,0,+1,
0,+1,0,-1,0,-1,0,-1,0,-1,0,+1,0,-1,0,+1,0,-1,0,+
1,0,+1,0,+1,0,+1,0,+1,0,-1,0,+1,0,-1,0,-1,0,+1,
0,-1,0,-1,0,-1,0,+1,0,-1,0,+1,0,+1,0,+1,0,+1,0,-
1,0,-1,0,+1,0,+1,0,-1,0,-1,0,-1,0,+1,0,+1,0,+1,
0,+1,0,+1,0,+1,0,-1,0,-1,0,-1,0,+1,0,+1,0,-1,0,+
1,0,-1,0,-1,0,+1,0,-1,0,-1,0,-1,0,-1,0,+1,0,+1,
0,-1,0,+1,0,+1,0,+1,0,-1,0,-1,0,+1,0,0,0,+1,0,+
1,0,+1,0,-1,0,-1,0,-1,0,+1,0,-1,0,+1,0,-1,
0,0,0,0,0,0,-1,0,-1,0,-1,0,-1,0,-1,0,+1,0,+1,
0,-1,0,-1,0,+1,0,-1,0,+1,0,-1,0,-1,0,-1,0,-1,0,-
1,0,-1,0,+1,0,-1,0,+1,0,+1,0,-1,0,+1,0,+1,
0,+1,0,+1,0,+1,0,+1,0,-1,0,+1,0,-1,0,-1,0,+1,0,+
1,0,-1,0,+1,0,-1,0,+1,0,-1,0,-1,0,-1,0,-1,0,-1,
0,-1,0,-1,0,+1,0,+1,0,-1,0,+1,0,-1,0,+1,0,+1,0,+
1,0,+1,0,+1,0,+1,0,+1,0,-1,0,+1,0,+1,0,-1,
0,+1,0,-1,0,+1,0,-1,0,-1,0,-1,0,-1,0,-1,0,+1,0,+
1,0,-1,0,+1,0,-1,0,+1,0,-1,0,-1,0,-1,0,-1,0,-1,
0,-1,0,+1,0,-1,0,+1,0,+1,0,+1,0,-1,0,-1,0,+1,0,+
1,0,+1,0,-1,0,-1,0,+1,0,-1,0,-1,0,+1,0,+1,0,+1,
0,-1,0,+1,0,-1,0,+1,0,-1,0,+1,0,+1,0,+1,0,+1,0,+
1,0,-1,0,+1,0,-1,0,-1,0,+1,0,-1,0,+1,0,-1,0,+1}       [Equation 5]

An example of a 2×LTF sequence for an 80 MHz band may be determined as follows.

$HELTF_{-500,500}$={-+1,0,+1,0,-1,0,+1,0,+1,0,+1,0,-1,
0,+1,0,+1,0,+1,0,-1,0,-1,0,-1,0,+1,0,-1,0,-
1,0,+1,0,+1,0,-1,0,+1,0,+1,0,+1,0,-1,0,-1,0,-1,
0,-1,0,+1,0,+1,0,+1,0,+1,0,-1,0,+1,0,+1,0,-
1,0,+1,0,-1,0,-1,0,+1,0,-1,0,-1,0,-1,0,+1,0,+1,
0,-1,0,-1,0,+1,0,-1,0,-1,0,+1,0,-1,0,-1,0,+1,0,+
1,0,-1,0,+1,0,+1,0,-1,0,-1,0,+1,0,-1,0,-1,0,+1,
0,-1,0,-1,0,-1,0,+1,0,-1,0,-1,0,+1,0,+1,0,-
1,0,+1,0,+1,0,+1,0,-1,0,-1,0,-1,0,-1,0,+1,0,-1,
0,+1,0,+1,0,-1,0,+1,0,+1,0,+1,0,+1,0,+1,0,-1,0,-
1,0,+1,0,+1,0,+1,0,+1,0,-1,0,-1,0,+1,0,-1,0,-
1,0,+1,0,+1,0,+1,0,+1,0,+1,0,-1,0,-1,0,+1,
0,-1,0,+1,0,+1,0,-1,0,-1,0,-1,0,-1,0,-1,0,-1,0,+
1,0,-1,0,-1,0,-1,0,+1,0,-1,0,-1,0,-1,0,+1,0,-1,
0,+1,0,-1,0,-1,0,-1,0,+1,0,-1,0,-1,0,+1,0,+1,0,-
1,0,+1,0,-1,0,-1,0,+1,0,+1,0,+1,0,-1,0,-1,0,+1,
0,-1,0,+1,0,+1,0,-1,0,+1,0,-1,0,+1,0,+1,0,-1,0,+
1,0,+1,0,+1,0,+1,0,+1,0,-1,0,-1,0,-1,0,-1,0,+1,
0,-1,0,-1,0,-1,0,-1,0,+1,0,+1,0,+1,0,+1,0,-1,0,-
1,0,+1,0,+1,0,+1,0,+1,0,+1,0,-1,0,-1,0,+1,0,-1,
0,+1,0,+1,0,-1,0,-1,0,+1,0,-1,0,-1,0,-1,0,-1,0,-
1,0,+1,0,+1,0,-1,0,+1,0,-1,0,+1,0,-1,0,-1,0,+1,
0,-1,0,-1,0,-1,0,-1,0,+1,0,+1,0,+1,0,+1,0,-1,0,-
1,0,-1,0,-1,0,-1,0,+1,0,0,0,0,0,0,0,+1,0,-1,0,-1,
0,+1,0,+1,0,-1,0,-1,0,+1,0,-1,0,-1,0,-1,0,+1,0,+
1,0,-1,0,-1,0,+1,0,+1,0,+1,0,-1,0,-1,0,-1,0,-1,
0,-1,0,-1,0,+1,0,-1,0,-1,0,-1,0,+1,0,-1,0,-1,0,-
1,0,+1,0,-1,0,+1,0,+1,0,-1,0,+1,0,-1,0,+1,
0,-1,0,+1,0,-1,0,+1,0,+1,0,-1,0,+1,0,-1,0,-1,0,-
1,0,+1,0,-1,0,-1,0,-1,0,+1,0,-1,0,-1,0,-1,0,-1,
0,-1,0,+1,0,-1,0,+1,0,+1,0,+1,0,-1,0,+1,0,+1,0,+
1,0,+1,0,-1,0,+1,0,+1,0,-1,0,-1,0,+1,0,-1,0,-1,
0,-1,0,+1,0,-1,0,+1,0,-1,0,+1,0,+1,0,-1,0,+1,0,+
1,0,-1,0,+1,0,-1,0,+1,0,+1,0,-1,0,+1,0,-1,0,-1,
0,-1,0,+1,0,-1,0,+1,0,+1,0,+1,0,-1,0,+1,0,+1,0,-
1,0,-1,0,+1,0,-1,0,-1,0,-1,0,-1,0,+1,0,-1,0,-1,
0,-1,0,+1,0,+1,0,+1,0,-1,0,-1,0,+1,0,+1,0,+1,0,+
1,0,+1,0,-1,0,+1,0,-1,0,-1,0,+1,0,-1,0,+1,0,+1,
0,+1,0,-1,0,-1,0,-1,0,-1,0,+1,0,+1,0,-1,0,-1,0,-
1,0,-1,0,+1,0,+1,0,+1,0,-1,0,-1,0,-1,0,-1,0,+1,
0,+1,0,-1,0,-1,0,-1,0,-1,0,+1,0,-1,0,+1,0,+1,0,+
1,0,+1,0,-1,0,+1,0,+1,0,+1,0,-1,0,+1,0,-1,0,+1}       [Equation 6]

An example of a 4×LTF sequence for a 20 MHz band may be determined as follows.

$HELTF_{-122,122}$={-1,-1,+1,-1,+1,-1,+1,+1,-1,+
1,+1,+1,-1,-1,+1,-1,-1,-1,-1,+1,+1,-1,-1,-
1,-1,+1,+1,-1,-1,+1,+1,+1,+1,-1,+1,-1,-1,+
1,+1,-1,+1,+1,+1,+1,-1,-1,+1,-1,-1,-1,+1,+1,+
1,-1,+1,+1,-1,-1,-1,-1,-1,-1,+1,+1,-1,+
1,-1,-1,-1,+1,+1,-1,-1,-1,-1,-1,-1,+1,+
1,-1,-1,-1,-1,+1,-1,+1,+1,+1,-1,+1,+1,+
1,-1,+1,-1,+1,-1,-1,-1,-1,+1,+1,+1,-1,-1,-
1,+1,-1,+1,+1,+1,0,0,0,-1,+1,-1,+1,-1,+1,+1,-
1,+1,+1,+1,-1,-1,+1,-1,-1,-1,-1,+1,+1,-1,-1,+
1,+1,+1,+1,-1,-1,+1,-1,-1,-1,-1,-1,+1,-1,-
1,-1,-1,-1,+1,+1,+1,-1,-1,-1,-1,-1,+1,-1,+
1,+1,-1,+1,-1,-1,-1,+1,+1,-1,+1,-1,-1,-1,+
1,+1,+1,-1,+1,+1,-1,-1,-1,-1,+1,-1,-1,+1,+
1,+1,-1,-1,-1,-1,+1,+1,-1,-1,-1,+1,+1,+1,+
1,-1,-1,+1,+1,+1,+1,+1,-1,+1,+1,-1,-1,-1,+1,-
1,-1,-1,+1,-1,+1,-1,+1,+1}       [Equation 7]

An example of a 4×LTF sequence for a 40 MHz band may be determined as follows.

$HELTF_{-244,244}$={+1,-1,-1,-1,-1,+1,-1,-1,+1,+1,-
1,+1,-1,+1,-1,+1,+1,-1,+1,-1,-1,-1,+1,+1,-1,-
1,-1,-1,-1,-1,-1,+1,-1,-1,+1,+1,-1,+1,-1,-1,-
1,-1,-1,-1,+1,-1,+1,+1,-1,-1,+1,+1,+1,-1,-1,+
1,+1,+1,+1,+1,+1,+1,-1,-1,+1,+1,-1,+1,-1,-
1,-1,+1,-1,+1,+1,-1,-1,+1,+1,-1,-1,-1,-1,+
1,-1,+1,+1,-1,+1,+1,+1,+1,+1,+1,-1,+1,-1,-
1,+1,+1,+1,+1,+1,+1,+1,-1,+1,-1,-1,-1,+
1,+1,+1,+1,-1,-1,+1,+1,+1,+1,-1,-1,+1,-1,-
1,-1,-1,-1,-1,-1,+1,-1,-1,-1,+1,+1,-1,-1,+
1,+1,+1,+1,-1,-1,+1,+1,-1,-1,-1,-1,-1,-1,-1,-
1,-1,+1,+1,+1,+1,+1,+1,-1,+1,+1,-1,+1,-1,-
1,-1,+1,+1,-1,+1,+1,+1,+1,+1,-1,+1,-1,-1,-
1,-1,-1,+1,-1,-1,+1,+1,-1,-1,-1,+1,-1,+1,+
1,-1,+1,-1,+1,+1,+1,+1,+1,-1,+1,-1,-1,-
1,+1,+1,-1,-1,-1,-1,+1,0,0,0,0,0,-1,+1,+1,+1,+1,-
1,+1,+1,-1,-1,+1,-1,+1,+1,-1,-1,-1,+
1,-1,+1,+1,-1,+1,+1,+1,+1,-1,+1,-1,+1,-
1,-1,+1,+1,+1,-1,-1,-1,-1,+1,+1,-1,+
1,-1,+1,+1,-1,-1,-1,-1,+1,+1,-1,-1,-1,+1,+
1,-1,-1,+1,+1,-1,-1,-1,-1,-1,-1,+1,-1,-1,-
1,-1,+1,+1,+1,-1,-1,-1,-1,+1,+1,-1,+1,+1,+
1,+1,-1,-1,-1,-1,+1,+1,+1,-1,-1,-1,-1,-1,+1,+
1,-1,-1,+1,+1,+1,-1,-1,-1,+1,+1,+1,+1,+1,+1,+
1,-1,+1,+1,-1,+1,+1,+1,+1,+1,+1,-1,-1,+1,+1,+
1,-1,-1,+1,+1,+1,+1,-1,+1,+1,+1,+1,+1,+1,+1,+
1,-1,-1,-1,-1,+1,+1,+1,-1,-1,-1,-1,+1,+1,+1,+
1,+1,+1,-1,+1,-1,-1,-1,+1,+1,-1,-1,-1,-1,-
1,-1,+1,-1,-1,-1,+1,+1,-1,-1,-1,-1,-1,-1,-1,-1}       [Equation 8]

An example of a 4×LTF sequence for an 80 MHz band may be determined as follows.

$HELTF_{-500,500}$={+1,+1,-1,+1,-1,+1,-1,-1,-1,+1,-
1,+1,-1,+1,-1,+1,+1,+1,+1,+1,-1,-1,+1,+1,+1,+
1,+1,-1,+1,-1,+1,-1,-1,+1,+1,-1,+1,+1,+1,-
1,+1,-1,-1,-1,-1,-1,-1,+1,+1,-1,-1,-1,-1,-1,+
1,+1,+1,+1,+1,-1,+1,+1,+1,-1,-1,+1,+1,-1,-
1,-1,-1,+1,-1,+1,+1,-1,+1,+1,-1,-1,-1,-1,+
1,+1,+1,-1,+1,-1,+1,+1,-1,+1,+1,+1,-1,-1,+1,+
1,+1,-1,+1,-1,+1,+1,+1,+1,-1,-1,-1,-1,+
1,+1,+1,-1,+1,-1,-1,+1,+1,+1,+1,-1,-1,+1,-
1,-1,-1,+1,+1,+1,+1,+1,+1,+1,-1,+1,+1,-1,-

1,+1,−1,+1,+1,−1,+1,−1,+1,−1,+1,+1,+1,−1,+1,+
1,+1,−1,+1,+1,−1,−1,−1,−1,+1,+1,−1,−1,−1,−
1,+1,−1,+1,−1,+1,+1,−1,−1,+1,−1,−1,−1,+1,+1,−
1,+1,+1,+1,+1,−1,−1,−1,+1,+1,+1,+1,−1,+1,+1,+
1,+1,+1,+1,+1,−1,+1,+1,+1,−1,+1,+1,−1,−1,−1,+
1,−1,+1,−1,−1,+1,+1,−1,+1,−1,+1,+1,+1,+1,+1,−
1,−1,+1,+1,−1,+1,+1,+1,+1,−1,−1,−1,+1,−1,+1,−
1,+1,+1,−1,+1,−1,+1,−1,+1,−1,+1,−1,+1,+1,+
1,−1,+1,+1,−1,−1,+1,−1,+1,−1,−1,−1,+1,+1,+1,−
1,−1,−1,−1,+1,+1,+1,−1,+1,+1,+1,−1,−1,+1,−1,−
1,+1,+1,−1,+1,+1,+1,+1,−1,−1,−1,+1,+1,+1,+1,−
1,+1,−1,−1,−1,−1,−1,−1,−1,−1,+1,−1,+1,−1,−1,+
1,+1,+1,−1,+1,+1,+1,+1,−1,+1,−1,+1,−1,−1,−
1,−1,+1,+1,−1,−1,−1,+1,+1,−1,+1,+1,+1,+1,−1,+
1,−1,−1,+1,−1,−1,+1,+1,−1,+1,+1,+1,+1,+1,−1,−
1,+1,+1,+1,+1,−1,+1,+1,−1,−1,−1,+1,−1,−1,−
1,+1,+1,+1,−1,+1,+1,−1,+1,−1,−1,−1,+1,+1,+1,−
1,+1,+1,+1,−1,+1,−1,−1,−1,−1,−1,+1,−1,−1,−
1,−1,+1,−1,+1,+1,+1,−1,−1,+1,−1,−1,−1,−1,+
1,+1,−1,+1,+1,+1,+1,−1,−1,−1,+1,+1,+1,+1,−1,−
1,+1,+1,+1,+1,+1,+1,−1,+1,+1,+1,+1,−1,+1,−1,−
1,−1,−1,−1,+1,−1,+1,+1,+1,−1,−1,+1,−1,+1,+1,+
1,+1,−1,+1,+1,−1,+1,+1,+1,−1,+1,−1,+1,−1,+1,+
1,+1,−1,+1,+1,−1,+1,−1,−1,+1,+1,−1,+1,−1,−1,−
1,−1,+1,+1,+1,+1,−1,−1,+1,+1,0,0,0,0,0,+1,−1,−1,−1,−
1,−1,−1,+1,−1,+1,+1,−1,−1,+1,+1,−1,+1,−1,+1,+
1,−1,−1,+1,−1,+1,−1,−1,+1,−1,+1,+1,+1,+1,−
1,+1,−1,+1,−1,+1,−1,+1,+1,−1,+1,−1,−1,−1,−
1,−1,+1,+1,+1,−1,+1,−1,−1,+1,+1,−1,−1,+1,−
1,−1,−1,+1,−1,−1,−1,−1,+1,+1,+1,−1,−1,−1,−1,−
1,+1,−1,−1,+1,+1,+1,−1,+1,+1,+1,−1,+1,−1,+1,−
1,−1,−1,−1,+1,+1,+1,−1,−1,−1,−1,+1,+1,−1,−1,+
1,+1,+1,−1,+1,−1,−1,+1,−1,+1,−1,−1,−1,−1,−
1,−1,+1,+1,−1,−1,+1,+1,+1,−1,−1,+1,+1,+1,−1,+
1,−1,−1,+1,−1,−1,+1,+1,−1,+1,−1,−1,−1,−1,+
1,+1,−1,+1,−1,+1,+1,+1,+1,−1,−1,−1,−1,−1,+1,−
1,−1,−1,−1,+1,−1,+1,+1,+1,−1,−1,+1,−1,+1,+
1,−1,−1,+1,+1,−1,+1,+1,+1,−1,+1,−1,+1,+1,+
1,+1,−1,+1,−1,−1,−1,+1,+1,−1,−1,−1,−1,−1,+
1,−1,−1,+1,+1,−1,+1,+1,+1,−1,+1,−1,+1,−1,−
1,−1,+1,+1,+1,−1,+1,−1,−1,−1,−1,+1,−1,−1,+
1,+1,+1,−1,+1,+1,+1,+1,−1,+1,−1,+1,−1,+1,+
1,+1,−1,−1,−1,+1,−1,+1,+1,+1,−1,+1,−1,−1,−
1,+1,−1,+1,−1,+1,+1,+1,+1,+1,−1,+1,+1,−1,−1,+
1,+1,+1,+1,−1,+1,−1,+1,−1,−1,+1,+1,−1,−1,+
1,−1,+1,+1,+1,+1,−1,+1,+1,+1,−1,+1,−1,−1,+
1,+1,−1,−1,−1,−1,+1,+1,−1,+1,+1,−1,+1,−1,−
1,−1,−1,+1,+1,−1,+1,−1,−1,+1,+1,−1,−1,+1,−
1,−1,+1,+1,−1,+1,+1,+1,+1,−1,−1,+1,+1,−1,−
1,+1,+1,+1,+1,−1,+1,+1,+1,+1,−1,−1,−1,−1,−
1,+1,+1,−1,−1,−1,−1,−1,+1,−1,+1,+1,+1,−1,+1,+
1,−1,+1,−1,−1,+1,−1,+1,+1,+1,+1,−1,−1,+1,+
1,+1,+1,+1,−1,+1,+1,+1,+1,+1,−1,−1,−1,−1,+
1,−1,+1,−1,−1,−1,+1,+1,+1,+1,+1,−1,−1,+1,+
1,−1,−1,−1,−1,+1,+1,+1,−1,−1,−1,+1,−1,−
1,+1,+1,+1,−1,+1,+1,−1,−1,+1,−1,+1,−1,+1,+1}   [Equation 9]

However, the LTF sequence is only one embodiment, and various types of LTF sequences for 20 MHz, 40 MHz, 80 MHz bands may be used.

For another example, a wake-up packet may be transmitted using a coefficient of a 1×, 2× HE-STF sequence without any change. That is, a coefficient of a 1×, 2× HE-STF sequence may be used for the tone index of an RU used for the transmission of a wake-up packet without any change.

An HE-STF sequence may be generated in such a way to repeat an M sequence, that is, a binary sequence. A basically used M sequence may be M={−1, −1, −1, 1, 1, 1, −1, 1, 1, 1, −1, 1, 1, −1, 1}.

In this case, a 1×STF sequence for a 20 MHz band may be determined as follows.

$$HES_{-112:16:112} = \{M\} \cdot (1+j)/\sqrt{2}$$

$$HES_0 = 0 \quad \text{[Equation 10]}$$

Furthermore, a 1×STF sequence for a 40 MHz band may be determined as follows.

$$HES_{-240:16:240}\{M,0,-M\} \cdot (1+j)/\sqrt{2} \quad \text{[Equation 11]}$$

Furthermore, a 1×STF sequence for an 80 MHz band may be determined as follows.

$$HES_{-496:16:496} = \{M,1,-M,0,-M,1,-M\} \cdot (1+j)/\sqrt{2} \quad \text{[Equation 12]}$$

Furthermore, a 2×STF sequence for a 20 MHz band may be determined as follows.

$$HES_{-120:8:120} = \{M,0,-M\} \cdot (1+j)/\sqrt{2} \quad \text{[Equation 13]}$$

Furthermore, a 2×STF sequence for a 40 MHz band may be determined as follows.

$$HES_{-248:8:248} = \{M,-1,M,0,M,-1,M\} \cdot (1+j)/\sqrt{2}$$

$$HES_{\pm 248} = 0 \quad \text{[Equation 14]}$$

Furthermore, a 2×STF sequence for an 80 MHz band may be determined as follows.

$$HES_{-504:8:504} = \{M,-1,M,-1,-M,-1,M,0,-M,1,M,1,-M,1,-M\} \cdot (1+j)/\sqrt{2}$$

$$HES_{\pm 504} = 0 \quad \text{[Equation 15]}$$

However, the STF sequence is only one embodiment, and various types of STF sequences for a 20 MHz, 40 MHz, 80 MHz band may be used.

Figure 30:
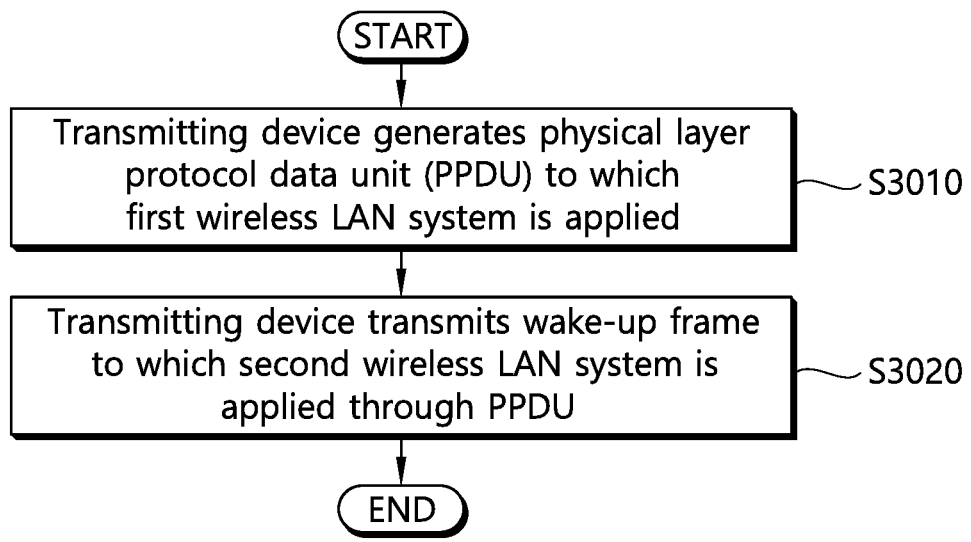
FIG. 30 is a flowchart illustrating a procedure of transmitting a wake-up frame using an HE-PPDU according to the present embodiment.

FIG. 30 is a flowchart illustrating a procedure of transmitting a wake-up frame using an HE-PPDU according to the present embodiment.

The example of FIG. 30 may be performed in a network environment in which both a first wireless LAN system and a second wireless LAN system are supported. In this case, the first wireless LAN system may correspond to an 802.11ax system, and the second wireless LAN system may correspond to an 802.11ba system.

The example of FIG. 30 is performed in a transmitting device. A receiving device supporting a first wireless LAN system may correspond to an ax STA. A receiving device supporting a second wireless LAN system may correspond to a low-power wake-up receiver or WUR STA. The transmitting device may correspond to an AP.

Terms are first arranged. An on signal may correspond to a signal having an actual power value. An off signal may correspond to a signal not having an actual power value. Furthermore, a subcarrier described in the present embodiment may be interchangeably used with a concept, such as a tone.

At step S3010, a transmitting device generates a physical layer protocol data unit (PPDU) to which a first wireless LAN system is applied.

At step S3020, a transmitting device transmits a wake-up frame to which a second wireless LAN system is applied through the PPDU.

How the wake-up frame is generated is described as follows.

An on-off keying (OOK) method is applied the wake-up frame, which is configured with an on signal and an off signal.

The PPDU is transmitted through a first frequency band. The PPDU includes a signal field and a data field. The signal field is the control information field of the PPDU, and may correspond to an HE-SIG-B field. The HE-SIG-B field may be included only in the case of a PPDU for multiple users (MU). Basically, the HE-SIG-B may include resource assignment information for at least one receiving device.

However, In this case, the signal field may use the reserved field of the HE-SIG-B.

Accordingly, the signal field includes information on that the data frame is transmitted in at least one RU except three 26-radio units (RU) positioned at the center of the second frequency band including the first frequency band. That is, the transmitting device may signal that the three 26-RUs need to be empted through the signal field with respect to a receiving device supporting a first wireless LAN system. The reason for this is that the three 26-RUs need to be used to transmit the wake-up frame.

Specifically, the wake-up frame is transmitted through a 4 MHz band positioned at the center of the three 26-RUs. A coefficient is inserted into first subcarriers configuring the 4 MHz band.

The first frequency band and the second frequency band may be 20 MHz. The first subcarriers may be disposed at subcarriers whose subcarrier indices within the three 26-RUs are from −26 to 25. In the first subcarrier, DC may be positioned at second subcarriers whose subcarrier indices within the three 26-RUs are −3 to 3. 0 may be inserted into the second subcarrier.

The three 26-RUs may be disposed in third subcarriers having subcarrier indices of −42 to 42. In the third subcarrier, 0 may be inserted into a fourth subcarrier except subcarriers having subcarrier indices of −26 to 25. The fourth subcarrier may be a guard subcarrier. The guard subcarrier may perform the role of reducing interference from a surrounding RU.

For another example, the first frequency band is 40 MHz, and the second frequency band may be a first 20 MHz partial band and second 20 MHz partial band included in the 40 MHz. The first subcarriers may be disposed at subcarriers whose subcarrier indices within the three 26-RUs are from −149 to 98 in the first 20 MHz partial band. The first subcarriers may be disposed at subcarriers whose subcarrier indices within the three 26-RUs are from 98 to 149 in the second 20 MHz partial band.

For yet another example, the first frequency band is 80 MHz, and the second frequency band may be a first 20 MHz partial band, second 20 MHz partial band, third 20 MHz partial band and fourth 20 MHz partial band included in the 80 MHz. The first subcarriers may be disposed at subcarriers whose subcarrier indices within the three 26-RUs are from 405 to −354 in the first 20 MHz partial band. The first subcarriers may be disposed at subcarriers whose subcarrier indices within the three 26-RUs are from −163 to −112 in the second 20 MHz partial band. The first subcarriers may be disposed at subcarriers whose subcarrier indices within the three 26-RUs are from 112 to 163 in the third 20 MHz partial band. The first subcarriers may be disposed at subcarriers whose subcarrier indices within the three 26-RUs are from 354 to 405 in the fourth 20 MHz partial band.

The space of the first to fourth subcarriers may be 78.125 KHz. The first to fourth subcarriers are subcarriers for a PPDU to which the first wireless LAN system is applied. IFFT may be performed on the PPDU to which the first wireless LAN system is applied. If the first frequency band is 20 MHz, 64-point IFFT may be performed on the PPDU to which the first wireless LAN system is applied. If the first frequency band is 40 MHz, 128-point (or 512-point in 11ax) IFFT may be performed on the PPDU to which the first wireless LAN system is applied. If the first frequency band is 80 MHz, 256-point (or 1024-point in 11ax) IFFT may be performed on the PPDU to which the first wireless LAN system is applied.

Different IFFT may be applied to the PPDU to which the first wireless LAN system is applied and the wake-up frame to which the second wireless LAN system is applied. Detailed contents are described later.

For another example, the coefficient may be inserted into only 13 subcarriers whose subcarrier indices are a multiple of 4 in subcarriers except DC in the first subcarrier. The coefficient may be −1 or 1.

In this case, the coefficient may be inserted using a coefficient of a 1× long training field (LTF) sequence for the preset frequency band. A 1×LTF sequence for the preset frequency band may be defined as follows.

$HELTF_{-122,122}$={0,0,−1,0,0,0,+1,0,0,0,+1,0,0,0,−1,0,
0,0,+1,0,0,0,−1,0,0,0,+1,0,0,0,+1,0,0,0,+1,0,0,0,+
1,0,0,0,−1,0,0,0,−1,0,0,0,+1,0,0,0,+1,0,0,0,+1,0,
0,0,−1,0,0,0,−1,0,0,0,−1,0,0,0,+1,0,0,0,−1,0,0,0,−
1,0,0,0,+1,0,0,0,+1,0,0,0,−1,0,0,0,−1,0,0,0,+1,0,
0,0,−1,0,0,0,−1,0,0,0,+1,0,0,0,−1,0,0,0,0,0,0,−
1,0,0,0,+1,0,0,0,+1,0,0,0,+1,0,0,0,+1,0,0,0,+1,0,0,
0,0,+1,0,0,0,−1,0,0,0,−1,0,0,0,−1,0,0,0,−1,0,0,0,−
1,0,0,0,+1,0,0,0,−1,0,0,0,−1,0,0,0,−1,0,0,0,+1,0,
0,0,−1,0,0,0,−1,0,0,0,+1,0,0,0,−1,0,0,0,−1,0,0,0,+
1,0,0,0,−1,0,0,0,+1,0,0,0,−1,0,0,0,−1,0,0,0,−1,0,
0,0,−1,0,0,0,−1,0,0}

The on signal may be generated by inserting the coefficient into the 13 subcarriers within a 20 MHz band and performing inverse fast Fourier transform (IFFT). Accordingly, the spacing of the 13 subcarriers may be 312.5 KHz.

For yet another example, the coefficient may be inserted into only 7 subcarriers whose subcarrier indices are a multiple of 8 in subcarriers except DC in the first subcarrier. In this case, the coefficient may be inserted using a coefficient of a 2× short training field (STF) sequence for the preset frequency band. A 2×STF sequence for the preset frequency band may be defined as follows.

$HES_{-120:8:120}$={M,0,−M}·(1+j)/$\sqrt{2}$

The M is a binary sequence of a preset 15-bit length and may be defined as follows.

$M$={−1,−1,−1,1,1,1,−1,1,1,1,−1,1,1,−1,1}

The on signal may be generated by inserting the coefficient into the 7 subcarriers within a 20 MHz band and performing IFFT.

That is, the data field may be transmitted to a receiving device supporting the first wireless LAN system through the at least one RU. The wake-up frame may be transmitted to a receiving device supporting the second wireless LAN system through the three 26-RUs. That is, the three 26-RUs cannot be assigned to a receiving device supporting the first wireless LAN system, and can be assigned to only a receiving device supporting the second wireless LAN system.

Furthermore, the data frame and the wake-up frame may be transmitted simultaneously. That is, the data frame and the wake-up frame can be transmitted simultaneously through different frequency band according to an OFDMA scheme.

Furthermore, a transmitting device may be aware of power values of an on signal and an off signal, and may configure the on signal and the off signal. A receiving device can reduce power consumed upon decoding by decoding an on signal and an off signal using an envelope detector.

Figure 31:
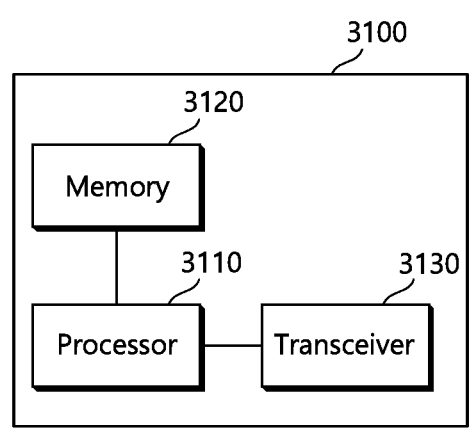
FIG. 31 is a block view illustrating a wireless device to which the exemplary embodiment of the present invention can be applied.

FIG. 31 is a block view illustrating a wireless device to which the exemplary embodiment of the present invention can be applied.

Referring to FIG. 31, as an STA that can implement the above-described exemplary embodiment, the wireless device may correspond to an AP or a non-AP station (STA).

The wireless device may correspond to the above-described user or may correspond to a transmission device transmitting a signal to the user.

The wireless apparatus of FIG. 31, as shown, includes a processor 3110, a memory 3120 and a transceiver 3130. The illustrated processor 3110, memory 3120 and transceiver 3130 may be implemented as separate chips, respectively, or at least two blocks/functions may be implemented through a single chip.

The transceiver 3130 is a device including a transmitter and a receiver. If a specific operation is performed, only an operation of any one of the transmitter and the receiver may be performed or operations of both the transmitter and the receiver may be performed. The transceiver 3130 may include one or more antennas for transmitting and/or receiving a radio signal. Furthermore, the transceiver 3130 may include an amplifier for amplifying a received signal and/or a transmission signal and a bandpass filter for transmission on a specific frequency band.

The processor 3110 may implement the functions, processes and/or methods proposed in this specification. For example, the processor 3110 may perform the above-described operations according to the present embodiment. That is, processor 3110 may perform the operations disclosed in the embodiments of FIGS. 1 to 30.

The processor 3110 may include application-specific integrated circuits (ASIC), other chipsets, logic circuits, data processors and/or a converter for converting a baseband signal into a radio signal, and vice versa. The memory 3120 may include a read-only memory (ROM), a random access memory (RAM), a flash memory, a memory card, a storage medium and/or other storage devices.

Figure 32:
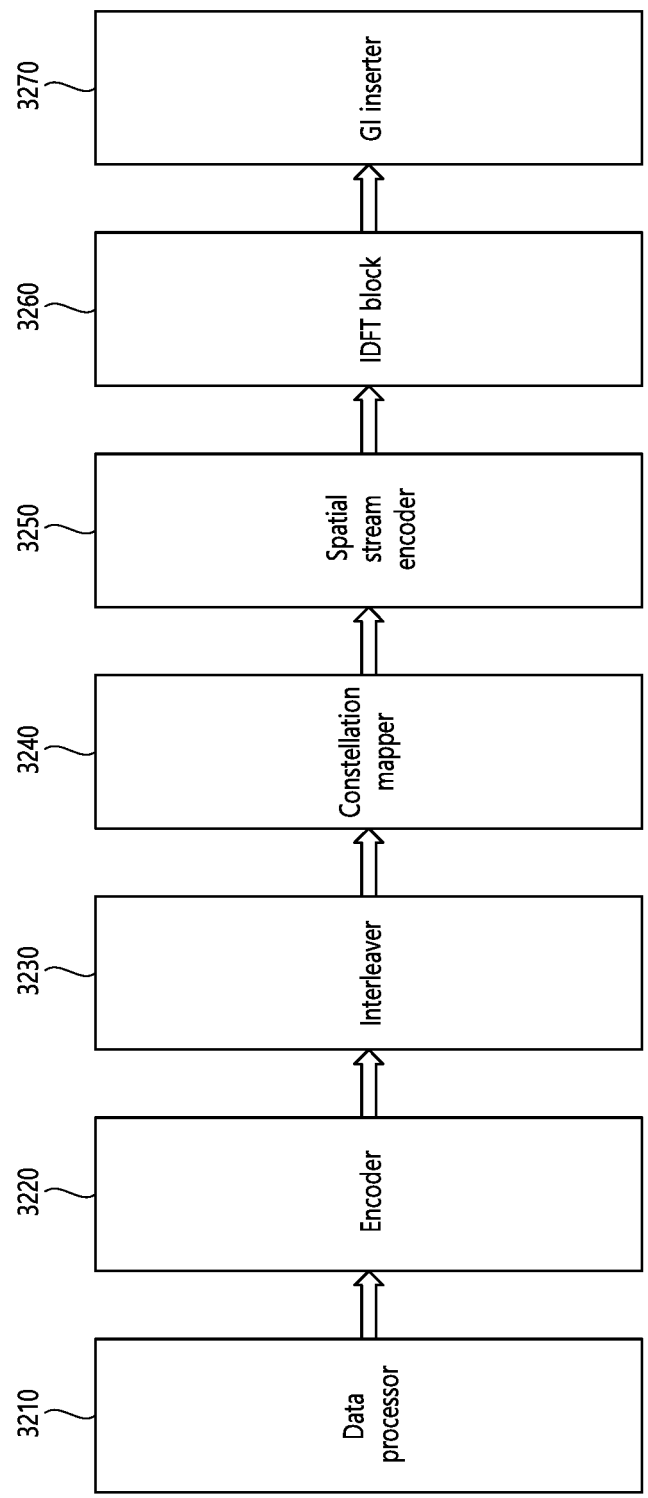
FIG. 32 is a block diagram illustrating an example of an apparatus included in a processor.

FIG. 32 is a block diagram illustrating an example of an apparatus included in a processor. For convenience of description, the example of FIG. 32 has been described based on blocks for a transmission signal, but it is evident that a received signal can be processed using the corresponding blocks.

An illustrated data processor 3210 generates transmission data (control data and/or user data) corresponding to a transmission signal. The output of the data processor 3210 may be input to an encoder 3220. The encoder 3220 may perform coding through a binary convolutional code (BCC) or a low-density parity-check (LDPC) scheme. At least one encoder 3220 may be included. The number of encoders 3220 may be determined depending on various pieces of information (e.g., the number of data streams).

The output of the encoder 3220 may be input to an interleaver 3230. The interleaver 3230 performs an operation of distributing contiguous bit signals on a radio resource (e.g., time and/or frequency) in order to prevent a burst error attributable to fading. At least one interleaver 3230 may be included. The number of interleavers 3230 may be determined depending on various pieces of information (e.g., the number of spatial streams).

The output of the interleaver 3230 may be input to a constellation mapper 3240. The constellation mapper 3240 performs constellation mapping, such as biphase shift keying (BPSK), quadrature phase shift keying (QPSK), or quadrature amplitude modulation (n-QAM).

The output of the constellation mapper 3240 may be input to a spatial stream encoder 3250. The spatial stream encoder 3250 performs data processing in order to transmit a transmission signal through at least one spatial stream. For example, the spatial stream encoder 3250 may perform at least one of space-time block coding (STBC), cyclic shift diversity (CSD) insertion and spatial mapping on a transmission signal.

The output of the spatial stream encoder 3250 may be input to an IDFT block 3260. The IDFT block 3260 performs inverse discrete Fourier transform (IDFT) or inverse Fast Fourier transform (IFFT).

The output of the IDFT block 3260 is input to a guard interval (GI) inserter 3270. The output of the GI inserter 3270 is input to the transceiver 3130 of FIG. 31.

What is claimed is:

1. A method of transmitting a wake-up frame in a first wireless LAN system and a second wireless LAN system, the method comprising:
   generating, by a transmitting device, a physical layer protocol data unit (PPDU) to which the first wireless LAN system is applied; and
   transmitting, by the transmitting device, a wake-up frame to which the second wireless LAN system is applied through the PPDU,
   wherein the PPDU is transmitted through a first frequency band,
   the PPDU comprises a signal field and a data frame,
   the signal field includes information on that the data frame is transmitted in at least one radio unit (RU),
   the at least one radio unit is any radio unit except for three 26-RUs positioned at a center of the first frequency band, the 26-RUs representing the RU with 26 number of tones,
   the wake-up frame is transmitted through a 4 MHz band positioned at a center of the three 26-RUs,
   a coefficient is inserted into first subcarriers configuring the 4 MHz band, and
   an on-off keying (OOK) method is applied to the wake-up frame, and the wake-up frame is configured with an on signal and an off signal.

2. The method of claim 1, wherein:
   the first frequency band is 20 MHz,
   the first subcarriers are disposed at subcarriers whose subcarrier indices within the three 26-RUs are from −26 to 25,
   in the first subcarrier, DC is positioned at second subcarriers whose subcarrier indices within the three 26-RUs are from −3 to 3,
   0 is inserted into the second subcarriers,
   the three 26-RUs are positioned at third subcarriers having subcarrier indices of −42 to 42, and
   0 is inserted into a fourth subcarrier except subcarriers having subcarrier indices of −26 to 25 among the third subcarriers.

3. The method of claim 1, wherein:
   the first frequency band comprises a first 20 MHz partial band and second 20 MHz partial band,
   the first subcarriers are disposed at subcarriers whose subcarrier indices within the three 26-RUs are from −149 to 98 in the first 20 MHz partial band, and
   the first subcarriers are disposed at subcarriers whose subcarrier indices within the three 26-RUs are from 98 to 149 in the second 20 MHz partial band.

4. The method of claim 1, wherein:
   the first frequency band comprises a first 20 MHz partial band, second 20 MHz partial band, third 20 MHz partial band and fourth 20 MHz partial band,
   the first subcarriers are disposed at subcarriers whose subcarrier indices within the three 26-RUs are from −405 to −354 in the first 20 MHz partial band, the first subcarriers are disposed at subcarriers whose subcarrier indices within the three 26-RUs are from −163 to −112 in the second 20 MHz partial band, the first subcarriers are disposed at subcarriers whose subcarrier indices within the three 26-RUs are from 112 to 163 in the third 20 MHz partial band, and the first subcarriers are disposed at subcarriers whose subcarrier indices within the three 26-RUs are from 354 to 405 in the fourth 20 MHz partial band.

5. The method of claim 2, wherein the fourth subcarrier is a guard subcarrier.

6. The method of claim 5, wherein a spacing of the first to fourth subcarriers is 78.125 KHz.

7. The method of claim 1, wherein:

the coefficient is inserted into only 13 subcarriers whose subcarrier indices among subcarriers except DC are a multiple of 4 in the first subcarriers, and the coefficient is −1 or 1.

8. The method of claim 7, wherein:

the coefficient is inserted using a coefficient of a 1× long training field (LTF) sequence for a preset frequency band, and the 1×LTF sequence for the preset frequency band is defined as follows, $HELTF_{-122,122}$ {0,0,−1,0,0,0,+1,0,0,0,+1,0,0,0,−1,0,0, 0,+1,0,0,0,−1,0,0,0,+1,0,0,0,+1, 0,0,0,+1,0,0,0,+ 1,0,0,0,−1,0,0,0,−1,0,0,0,+1,0,0,0,+1,0,0,0,+1,0, 0,0,−1,0,0,0,−1,0,0,0,−1,0,0,0,+1,0,0,0,−1,0,0,0,− 1,0,0,0,+1,0,0,0,+1,0,0,0, −1,0,0,0,−1,0,0,0,+1,0, 0,0,−1,0,0,0,−1,0,0,0,+1,0,0,0,−1,0,0,0,0,0,0,0, −1,0,0,0,+1,0,0,0,+1,0,0,0,+1,0,0,0,+1,0,0,0,+1,0, 0,0,+1,0,0,0,−1,0,0, 0,−1,0,0,0,−1,0,0,0,−1,0,0, 0,−1,0,0,0,+1,0,0,0,−1,0,0,0,−1,0,0,0,−1,0, 0,0,+ 1,0,0,0,−1,0,0,0,−1,0,0,0,+1,0,0,0,−1,0,0,0,−1,0, 0,0,+1,0,0,0,−1, 0,0,0,+1,0,0,0,−1,0,0,0,−1,0,0, 0,−1,0,0,0,−1,0,0,0,−1,0,0}.

9. The method of claim 7, wherein the on signal is generated by inserting the coefficient into the 13 subcarriers within a 20 MHz band and performing inverse fast Fourier transform (IFFT).

10. The method of claim 7, wherein a spacing of the 13 subcarriers is 312.5 KHz.

11. The method of claim 1, wherein:

the coefficient is inserted into only 7 subcarriers whose subcarrier indices in subcarriers other than DC are a multiple of 8 in the first subcarriers, and the coefficient is −1 or 1.

12. The method of claim 11, wherein:

the coefficient is inserted using a coefficient of a 2× short training field (STF) sequence for a preset frequency band, and the 2×STF sequence for the preset frequency band is defined as follows, $HES\_120{:}8{:}120 = \{M,0,-M\} \cdot (1+j)/\sqrt{2}$ wherein the M is a binary sequence of a preset 15-bit length and defined as follows, $M = 1,-1,-1,-1,1,1,1,-1,1,1,1,-1,1,1,-1,1\}$.

13. The method of claim 11, wherein the on signal is generated by inserting the coefficient into the 7 subcarriers within a 20 MHz band and performing IFFT.

14. A transmitting device transmitting a wake-up frame in a first wireless LAN system and a second wireless LAN system, the transmitting device comprising:

a transceiver that transmits or receives a radio signal; and a processor configured to control the transceiver, wherein the processor is configured to:

generate a physical layer protocol data unit (PPDU) to which the first wireless LAN system is applied; and transmit a wake-up frame to which the second wireless LAN system is applied through the PPDU, wherein the PPDU is transmitted through a first frequency band, the PPDU comprises a signal field and a data frame, the signal field includes information on that the data frame is transmitted in at least one radio unit (RU), the at least one radio unit is any radio unit except for three 26-RUs positioned at a center of the first frequency band, the 26-RUs representing the RU with 26 number of tones, the wake-up frame is transmitted through a 4 MHz band positioned at a center of the three 26-RUs, a coefficient is inserted into first subcarriers configuring the 4 MHz band, and an on-off keying (OOK) method is applied to the wake-up frame, and the wake-up frame is configured with an on signal and an off signal.

* * * * *